US006493331B1

(12) United States Patent
Walton et al.

(10) Patent No.: US 6,493,331 B1
(45) Date of Patent: Dec. 10, 2002

(54) METHOD AND APPARATUS FOR CONTROLLING TRANSMISSIONS OF A COMMUNICATIONS SYSTEMS

(75) Inventors: Jay R. Walton, Westford, MA (US); Mark Wallace, Bedford, MA (US); Jack Holtzman, San Diego, CA (US); Franklin P. Antonio, Del Mar, CA (US)

(73) Assignee: Qualcomm Incorporated, San Diego, CA (US)

( * ) Notice: Subject to any disclaimer, the term of this patent is extended or adjusted under 35 U.S.C. 154(b) by 0 days.

(21) Appl. No.: 09/539,157

(22) Filed: Mar. 30, 2000

(51) Int. Cl.[7] .................................................. H04Q 7/28
(52) U.S. Cl. ........................ 370/341; 370/329; 370/332; 370/437
(58) Field of Search ................................ 370/329, 330, 370/332, 333, 334, 335, 341, 342, 343, 344, 436, 437, 441, 204, 208, 210, 215, 336, 345, 442, 458, 478, 479, 480, 498; 375/130, 297, 317, 345; 445/447, 450, 452, 522, 69

(56) References Cited

U.S. PATENT DOCUMENTS

| | | | |
|---|---|---|---|
| 4,901,307 A | | 2/1990 | Gilhousen et al. |
| 5,103,459 A | | 4/1992 | Gilhousen et al. |
| 5,469,468 A | * | 11/1995 | Schilling ..................... 375/130 |
| 5,844,894 A | * | 12/1998 | Dent ........................ 370/330 |
| 5,923,650 A | * | 7/1999 | Chen et al. ................. 370/331 |
| 5,974,324 A | * | 10/1999 | Henson ....................... 455/447 |
| 6,185,266 B1 | * | 2/2001 | Kuchi et al. ................ 375/347 |
| 6,230,026 B1 | * | 5/2001 | Schwaller et al. ........... 455/561 |
| 6,333,926 B1 | * | 12/2001 | Van Heeswyk et al. ...... 370/335 |

OTHER PUBLICATIONS

Thomas K. Fong et al., "Radio Resource Allocation in Fixed Broadband Wireless Networks," IEEE Transactions on Communications, vol. 46, No. 6, Jun. 1998. (pp. 1–8).

(List continued on next page.)

Primary Examiner—Douglas Olms
Assistant Examiner—Phirin Sam
(74) Attorney, Agent, or Firm—Philip R. Wadsworth; Kent D. Baker; Thomas R. Rouse

(57) ABSTRACT

In some aspects, each cell in the communications system can be designed to operate in accordance with a set of back-off factors that identify the reductions in peak transmit power levels for the channels associated with the back-off factors. The back-off factors are defined to provide the required power to a large percentage of the users while reducing the amount of interference. In some other aspects, the cells operate using an adaptive reuse scheme that allows the cells to efficiently allocate and reallocate the system resources to reflect changes in the system. A reuse scheme is initially defined and resources are allocated to the cells. During operation, changes in the operating conditions of the system are detected and the reuse scheme is redefined as necessary based on the detected changes. For example, the loading conditions of the cells can be detected, and the resources can be reallocated and/or the reuse scheme can be redefined. In yet other aspects, techniques are provided to efficiency schedule data transmissions and to assign channels to users. Data transmissions can be scheduled based on user priorities, some fairness criteria, system requirements, and other factors. Users are assigned to available channels based on a number of channel assignment schemes. Channel metrics are also provided, which can be used to prioritize users and for channel assignments.

63 Claims, 17 Drawing Sheets

OTHER PUBLICATIONS

Kapil Chawla et al., "Quasi–Static Resource Allocation with Interference Avoidance for Fixed Wireless Systems," AT&T Laboratories–Research, New Jersey; IEEE Journal on Selected Areas in Communications. vol. 19, No. 3, Mar. 1999.

Kin K. Leung et al., "Dynamic Allocation of Downlink and Uplink Resource for Braodband Services in Fixed Wireless Networks," AT&T Laboratories–Research, New Jersey; IEEE Journal on Selected Areas in Communications, vol. 17, No. 5, May 1999.

* cited by examiner

METHOD AND APPARATUS FOR CONTROLLING TRANSMISSIONS OF A COMMUNICATIONS SYSTEMS

BACKGROUND OF THE INVENTION

I. Field of the Invention

The present invention relates to data communication. More particularly, the present invention relates to a novel and improved method and apparatus for controlling transmissions of a communications system to increase efficiency and improve performance.

II. Description of the Related Art

Wireless communications systems are becoming more prevalent as the systems of choice for supporting a variety of communications applications. One such wireless communications system is a code division multiple access (CDMA) system that facilitates communication among a large number of system users. Other wireless communications systems include a time division multiple access (TDMA) system and a frequency division multiple access (FDMA) system. A Global System for Mobile (GSM) communications system is a TDMA-based system widely employed in Europe.

The spread spectrum modulation technique of CDMA has significant advantages over other modulation techniques for multiple access communications systems. The use of CDMA techniques in a multiple access communications system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS," issued Feb. 13, 1990, and U.S. Pat. No. 5,103,459, entitled "SYSTEM AND METHOD FOR GENERATING SIGNAL WAVEFORMS IN A CDMA CELLULAR TELEPHONE SYSTEM," issued Apr. 7, 1992, both assigned to the assignee of the present invention and incorporated herein by reference.

CDMA systems are typically designed to conform to one or more CDMA standards. Examples of such CDMA standards include the "TIA/EIA/IS-95-A Mobile Station-Base Station Compatibility Standard for Dual-Mode Wideband Spread Spectrum Cellular System" and the "TIA/EIA/IS-95-B Mobile Station-Base Station Compatibility Standard for Dual-Mode Wideband Spread Spectrum Cellular System" (collectively, the IS-95 standard), the TIA/EIA/IS-98-A, -B, and -C standards entitled "Recommended Minimum Performance Standard for Dual-Mode Spread Spectrum Cellular and PCS Mobile Stations," and "The cdma2000 ITU-R RTT Candidate Submission," (hereinafter, the IS-2000 standard). New standards are continually proposed and adopted for use.

In a wireless communications system, communication between users is conducted through one or more base stations. A first user on one terminal (e.g., a remote station) communicates to a second user on a second terminal by transmitting data on an uplink to a base station. The base station receives the data and can route the data to another base station. The data is then transmitted on the downlink from the base station to the second terminal. The downlink refers to transmission from the base station to the terminal and the uplink refers to transmission from the terminal to the base station. In IS-95 systems, the uplink and the downlink are allocated separate frequencies.

In a wireless communications system, each transmitting source acts as potential interference to the receivers in the system. To combat the interference experienced by the terminals and base stations and to maintain a required level of performance, conventional TDMA and FDMA systems resort to frequency reuse techniques whereby not all time slots and frequency channels, respectively, are used in each cell. For example, a TDMA system may employ a 7-cell reuse pattern in which the total operating bandwidth W is divided into seven equal operating frequency bands (i.e., B =W/7) and each of the seven cells is assigned to one of the frequency bands. Thus, every seventh cell reuses the same frequency band. With reuse, the co-channel interference levels experienced in each cell are reduced relative to that if each cell is assigned the same frequency band. However, reuse patterns of more than one cell (such as the 7-cell reuse pattern for a conventional TDMA system) represent inefficient use of the available resources since each cell is allocated and able to use only a portion of the total operating bandwidth.

A CDMA system is capable of operating with a 1-cell reuse pattern (i.e., adjacent cells can use the same operating bandwidth). However, the CDMA system is designed to carry voice data having a low data rate (e.g., 32 kbps or less). Using code division spread spectrum, the low-rate data is spread over a wide (e.g., 1.2288 MHz) bandwidth. Because of the large spreading factor, the transmitted signal can be received at a low or negative carrier-to-noise-plus-interference (C/I) level, despread into a coherent signal, and processed. The CDMA system is not designed for data transmission at high data rates.

Given the ever-growing demand for wireless communication, method and apparatus that can support data transmission at high data rates and allow for better utilization of the available resources to increase efficiency and improve performance are highly desirable.

SUMMARY OF THE INVENTION

The present invention provides techniques for controlling transmissions of a communications system to increase efficiency and improve performance. A communications system is typically required to satisfy a particular coverage criteria typically defined by a specified minimum average bit rate being achieved for a prescribed percentage (e.g., 99.99%) of the time and/or a particular percentage (e.g., 99%) of the users with received signal levels exceeding a particular C/I threshold. The coverage requirement is often influenced by a small percentage of disadvantage users that experience excessive interference from a small number of interfering sources.

The invention recognizes this fact, and provides various techniques that attempt to assist disadvantage users when and where possible to achieve the coverage requirement. In accordance with certain aspects of the invention, each cell in the system can be designed to operate in accordance with a set of back-off factors that identify the reductions in peak transmit power levels for the channels associated with the back-off factors. The back-off factors are defined to provide the required power to a large percentage of the users while reducing the amount of interference.

In accordance with other aspects of the invention, the cells operate using an adaptive reuse scheme that allows the cells to efficiently allocate and reallocate the system resources to reflect changes in the communications system. A reuse scheme is initially defined and resources are allocated to the cells. During operation, changes in the operating conditions of the system are detected and the reuse scheme is redefined as necessary based on the detected changes. For example, the loading conditions of the cells can be detected, and the resources can be reallocated and/or the reuse scheme can be redefined based on the detected loading conditions.

In accordance with certain other aspects of the invention, techniques are provided to efficiently schedule data transmissions and to assign channels to users. Data transmissions can be scheduled based on user priorities, some fairness criteria, system requirements, and other factors. The data transmissions to the users are assigned to available channels based on a number of channel assignment schemes. Channel metrics are also provided, which can be used to prioritize users and for channel assignments. These various aspects of the invention are described in further detail below.

A specific embodiment of the invention provides a method for controlling transmissions in a communications system. In accordance with the method, the available system resources are first partitioned into a number of channels. One or more characteristics of the communications system are determined and a set of back-off factors is defined for the channels based on the determined system characteristics. Each channel is associated with a respective back-off factor, ranging from zero to one, that identifies a reduction from the peak transmit power level. Data transmissions are transmitted on the channels at power levels determined based on the back-off factors. One or more channels are typically associated with a back-off factor of one, representative of full transmit power, and remaining channels are typically associated with back-off factors of less than one.

The available system resources can be partitioned into a number of time division multiplexed (TDM) time slots, frequency division multiplexed (FDM) channels, or code division multiple access (CDMA) channels. The channels then correspond to defined sets of TDM time slots, FDM channels, CDMA channels, or a combination thereof The back-off factors can be defined based on the carrier-to-noise-plus-interference (C/I) characterization of the receiver units in the communications system, the loading probabilities, the required outage probabilities, the set points (i.e., required C/I), or other characteristics or parameters of the system.

The back-off factor for each channel can be adjusted based on the estimated required transmit power level for the channel. The required transmit power can be estimated based on estimated or measured C/I, frame erasure rate (FER), outage probabilities, and others. The back-off factors can also be adjusted based on changes in the communication system (e.g., changes in user characterization, loading, C/I requirements, and so on). One or more back-off factors can be reduced (or possibly set to zero) for selected time durations to reduce interference on the associated channels. The back-off factor for a highly degraded channel having excessively poor frame erasure rate (FER) and/or outage probability may also be set to zero.

For a multi-cell system, a set of back-off factors can be defined for each cell based on the determined characteristics of the cell. The back-off factors for a particular cell are approximately staggered from those of neighboring cells in the reuse pattern to reduce interference. A cell may request other cell(s) to temporarily reduce or shut down their transmit powers so that a particular disadvantage user can be served. If a cell receives multiple requests for power reduction, the cell can apply the largest requested power reduction. The power reduction can be applied in various manners (e.g., in defined steps, by specified amounts, and so on, at designated time intervals). The back-off factors assigned to the cells may also be modified or adjusted to reduce the amount of co-channel interference. Each cell may also be designated time intervals in which data transmissions are allowed. Also, the back-off factors can associated with sectors in a sectorized cell (or with any directed transmission to a particular geographic area).

Another specific embodiment of the invention provides a method for operating a number of transmitter units in a wireless communications system. In accordance with the method, the available system resources are first partitioned into a number of channels. A reuse pattern that includes a number of cells is then defined for the system. One or more characteristics for each cell in the reuse pattern are determined, and a set of channels is allocated to each cell in the reuse pattern based on the determined cell characteristics. The cell characteristics are continually determined and new sets of channels can be allocated to reflect changes in the communications system.

Each cell in the reuse pattern is typically allocated a set of channels for transmission at full power level and may further be allocated one or more channels for transmission at reduced power levels. The channel allocation is typically dependent on a number of factors such as, for example, the number of available channels, the number of cells in the reuse pattern, the user characterization, the loading conditions in the cells, and others. In some implementations, a cell may transmit on a non-allocated channel when additional capacity is needed. The non-allocated channel can be selected based on, for example, its estimated performance, probability of occupancy by other cells, outage probability, and so on. One or more channels can be reserved for transmissions by a particular cell for a particular time duration.

Yet another specific embodiment of the invention covers a method for providing data transmissions to a number of receiver units in a communications system. In accordance with the method, a first set of parameters to be used for scheduling data transmissions is updated, and the data transmissions to the users are prioritized and assigned to available channels based on their priorities. A second set of parameters to be used for transmitting is updated, and the data transmissions are transmitted on the assigned channels to the receiver units using the updated second set of parameters. The performance (e.g., FER) of the data transmissions can be measured and the transmit power levels and/or data rates for the data transmissions can be adjusted accordingly based on the measured performance.

The first set of parameters may include, for example, channel occupancy probabilities, loading probabilities, characterization of C/I of the receiver units, or back-off factors, or a combination thereof. To perform the prioritization, channel metrics may be computed for the available channels for each receiver unit using the updated first set of parameters. The channel metrics can relate to the (e.g., realizable or actual) cumulative throughput for the receiver units, outage probabilities, expected C/I, or some other measures, and may further be reflective of expected interference from interfering sources.

The data transmissions are assigned priorities based on the computed channel metrics, and the priorities may be modified based on, for example, transmission delays. The data transmissions can be assigned to the available channels based on the assigned priorities and the computed channel metrics. In some implementations, successively lower priority data transmissions are assigned to the available channels, starting with the highest priority data transmission. In some other implementation, successively smaller load data transmissions are assigned to the available channels, starting with the highest load. The channel assignment can also attempt to approximately equalize the data rates for some of the data transmissions.

Yet another specific embodiment of the invention covers a method for providing data transmissions on a number of channels to a number of receiver units in a communications system. In accordance with the method, a set of back-off factors are defined for the channels, where the back-off factors identify a reduction from peak transmit power level for the channels. Data transmissions are assigned to the channels, and the required transmit power levels are determined for the data transmissions. The back-off factors are adjusted in accordance with the required transmit power levels, and the data transmissions are transmitted on the channels in accordance with the adjusted back-off factors. Various aspects to define and adjust the back-off factors, schedule the data transmissions, and assign channels described above can be applied.

Yet another specific embodiment of the invention provides a transmitter unit that includes a system data processor, one or more modulators, and one or more antennas. The system data processor receives and partitions an input data stream into a number of channel data streams and to process the channel data streams. The modulator(s) receive and modulate the processed channel data streams to generate one or more modulated signals that comprise a number of data transmissions to be transmitted on a number of channels to a number of receiver units. Each channel is associated with a respective back-off factor, ranging from zero to one, that identifies a reduction from the peak transmit power level. The antenna(s) receive and transmit the modulated signal(s).

The back-off factors for the channels are defined based on various system characteristics such as, for example, the C/I characterization or the loading of the system. The modulator(s) can be designed to implement orthogonal frequency division multiplexing (OFDM) modulation.

Yet another specific embodiment of the invention provides a receiver unit that includes one or more antennas, one or more demodulators, and a data processor. The antenna(s) receive one or more modulated signals that have been generated and transmitted by (1) partitioning an input data stream into a number of channel data streams, (2) processing and modulating the channel data streams to generate one or more modulated signals that comprise a number of data transmissions to be transmitted on a number of channels, and (3) adjusting power levels of the data transmissions in accordance with a set of back-off factors associated with the channels. The demodulator(s) receive and demodulate the modulated signal(s) to generate one or more demodulated symbol streams, and the data processor receives and processes the demodulated symbol stream(s) to generate output data.

Various other embodiments of the transmitter and receiver units are also provided, as described below. Moreover, various aspects, features, and embodiments of the communications system are also described below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION OF THE SPECIFIC EMBODIMENTS

Figure 1:
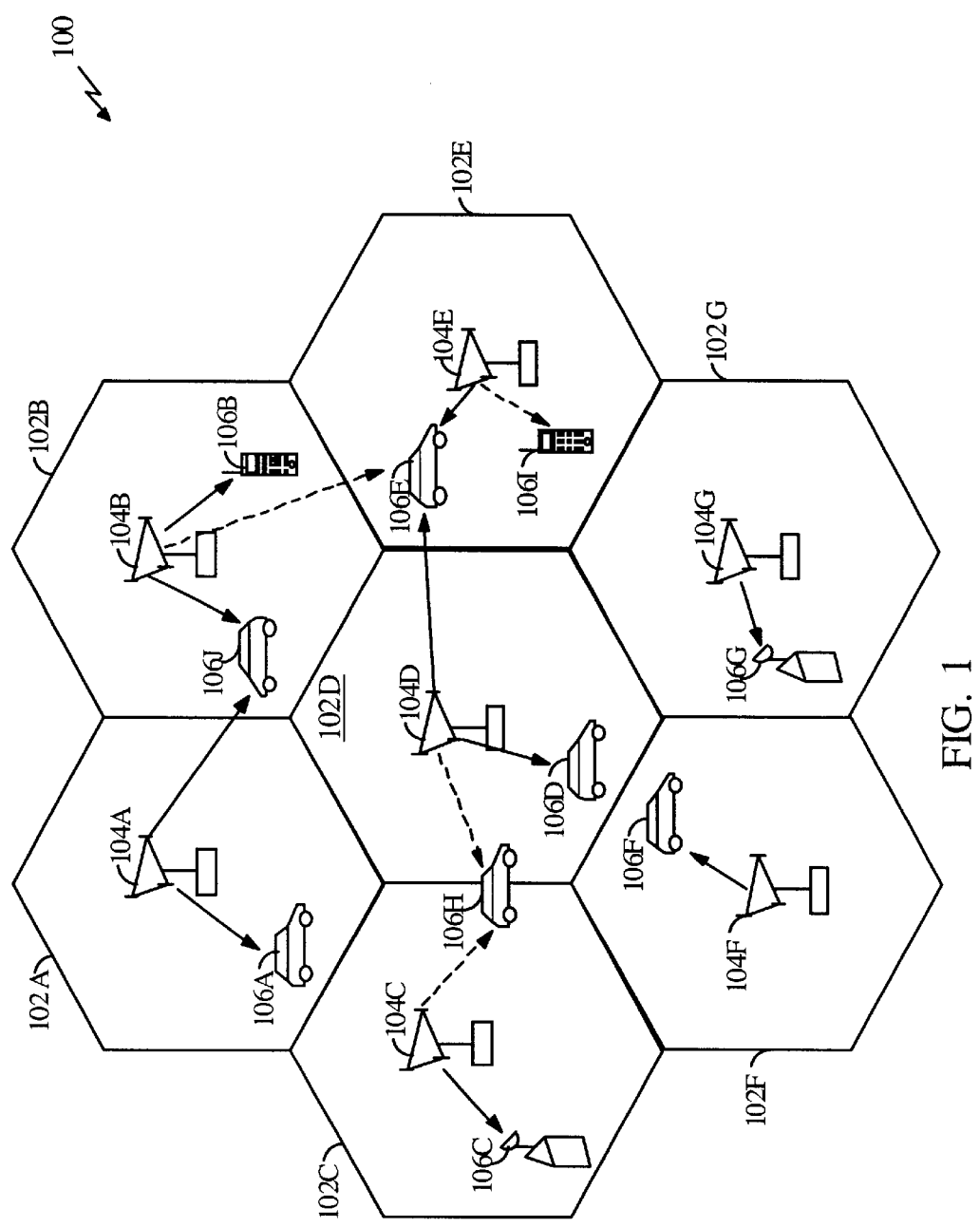
FIG. 1 is a diagram of a communications system that supports a number of users and is capable of implementing at least some aspects and embodiments of the invention.

FIG. 1 is a diagram of a communications system 100 that supports a number of users and is capable of implementing at least some aspects and embodiments of the invention. System 100 provides communication for a number of cells 102a through 102g, each of which is serviced by a corresponding base station 104. The cells are organized in a manner to achieve coverage over a desired area. The coverage area may be defined, for example, as the area over which users at terminals 106 can achieve a particular grade of service (GOS). Terminals 106 in the coverage area may be fixed (i.e., stationary) or mobile, and are generally served by a primary base station. For each active terminal, transmissions from other base stations and terminals represent potential interference.

As shown in FIG. 1, various terminals 106 are dispersed throughout the system. Each terminal 106 communicates with at least one and possibly more base stations 104 on the downlink and uplink at any given moment depending on, for example, whether "soft handoff" is employed or whether the terminal is designed and operated to (concurrently or sequentially) receive multiple transmissions from multiple base stations. The downlink refers to transmission from the base station to the terminal, and the uplink refers to transmission from the terminal to the base station.

In FIG. 1, base station 104a transmits data to terminals 106a and 106j on the downlink, base station 104b transmits data to terminals 106b and 106j, base station 104c transmits data to terminal 106c, and so on. In FIG. 1, the solid line with the arrow indicates a data transmission from the base station to the terminal. A broken line with the arrow indicates that the terminal is receiving a pilot signal, but no data transmission, from the base station. The uplink communication is not shown in FIG. 1 for simplicity.

System 100 may be designed based on the communications system disclosed in U.S. patent application Ser. No. 09/532,492, entitled "HIGH EFFICIENCY, HIGH PERFORMANCE COMMUNICATIONS SYSTEM EMPLOYING MULTI-CARRIER MODULATION," filed Mar. 22, 2000, or the system disclosed in U.S. patent application Ser. No. 08/963,386, entitled "METHOD AND APPARATUS FOR HIGH RATE PACKET DATA TRANSMISSION," both of which are assigned to the assignee of the present invention and incorporated herein by reference. System 100 may also be designed as a CDMA system that supports one or more CDMA standards, such as the IS-95 standard, the W-CDMA standard, other standards, or a combination thereof.

In system 100, a large number of terminals share a common resource, namely the total operating bandwidth, W. To achieve a desired level of performance at a particular terminal, the interference from other transmissions need to be reduced to an acceptable level. Also, to reliably transmit at high data rates for a given operating bandwidth, it is necessary to operate at or above a particular carrier-to-noise-plus-interference (C/I) level. Reduction in interference and attainment of the required C/I are conventionally achieved by dividing the total available resource into fractions, each of which is assigned to a particular cell.

For example, the total operating bandwidth W can be divided into N equal operating frequency bands (i.e., B=W/N) and each cell can be assigned to one of the N frequency bands. The frequency bands are periodically reused to achieve higher spectral efficiency. For a 7-cell reuse pattern such as that supported by FIG. 1, cell 102a may be assigned the first frequency band, cell 102b may be assigned the second frequency band, and so on.

A communications system is typically designed to conform to a number of system requirements that may include, for example, quality of service (QOS), coverage, and performance requirements. Quality of service is typically defined as every terminal in the coverage area being capable of achieving a specified minimum average bit rate a prescribed percentage of the time. For example, the system may be required to provide any terminal a minimum average bit rate of at least 1 Mbps for 99.99% of the time. The coverage requirement may dictate that a percentage (e.g., 99%) of the terminals with received signal levels exceeding a particular C/I threshold achieve the specified grade of service. And the performance requirements may be defined by a minimum average bit rate, a particular bit-error-rate (BER), a particular frame-erasure-rate (FER), or some other requirements. These requirements impact the allocation of the available resources and the system efficiency.

Figure 2:
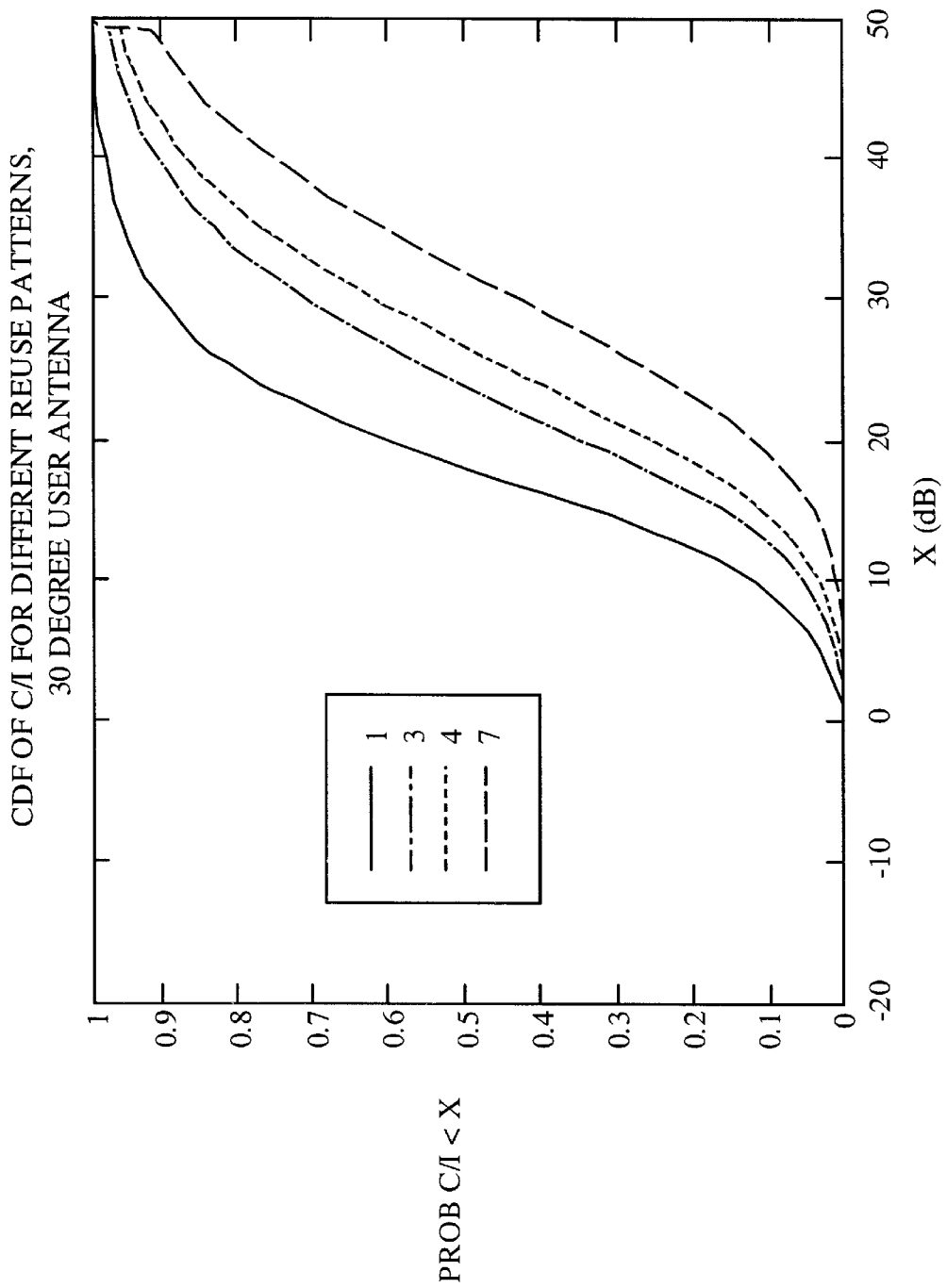
FIG. 2 is a cumulative distribution function (CDF) of the C/I achieved for a number of fixed reuse patterns for a particular communications system.

FIG. 2 is a cumulative distribution function (CDF) of the C/I achieved for a number of reuse patterns for a particular communications system. The horizontal axis, x, represents the C/I, and the vertical axis represents the probability that a particular terminal achieved a C/I less than that shown in the horizontal axis (i.e., P(C/I<x)). As shown in FIG. 2, virtually no terminals achieve a C/I worse than 0. FIG. 2 also shows that the probability of greater C/I increases with greater reuse (i.e., the P(C/I>x) for the 7-cell reuse pattern is greater than the P(C/I>x) for the 1-cell reuse pattern).

The C/I CDF in FIG. 2 can be used to characterize the performance of the communications system. As an example, assume that a C/I of at least 10 dB is required to meet a minimum instantaneous bit rate of 1 Mbps for 99.99% of the time. Using a reuse of one (i.e., every cell reuses the same channel), the probability of not achieving the required performance (i.e., the outage probability) is approximately 12%. Similarly, cell reuses of three, four, and seven correspond to outage probabilities of 5.4%, 3.4%, and 1.1%, respectively. Thus in order to achieve a 10 dB C/I 99.99% of the time for 99% of the users, a reuse of at least 7 is required in this example.

A number of modulation schemes can be used to modulate the data prior to transmission. Such modulation schemes include M-ary phase shift keying (M-PSK), M-ary quadrature amplitude modulation (M-QAM), and others. The spectral efficiency of a number of bandwidth efficient modulation schemes, which is quantified as the number of bits transmitted per second per Hertz (bps/Hz), is provided in column 2 of Table 1. The required C/I to achieve a particular bit error rate (e.g., a BER of 1%) is provided in column 3 of Table 1.

TABLE 1

| Modulation Scheme | Modulation Efficiency (bps/Hz) | Required C/I (in dB) for 1% BER |
|---|---|---|
| BPSK | 1 | 4.3 |
| QPSK | 2 | 7.3 |
| 8-PSK | 3 | 12.6 |
| 16-QAM | 4 | 14.3 |
| 32-QAM | 5 | 16.8 |
| 64-QAM | 6 | 20.5 |

Using the cumulative distribution function of the achievable C/I in FIG. 2 and the achievable modulation efficiency as a function of C/I in Table 1, the average channel efficiency, $E_{CH}$, of each reuse scheme can be determined as a weighted sum of the modulation efficiencies, with the weighting being determined by the probability of achieving the required C/I. For example, if BPSK through 64-QAM are employed by the system whenever possible, the average channel efficiency can be computed as follows:

$$E_{CH}=1 \cdot P(4.3<C/I<7.3)+2 \cdot P(7.3<C/I<12.6)+3 \cdot P(12.6<C/I<14.3)+ 4 \cdot P(14.3<C/I<16.8)+5 \cdot P(16.8<C/I<20.3)+6 \cdot P(20.5<C/I)$$

The average channel efficiencies for various reuse patterns (e.g., 1-cell, 3-cell, 5-cell, and 7-cell) are given in column 2 of Table 2. The average spectral (i.e., overall) efficiencies are also provided in column 3 of Table 2, and are computed by dividing the average channel efficiencies by the reuse factors. From Table 2, it can be observed that the average channel efficiency increases as reuse increases. However, this gain in channel efficiency with increasing reuse is more than offset by the loss in overall spectral efficiency that results from allowing only a fraction of the terminals to simultaneously use each channel. Thus, the overall spectral efficiency decreases with increasing reuse.

TABLE 2

| Cell Reuse | Average per Channel Efficiency (bps/channel) | Average Spectral Efficiency (bps/Hz/cell) |
| --- | --- | --- |
| 1 | 4.4 | 4.4 |
| 3 | 5.18 | 1.73 |
| 4 | 5.4 | 1.35 |
| 7 | 5.75 | 0.82 |

Adaptive Reuse Schemes

The invention provides adaptive reuse schemes that allow the available system resources (i.e., the spectrum) to be shared in a more efficient manner when and where possible to achieve greater efficiency and to meet system requirements. In accordance with the adaptive reuse schemes of the invention, a reuse plan is defined and each cell is initially allocated a fraction of the total available system resources. The allocation can be such that each cell can simultaneously utilize a large portion of the total available resources, if desired or necessary. The initial allocation may resemble a fixed reuse scheme and may include, for example, a subset of the available channels, a set of channels along with their peak allowed transmit power levels, or some other allocations, as described below.

At low system loads, each cell transmits to users using the allocated resources. As the loads increase or the system characteristics change, the system resources may be reallocated to better match the system conditions. In some adaptive reuse schemes, resource constrained cells may be able to transmit to some of the users in their cells using resources that have been allocated to other cells. All or a portion of the allocated resources for a particular cell may also be temporarily reallocated, suspended, or curtailed as necessary (e.g., to provide the required C/I for disadvantaged users).

The invention thus provides techniques to dynamically and/or adaptively allocate resources to cells and for cells to dynamically and/or adaptively assign resources to users to meet system requirements and achieve high efficiency. The ability to reconfigure and reallocate resources enables the system of the invention to achieve the level of efficiency and performance not matched by systems that employ conventional non-adjustable, fixed reuse schemes. Various aspects, embodiments, and implementations of the invention are described in further detail below.

The invention can be applied to any communications systems that experience interference. For example, the invention can be applied to wireless (e.g., cellular) communications systems, satellite communications systems, radio communications systems, and other systems in which reuse can improve performance. In particular, the invention can be advantageously employed to improve the spectral efficiency of a fixed-terminal, multiple access communications system designed to accommodate high data rate services.

The invention recognizes that only a fraction of users are typically disadvantaged in a communications system and exploits this observation in order to improve the average reuse and thus attain high efficiency. In a typical communications system, a large percentage of the users in the system observe a C/I that equals or exceed a set point required for the desired level of performance. (The set point is a particular C/I required to achieve the desired level of performance, e.g., average data rate at 1% BER or 0.01% outage probability, or some other criterion.) For these users, a unity reuse pattern may be employed to achieve high efficiency. For the fraction of users that have C/I below the set point, some other reuse schemes and/or some other techniques can be employed to provide the required performance. In accordance with an aspect of the invention, the reuse schemes can be dynamically and/or adaptively adjusted based on a number of factors such as, for example, the observed loading conditions, system requirements, and others.

Figure 3:
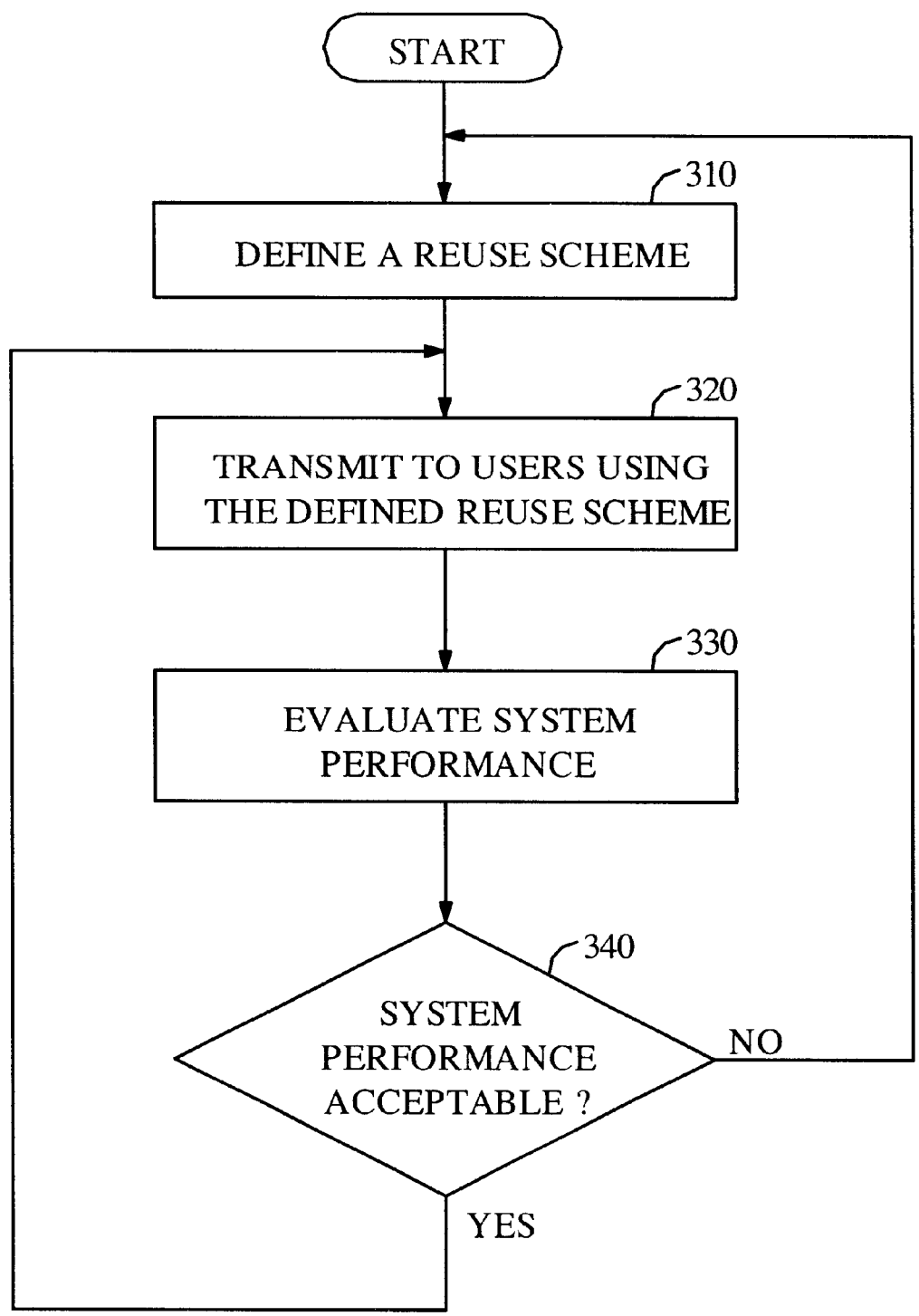
FIG. 3 is a flow diagram that generally describes the operation of a communications system in accordance with some embodiments the invention.

FIG. 3 is a flow diagram that generally describes various aspects of the communications system of the invention. Initially, at step 310, a reuse scheme is defined in a manner to be described in further detail below. The reuse scheme covers various aspects such as a particular reuse pattern, a particular reuse cell layout, the resource allocation to the cells, the operating parameters, and so on. The reuse scheme provides a framework for operation by the system. The system then operates in normal manner and transmits to users in accordance with the defined reuse scheme, at step 320. During the course of normal operation, the system performance is evaluated, at step 330. Various parameters and performance metrics may be evaluated, as described below.

A determination is then made whether the system performance is acceptable, at step 340. If the system performance is not acceptable, the process returns to step 310 and the reuse scheme is redefined. The redefined reuse scheme may include changes to the various operating parameters, and may even include the selection of another reuse pattern and/or reuse cell layout. For example, if excessive interference is encountered, the reuse pattern may be increased (e.g., from 3-cell to 7-cell). Otherwise, if the system performance is acceptable, the system returns to step 320 and continue to transmit to users. Steps 310 through 340 form an ongoing process while the system is operational.

Figure 4:
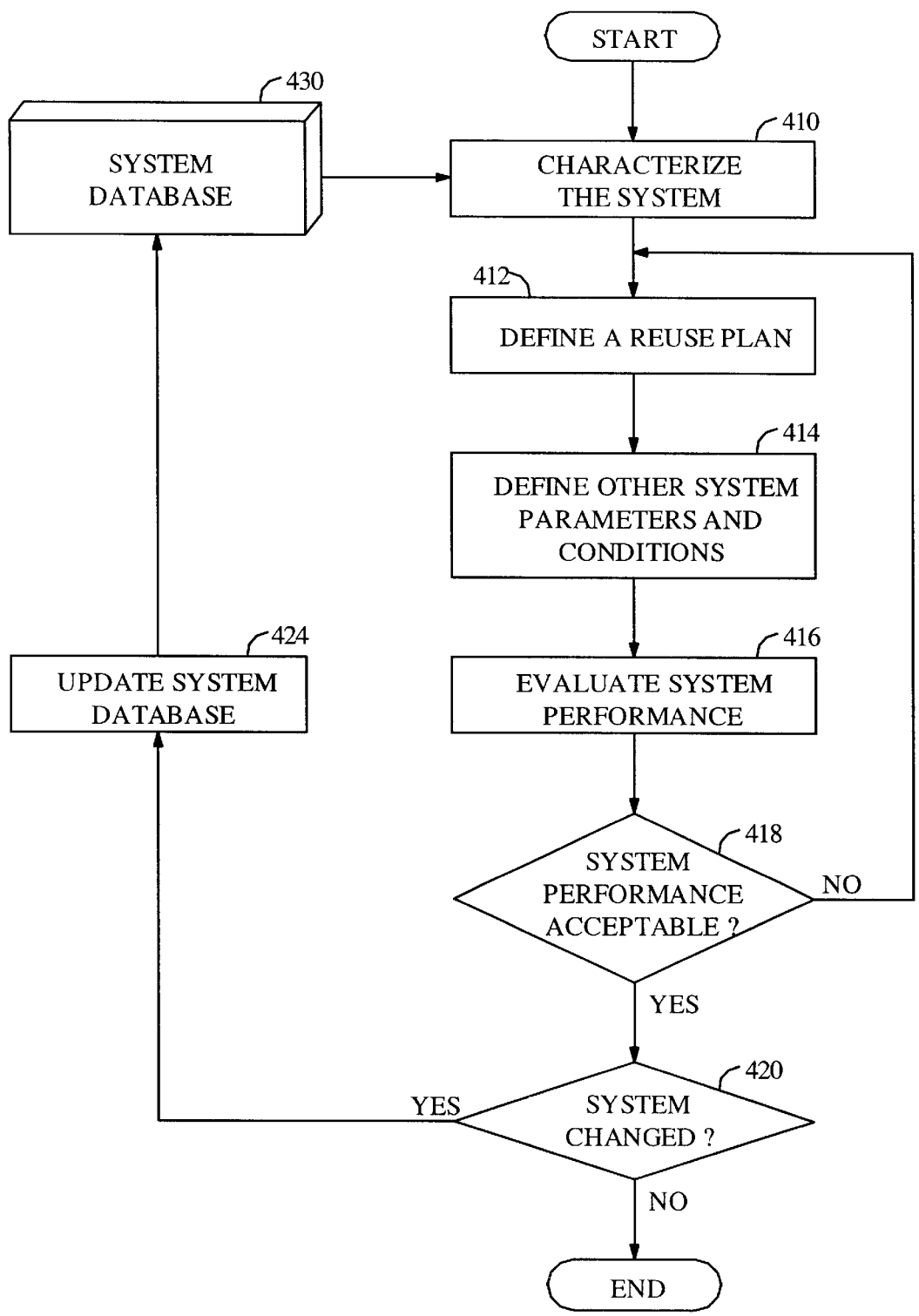
FIG. 4 is a flow diagram of a specific implementation of an adaptive reuse scheme of the invention.

FIG. 4 is a flow diagram of a specific implementation of an adaptive reuse scheme of the invention. In an embodiment, the development and adaptation of the reuse scheme to changing system conditions are performed concurrent with normal operation of the system. Thus, some of the steps in FIG. 4 correspond to similar steps in FIG. 3.

Initially, the communications system is characterized, at step 410, for one or more parameters and using information collected from the system. Such information may be stored in a system database 430. For example, the interference experienced by the users in each cell may be determined and an interference characterization may be developed, as described below. The interference characterization can be performed on a per cell basis, and typically involves characterizing the average interference levels for all users in each cell. The information used for the interference characterization may include, for example, the C/I CDF of the cell, an interference constraint matrix for each user served by each cell, and others. Each interference constraint matrix describes the interference power levels, above a particular threshold level, observed by the user from other cells. The probability of the cells transmitting on the available channels may also be collected and analyzed, as described below. The information used for the characterization can be updated periodically to account for new cells and users, and to reflect any changes in the system.

A reuse plan is then defined using the developed system characterization and other system constraints and considerations, at step 412. The reuse plan typically includes defining the size $N_r$ of a reuse cluster (i.e., the reuse number) and an initial cell reuse layout with the defined reuse cluster. For example, the reuse cluster may correspond to a 1-cell, 3-cell, 7-cell, or 19-cell reuse pattern. The selection of reuse cluster and the design of the reuse layout can be achieved based on the data developed in step 410.

Additional system parameters and/or operational conditions are then defined, at step 414. This typically includes partitioning the total available system resources into channels, with the channels corresponding to time units, frequency bands, or some other units, as described below. The number of channels employed may be based on the reuse plan defined in step 412. The available channels are then associated into sets and each cell is allocated a respective channel set. The sets can include overlapping channels (i.e., a particular channel can be included in more than one set). Resource partition and allocation are described in further detail below Other parameters that are also typically defined include, for example, the scheduling interval, the operating set points of the cells in the system, the back-off factors associated with the allocated channel set, the back-off factor limits, the step sizes for adjustments to the back-off factors, and others. The back-off factors determine the reductions in the peak transmit power levels for the channels. The parameters and conditions, which are described in further detail below, are akin to a set of operating rules to be followed by the cells during normal operation.

At step 416, the performance of the system is then evaluated for the defined reuse plan. Such evaluation may includes, for example, determining the effective link margins experienced by users in the system, the outage probabilities, the throughputs, and other measures of performance. For example, the effective link margin for the users in each channel in each cell can be computed. Based on the computed link margins, an estimate of the average throughput of the system can be developed as well as the individual performance of the users.

Once the system performance is evaluated, a determination is made on the effectiveness (i.e., the performance) of the defined reuse plan, at step 418. If the system performance does not conform to a set of system requirements, the process returns to step 412 and the reuse plan is redefined. Steps 412 through 418 are performed iteratively until the system goals are achieved.

If the system performance does conform to the system requirements, a determination is then made whether the system has changed, at step 420. If there are no changes, the process terminates. Otherwise, system database 430 is updated, at step 424, with the system characterization performed at step 410. The system is then recharacterized, at step 410, to reflect the changes in the system. The steps in FIG. 4 are described in further detail below.

The process shown in FIG. 4 can be performed periodically or whenever system changes are detected. For example, the process can be performed as the system grows or changes, e.g., as new cells and users are added and as existing cells and users are removed or modified. This process allows the system to adapt to changes, for example, in the user distribution, topology, and topography.

The invention covers a number of aspects including (1) the design and adaptation of a reuse scheme, (2) the allocation of resources (i.e., channels) to the cells, (3) the scheduling of transmissions for users, (4) the assignment of the allocated channels by the cells to users, (5) the parameters to be used in the channel assignments, and others. Each of these aspects is described in further detail below.

Channel Structures

In accordance with the invention, the resource sharing among cells and users can be achieved using a number of different multiplexing schemes including time division multiplexing (TDM), frequency division multiplexing (FDM), code division multiple access (CDMA), and random access techniques. Other multiplexing schemes, and combinations thereof, may also be used and are within the scope of the invention. The available system resources are partitioned into fractions using the selected multiplexing scheme(s).

For TDM-based schemes, the transmission time is partitioned into time units (e.g., time slots, frames, or some other units), and each cell is allocated a number of time slots. For each time unit, the total operating bandwidth of the system can be assigned to one or more users by the cell allocated with that time unit. For FDM-based schemes, the total operating bandwidth can be divided into a number of frequency bands (or sub-bands), and each cell is allocated a number of frequency bands. The cells can (continuously) transmit to users using the allocated frequency bands. For CDMA-based schemes, codes can be allocated to users based on demand. For all multiplexing schemes, the available resources are allocated in a manner to achieve high efficiency.

Figure 5:
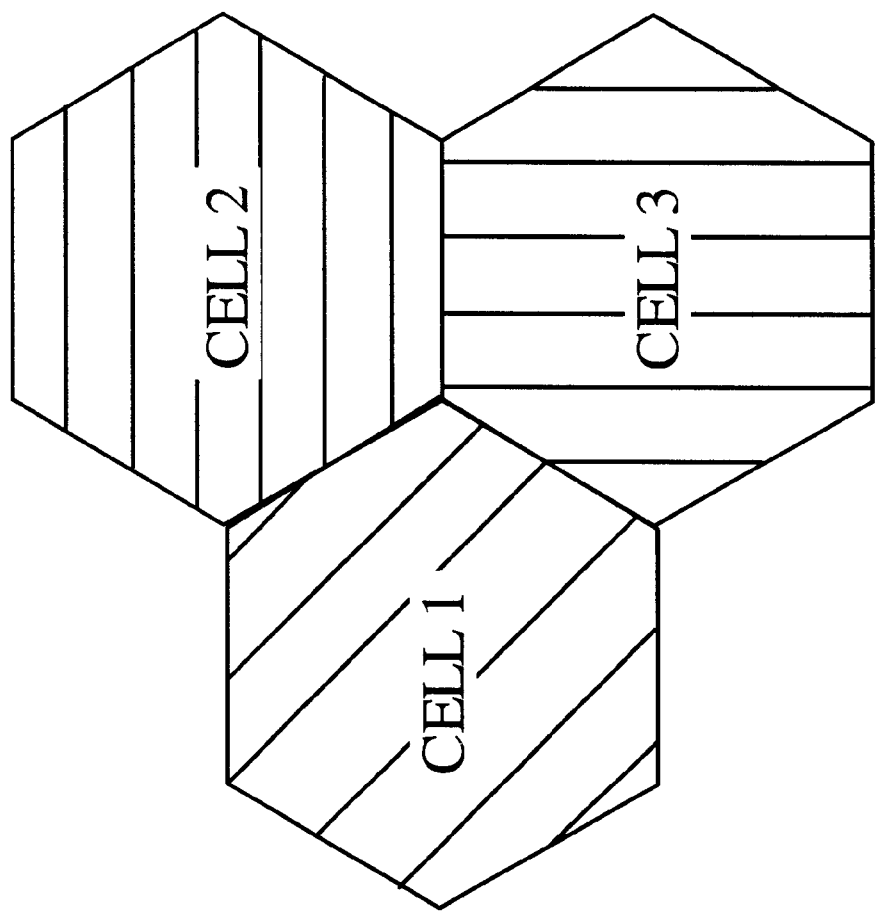
FIG. 5 is a diagram of a 3-cell system capable of employing some embodiments of the adaptive reuse scheme of the invention.

FIG. 5 is a diagram of a 3-cell system that employs some embodiments of the adaptive reuse scheme of the invention. For simplicity, some aspects and embodiments of the invention are described below in the context of the 3-cell system. However, the specific details are intended to be illustrative, and not limitations, of the invention. It will be recognized that alternative implementations of the invention and modifications and variations of the aspects and embodiments described herein can be made, and these modifications, and variations are all within the scope of the invention.

Figure 6:
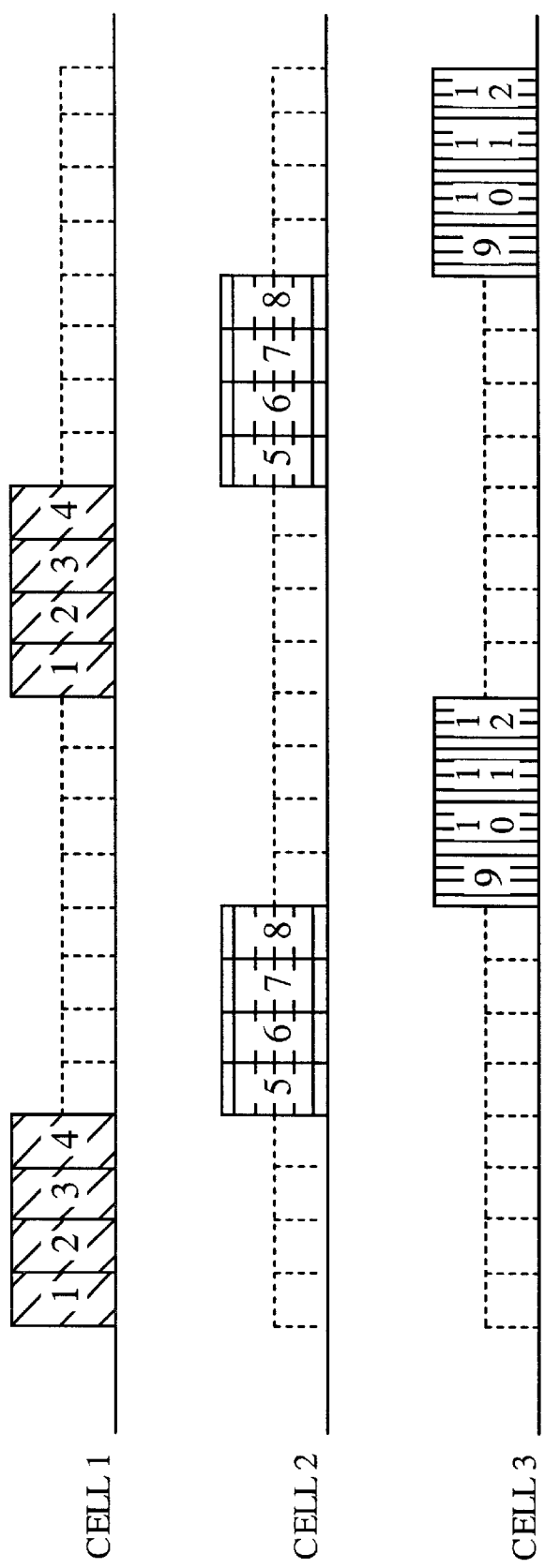
FIG. 6 is a diagram of an embodiment of a resource partitioning and allocation for the 3-cell system shown in FIG. 5.

FIG. 6 is a diagram of an embodiment of a resource partitioning and allocation for the 3-cell system shown in FIG. 5. In this example, the system resource is divided into 12 fractions. The division can be implemented in the time or frequency domain, or a combination of these. Thus, the horizontal axis can represent either time of frequency, depending on whether TDM or FDM is employed. For example, the 12 fractions can represent 12 time division multiplexed time slots for a TDM-based scheme or 12 frequency bands for a FDM-based scheme. Each of the fractions is also referred to herein as a "channel".

For the 3-cell system, the partitioned system resources are then associated into three sets of channels, and each cell is initially allocated one of the channel sets. Each channel set includes some of all of the 12 available channels depending on the particular reuse scheme being employed. For example, in the embodiment shown in FIG. 6, cell 1 is allocated channels 1 through 4, cell 2 is allocated channels 5 through 8, and cell 3 is allocated channels 9 through 12. In some other embodiments, each cell may be allocated a respective channel set that includes one or more channels allocated to other cells. In these embodiments, each cell may be assigned a set of back-off factors that determines the maximum power that the cell can transmit on each of the channels. For all embodiments, the allocated channels may also change dynamically and/or adaptively based on, for example, the operating conditions (e.g., the system load).

At low loads, each of the cells assigns users to the "better" allocated channels. For the channel allocation shown in FIG. 6, users in cell 1 are assigned to channels 1 through 4, users in cell 2 are assigned to channels 5 through 8, and users in cell 3 are assigned to channels 9 through 12. When the load in each cell is four users or less, there is no co-channel interference from the adjacent cells, and each user should be able to achieve its set point. When the load in any of the cells exceeds four users, then that cell may assign the additional user to a channel that may not be "orthogonal" to those of the other cells. Since the load typically varies independently in each cell, it is possible that the non-orthogonal channel assigned will not be occupied by any of the adjacent cells. The probability of this event (i.e., the probability of "non-collision") is a function of the load in each of the adjacent cells.

In accordance with certain embodiments of the invention, a subset of the available channels in a cell can be provided with some form of "protection". The protection can be achieved, for example, by reserving a set of channels on a periodic basis for exclusive use by the cell. The exclusivity may also be defined to be exercisable only when required, and only to the extent required to satisfy disadvantaged active users. The protected channels may be identified to neighbor cells by various means. For example, a cell may communicate to its neighboring cells a list of channels that are protected. The neighbor cells then temporarily reduce the transmit power on the protected channels by a particular amount or stop transmission on the protected channels. Channel protection can be used to serve disadvantaged users that cannot achieve the desired C/I because of excessive interference from the neighbor cells. For these cases, the channel protection can be removed once the requirements of the disadvantaged users are satisfied.

In accordance with certain embodiments of the invention, the cells can impose "blocking" (i.e., no transmission) on themselves on certain channels if the channel conditions deteriorate to an unacceptable level (e.g., if the FER is above a certain percentage, or the outage probability exceeds a particular threshold value). Each cell can measure the performance of the channels and self-impose blocking on poor performing channels until there is reasonable certainty that the channel conditions has improved and that reliable communications can be achieved.

The channel protection and blocking can be performed dynamically and/or adaptively based on, for example, the conditions of the cell.

Power Back-Off Factors

In accordance with an aspect of the invention, the transmit power from the cells may be constrained (i.e., backed-off) in a defined manner to improve performance and efficiency. For a particular cell, it is likely that some users are more immune to other-cell interference than some other users. By imposing a back-off structure that takes advantage of this fact, improvement in the system throughput and performance can be realized.

The power back-off can be applied in one or more selected channels, at one or more selected time slots, or by one or more selected cells, or a combination thereof. The power back-off can additionally or alternatively be applied to selected users in the cell. The back-off can be achieved by operating the cell at a particular back-off from a maximum transmit power level, by limiting the transmit power to a particular power limit, or by completely turning off the transmit power of the cell. In an embodiment, each cell applies a back-off based on the operating conditions of the cell such that the desired performance is provided while limiting the interference to users in other cells A power back-off scheme can be designed based on a number of parameters. For example, the power back-off scheme can be designed to take into consideration the characteristics of the users, the loading conditions, the required performance, and so on. The power back-off scheme can also be adjusted to account for changes in any of the parameters.

In a specific embodiment, the power back-off is selected based on the distribution of the C/I of the total ensemble of users in the cell. (A non-uniform weighting of these users can be applied, for example, based on their usage profile, and so on. This weighting can be made adaptive and/or dynamic, e.g., time-of-day dependent). Initially, the C/I can be measured by the users based on, for example, pilots transmitted by the cells. Concurrently, the users can also measure the interference levels (I) from the cells, which may then be used later to control the transmit power of the cells causing excessive interference, as described below. The measured received signal level from the primary or home cell (i.e., C) plus the received signal levels from the other cells are reported to the primary cell, which then collects and characterizes the effective C/I CDF for the cell. Alternatively, the primary cell may be provided with the C/I characterization.

A number of assumptions can be made to simplify the C/I characterization. For example, the interfering cells may be assumed to be operating at full power. The C/I distribution provides an indication of the percentage of users in the cell that have a C/I greater than a particular C/I value when all cells are transmitting at full power.

Figure 7:
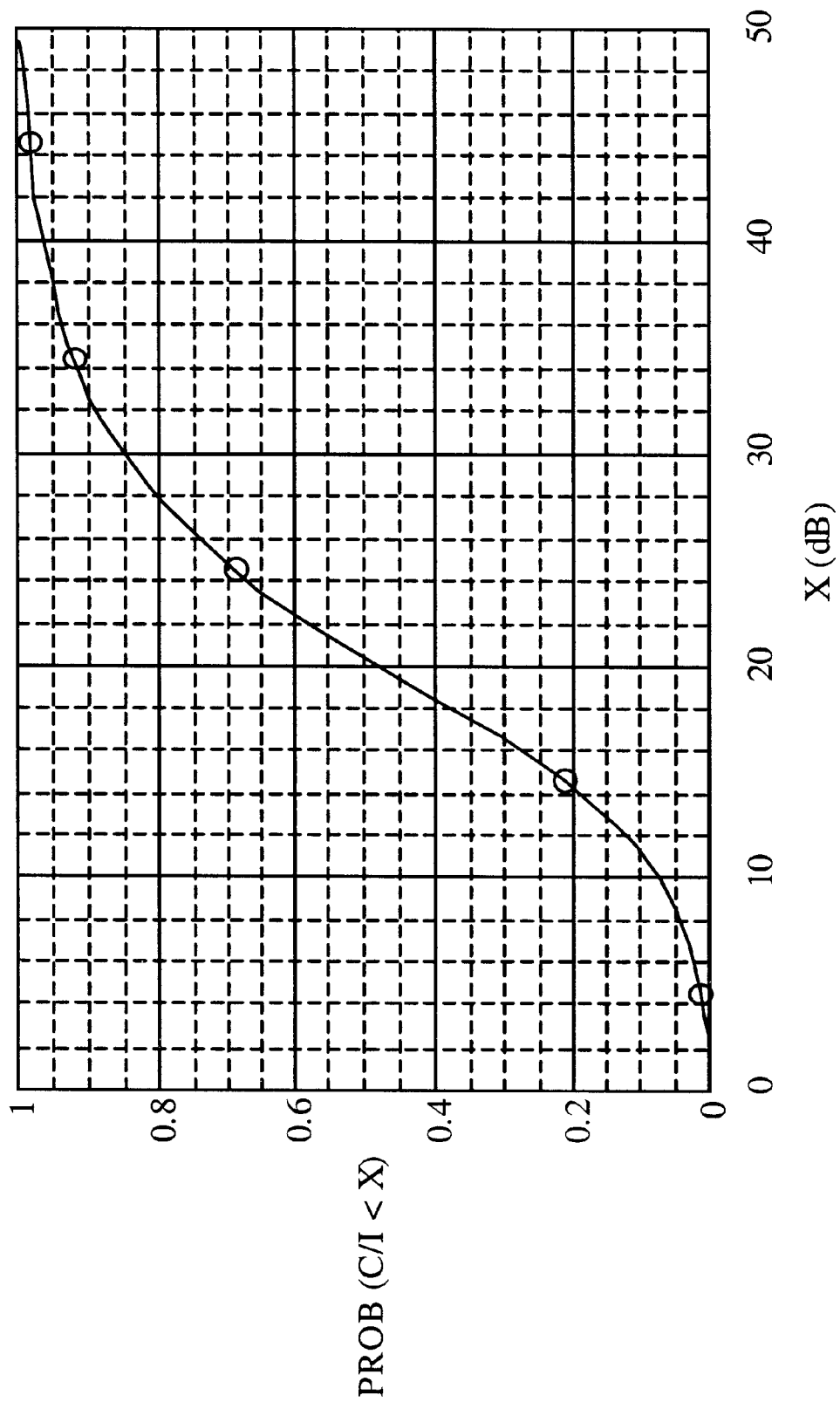
FIG. 7 is a CDF of the achieved C/I for a 1-cell reuse pattern with all cells transmitting at full power.

FIG. 7 is an example of a cumulative distribution function (CDF) of the achieved C/I for a 1-cell reuse pattern with all cells transmitting at full power. Using the C/I distribution shown in FIG. 7, the population of users can be segmented into sets, with each set corresponding to users experiencing similar other-cell interference (i.e., having C/I within a range of values). As an example, the CDF shown in FIG. 7 can be partitioned into $N_c = N_r \cdot N_s$ sets, where $N_r$ is the number of cells in the reuse cluster and $N_s$ is the number of orthogonal channels allocated per cell in the cluster. For the following example, $N_s=4$ and $N_r=3$, giving $N_c=12$. In the following example, the sets are selected to be equal size (i.e., the same percentage of users is included in each set), although non-equal size set partitions can also be defined.

Table 3 identifies the $N_c=12$ user sets and tabulates the minimum C/I for the users in each of the 12 user sets. Since there are 12 user sets and each set is equal size, each set includes approximately 8.3% of the users in the cell. The first set includes users having C/I of 10 dB or less, the second set includes users having C/I ranging from 10 dB to 13 dB, the third set includes users having C/I ranging from 13 dB to 15 dB, the fourth set includes users having C/I ranging from 15 dB to 17 dB, and so on, and the last set includes users having C/I greater than 34.5 dB.

TABLE 3

| User Set | Minimum C/I in Range (dB) | s(n) (dB) | β(n) |
| --- | --- | --- | --- |
| 1 | <10 | <−5 | 1.0000 |
| 2 | 10 | −5 | 1.0000 |
| 3 | 13 | −2 | 1.0000 |
| 4 | 15 | 0 | 1.0000 |
| 5 | 17 | 2 | 0.6310 |
| 6 | 18.5 | 3.5 | 0.4467 |
| 7 | 20.5 | 5.5 | 0.2818 |
| 8 | 22 | 7 | 0.1995 |
| 9 | 24 | 9 | 0.1259 |
| 10 | 26 | 11 | 0.0794 |
| 11 | 29.5 | 14.5 | 0.0355 |
| 12 | >34.5 | >19.5 | 0.0112 |

From FIG. 7 and Table 3, it can be seen that users within the cell have different C/I characteristics. These users may be able to achieve different levels of performance or, for a particular level of performance, may require different transmit power levels.

As an example, the cell may be required to support a particular set point γ (i.e., a minimum required C/I) in order to operate at a desired data rate with an acceptable error rate. In typical systems, the set point γ is a function of the instantaneous data rate selected by the users, and may thus varies from user to user. In a simple example, it is assumed that a set point γ of 15 dB is required by all users in the cell. The minimum link margin s(n) for each set of users can then be computed as:

$$s(n) = \min\{C/I(n)\} - \gamma; \quad n = 1, 2, \ldots, N_c.\quad \text{Eq (1)}$$

The minimum link margin s(n) for each set of users is the difference between the minimum C/I of the users in the set and the set point γ. The minimum link margin s(n) represents the deviation from the required transmit power to the set point based on the assumption of full transmit power from all cells. A positive link margin indicates that the C/I is greater than necessary to achieve the desired level of performance defined by the set point γ. Thus, the transmit power to these users may be reduced (i.e., backed-off) by the amount of the margin and still provide the desired level of performance.

If the maximum transmit power level is normalized as 1.0, the normalized back-off factor for each set of users can be expressed as:

$$\beta(n) = \min(1., 10^{-0.1 \cdot s(n)}); \quad n = 1, 2, \ldots, N_c. \quad \text{Eq (2)}$$

The back-off factor associated with a particular user set represents the reduction in the transmit power that can be applied to that set of users while still maintaining the desired set point γ, and thus the desired level of performance. The back-off in power is possible because these users enjoy better C/I. By reducing the transmit power to an active user by the back-off factor, the interference to users in other cells can be reduced without impacting the performance of the active user.

Table 3 lists the minimum link margin s(n) and the back-off factor for each set of users for a set point γ of 15 dB. As shown in Table 3, channels 1 through 4 have link margins of 0 dB or less and channels 5 through 12 have progressively better link margins. Consequently, channels 1 through 4 are operated at full power and channels 5 through 12 are operated at progressively reduced power. The back-off factors may be imposed on transmissions to users in the associated user sets. For example, since the users in set 5 have C/I of 17 dB or better and a minimum link margin s(n) of 2 dB, the transmit power to these user may be backed-off to 0.6310.

For users having C/I that are below the set point γ, a number of options can be applied. The data rate of the transmission to these users may be reduced to that which can be supported by the C/I. Alternatively, the interferer(s) that cause the low C/I may be requested to (temporarily) reduce their transmit power or stop transmitting in the affected channel(s) until the low C/I users are satisfactorily served.

In an embodiment, once the back-off factors are determined for one cell in a reuse pattern, the back-off factors for other cells in the reuse pattern can be staggered. For example, for a $N_r = 3$ (i.e., 3-cell) reuse pattern that operates with 12 channels and uses an $N_s = 4$ channel offset, the back-off factors for cell 2 can be offset by four modulo-$N_c$ and the back-off factors for cell 3 can be offset by eight modulo-$N_c$. For this reuse pattern, cell 1 applies the back-off factors associated with channel set 1 (which includes the channels and their back-off factors shown in Table 3), cell 2 applies the back-off factors associated with channel set 2 (which includes the channels and back-off factors shown in Table 3 but shifted down by four channels and wrapped around), and cell 3 applies the back-off factors associated with channel set 3 (which includes the channels and back-off factors shown in Table 3 but shifted down by eight channels and wrapped around). A 4-channel offset is employed in this example, but other offsets can also be used.

Table 4 tabulates the back-off factors for cells 1 through 3 using the back-off factors shown in Table 3 and a four-channel offset. For example, for channel 1, cell 1 applies the back-off factor associated with channel 1 of set 1, cell 2 applies the back-off factor associated with channel 9 of set 1, and cell 3 applies the back-off associated with channel 5 of set 1.

TABLE 4

| Channel, n | $\beta_1(n)$ | $\beta_2(n)$ | $\beta_3(n)$ |
|---|---|---|---|
| 1 | 1.0000 | 0.1259 | 0.6310 |
| 2 | 1.0000 | 0.0794 | 0.4467 |
| 3 | 1.0000 | 0.0355 | 0.2818 |
| 4 | 1.0000 | 0.0112 | 0.1995 |
| 5 | 0.6310 | 1.0000 | 0.1259 |
| 6 | 0.4467 | 1.0000 | 0.0794 |
| 7 | 0.2818 | 1.0000 | 0.0355 |
| 8 | 0.1995 | 1.0000 | 0.0112 |
| 9 | 0.1259 | 0.6310 | 1.0000 |
| 10 | 0.0794 | 0.4467 | 1.0000 |
| 11 | 0.0355 | 0.2818 | 1.0000 |
| 12 | 0.0112 | 0.1995 | 1.0000 |

The back-off factors shown in Table 4 are derived based on the C/I CDF in FIG. 7, which is generated with the assumption that other cells in the system are transmitting at full power. However, when the back-off factors are applied along with a staggered channel reuse scheme as shown in Table 4, the actual C/I values observed by the users in the cell may be greater than the minimum C/I values provided in column 2 of the Table 3 since the interference from other cells is reduced by the applied back-off factors.

Table 5 shows the improvement in the C/I realized using the 3-cell reuse pattern, a staggered channel offset, power back-off, and assuming equal received power levels from cells 2 and 3 are observed. Column 1 gives the channel indices 1 through 12. Column 2 provides the minimum C/I associated with the 12 channels when the other cells operate at full power. Column 2 is computed with a user in set 1 assigned to channel 1, a user in set 2 assigned to channel 2, and so on, and a user in set 12 assigned to channel 12.

Column 3 gives the minimum link margins s(n) for the 12 channels with the minimum C/I in column 2. The values for s(n) are given assuming a set point γ=15 dB. Columns 4, 5, and 6 give the back-off factors for cells 1, 2, and 3, respectively, and are computed based on the link margins provided in column 3. Column 7 gives the effective increase in the link margins s(n) shown in column 3 as a result of using the 3-cell reuse pattern and the power back-off factors shown in columns 4 through 6 for a user seeing equal power levels from cells 2 and 3. In this example the effective margin $\hat{s}_n$ can be expressed as:

$$\hat{s}(n) = 10 \cdot \log_{10}[(I_2 + I_3)/(I_2 \cdot \beta_2(n) + I_3 \cdot \beta_3(n))]$$
$$= 10 \cdot \log_{10}[2/(\beta_2(n) + \beta_3(n))], \quad I_2 = I_3.$$

The last column in Table 5 gives the effective C/I for the users assigned to channels 1 through 12, and can be expressed as:

$$C/I_{eff}(n) = \gamma + \min(0, s(n)) + \hat{s}(n).$$

TABLE 5

| Channel, n | $C/I_{min}(n)$ (dB) | s(n) (dB) | $\beta_1(n)$ | $\beta_2(n)$ | $\beta_3(n)$ | $\hat{s}(n)$ (dB) | $C/I_{eff}(n)$ (dB) |
|---|---|---|---|---|---|---|---|
| 1 | <10 | <-5 | 1.0000 | 0.1259 | 0.6310 | 4.2202 | <14.2202 |
| 2 | 10 | -5 | 1.0000 | 0.0794 | 0.4467 | 5.7995 | 15.7995 |
| 3 | 13 | -2 | 1.0000 | 0.0355 | 0.2818 | 7.9953 | 20.9953 |
| 4 | 15 | 0 | 1.0000 | 0.0112 | 0.1995 | 9.7727 | 24.7727 |
| 5 | 17 | 2 | 0.6310 | 1.0000 | 0.1259 | 2.4953 | 17.4953 |
| 6 | 18.5 | 3.5 | 0.4467 | 1.0000 | 0.0794 | 2.6783 | 17.6783 |
| 7 | 20.5 | 5.5 | 0.2818 | 1.0000 | 0.0355 | 2.8589 | 17.8589 |
| 8 | 22 | 7 | 0.1995 | 1.0000 | 0.0112 | 2.9618 | 17.9618 |
| 9 | 24 | 9 | 0.1259 | 0.6310 | 1.0000 | 0.8859 | 15.8859 |
| 10 | 26 | 11 | 0.0794 | 0.4467 | 1.0000 | 1.4066 | 16.4066 |
| 11 | 29.5 | 14.5 | 0.0355 | 0.2818 | 1.0000 | 1.9320 | 16.9320 |
| 12 | >34.5 | >19.5 | 0.0112 | 0.1995 | 1.0000 | 2.2202 | >17.2202 |

As shown in

Table 5, the effective C/I for the users assigned to channels 1 through 12 increases as the result of operating the other cells at reduced transmit power. Without the power back-off, the users assigned to channels 1 through 3 were not able to achieved the set point of 15 dB. With the power back-off, all users except for the user assigned to channel 1 are able to achieve the 15 dB set point.

An actual system typically does not fit the idealized system model described above. For example, non-uniform distribution of users, non-uniform cell site placement, varied terrain and morphology, and so on, all contribute to variations in the interference levels observed in each cell. Thus, the back-off factors derived for each cell will likely be different and the back-off factors for the cells in a reuse cluster may not be modulo shifted versions of each other as shown in Table 4. The effect of different C/I CDFs on the back-off factors is illustrated below.

Figure 8:
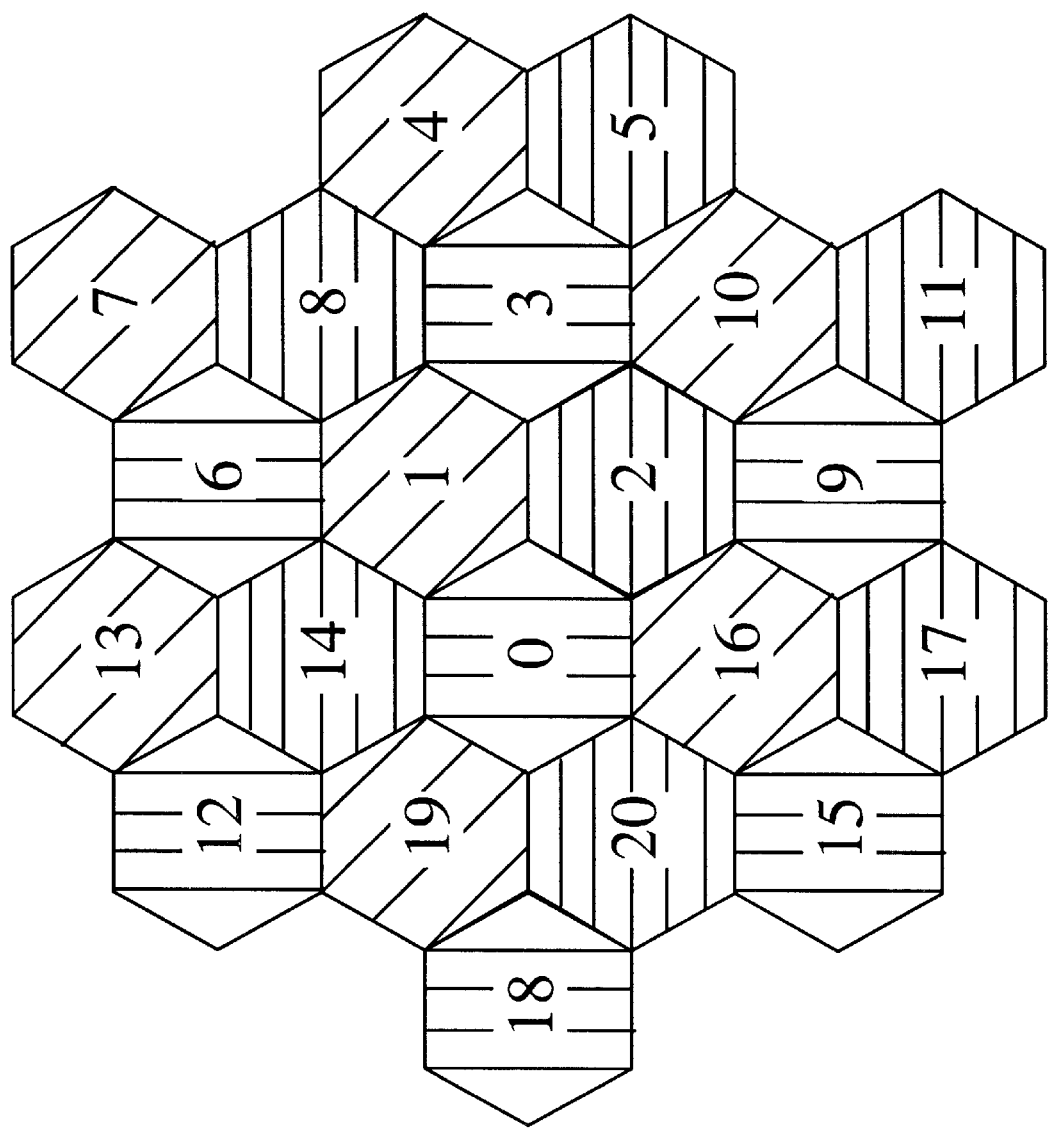
FIG. 8 is a diagram of a 21-cell system that employs 3-cell adaptive reuse scheme.

FIG. 8 is a diagram of a 21-cell system that employs 3-cell adaptive reuse scheme. In this example, twelve channels are available for communication and $N_r=3$, $N_s=4$, and $N_c=12$. For an idealized system having similar system characteristics, the channel offset assigned to each cell in the system can be selected as $N_s \cdot \text{mod}(m, N_r=3)$ such that:

cells with indices where mod(m,3)=0 are assigned a channel offset of 0, cells with indices where mod(m,3)=1 are assigned a channel offset of 4, and cells with indices where mod(m,3)=2 are assigned a channel offset of 8.

where m is the cell number (m=0, 1, 2, ... 20 in the 21-cell system). With this offset scheme, cells 0, 3, 6, ... and 18 in FIG. 8 are assigned a channel offset of 0, cells 1, 4, 7, ... and 19 are assigned a channel offset of 4, and cells 2, 5, 8, ... and 20 are assigned a channel offset of 8.

In an idealized system, if the users are uniformly distributed over the coverage area and propagation is identical in all cells of the system, the C/I CDF for each of the cells in the system is identical (assuming infinite number of cells such that the cells in the fringes have the same C/I CDF). In actuality, these conditions are not met and the C/I CDF for each of the cells is likely to be different. For example, the interference levels observed by cell 0 in the system shown in FIG. 8 are likely to be different than those observed in cell 7. In general, since the C/I CDFs are likely to be different for the cells, the back-off factors $\beta_m(n)$ can be expected to be different for each cell.

The impact to the design of the reuse plan due to different back-off factors $\beta_m(n)$ for each cell can be illustrated using an example. In this example, cell 1 is assumed to have the C/I CDF shown in FIG. 7, cell 2 is assumed to have the same CDF but shifted to the right by 3 dB (i.e., the median of the distribution moves from 20.5 dB to 23.5 dB), and cell 3 is assumed to have the same CDF but shifted to the left by 3 dB (i.e., median of 17.5 dB). In actuality, the CDFs are not likely to be shifted versions of each other and the simplified example is used here to help illustrate the impact of different $\beta_m(n)$ on the system design.

Table 6 lists the minimum link margins $s_1(n)$, $s_2(n)$, and $s_3(n)$ for cells 1, 2, and 3, respectively, in the 3-cell cluster based on (1) a partitioning of users in each cell into 12 equal-size sets, (2) an assumption that all cells transmit at full power, and (3) a common set point $\gamma=15$ dB.

Using the common set point for all three cells in the 3-cell cluster and assuming that all cells with the same index mod(m,3) have identical C/I CDFs, the back-off factors for each cell can be computed based on the common set point. The back-off factors $\beta_1(n)$, $\beta_2(n)$, and $\beta_3(n)$ for cells 1, 2, and 3, respectively, are computed using equation (2) for the minimum link margin $s_1(n)$, $s_2(n)$, and $s_3(n)$, respectively. For example, the back-off factors $\beta_2(n)$ for cell 2 are computed using the minimum link margins $s_2(n)$ shown in column 3 and offsetting the results by four channels, modulo-12. Similarly, the back-off factors $\beta_3(n)$ for cell 3 are computed using the minimum link margins $s_3(n)$ shown in column 4 and offsetting the results by eight channels, modulo-12. As shown in Table 6, the back-off factors $\beta_1(n)$, $\beta_2(n)$, and $\beta_3(n)$ are no longer shifted versions of one another. This implies that the effective link margins for the channels will be different in each of the cells.

TABLE 6

| Channel, n | $s_1(n)$ | $s_2(n)$ | $s_3(n)$ | $\beta_1(n)$ | $\beta_2(n)$ | $\beta_3(n)$ |
|---|---|---|---|---|---|---|
| 1 | <-5 | <-2 | <-8 | 1.000 | 0.063 | 1.000 |
| 2 | -5 | -2 | -8 | 1.000 | 0.040 | 0.891 |
| 3 | -2 | 1 | -5 | 1.000 | 0.018 | 0.562 |
| 4 | 0 | 3 | -3 | 1.000 | 0.006 | 0.398 |
| 5 | 2 | 5 | -1 | 0.631 | 1.000 | 0.251 |
| 6 | 3.5 | 6.5 | 0.5 | 0.447 | 1.000 | 0.158 |
| 7 | 5.5 | 8.5 | 2.5 | 0.282 | 0.794 | 0.071 |
| 8 | 7 | 10 | 4 | 0.200 | 0.501 | 0.022 |
| 9 | 9 | 12 | 6 | 0.126 | 0.316 | 1.000 |
| 10 | 11 | 14 | 8 | 0.079 | 0.224 | 1.000 |
| 11 | 14.5 | 17.5 | 11.5 | 0.035 | 0.141 | 1.000 |
| 12 | 19.5 | 22.5 | 16.5 | 0.011 | 0.100 | 1.000 |

Table 7 lists the effective link margins $\hat{s}_1(n)$, $\hat{s}_2(n)$, and $\hat{s}_3(n)$ for cells 1, 2, and 3, respectively, with the cells operating with the back-off factors $\beta_1(n)$, $\beta_2(n)$, and $\beta_3(n)$ listed in Table 6 and assuming equal received power from each cell (i.e., $I_1=I_2=I_3$). While the back-off factors were originally computed to provide 0 dB link margin when the cells are transmitting at full power, the effective link margins shown in Table 7 vary from 0 dB to over 12 dB when the cells transmit using the back-off factors.

TABLE 7

| Channel, n | $\hat{s}_1(n)$ | $\hat{s}_2(n)$ | $\hat{s}_3(n)$ |
|---|---|---|---|
| 1 | 2.74 | 3.55 | 6.55 |
| 2 | 3.32 | 5.19 | 8.19 |
| 3 | 5.38 | 7.54 | 10.54 |
| 4 | 6.95 | 9.55 | 12.55 |
| 5 | 2.04 | 2.50 | 2.74 |
| 6 | 2.37 | 2.68 | 2.84 |
| 7 | 3.64 | 2.86 | 2.93 |
| 8 | 5.82 | 2.96 | 2.99 |
| 9 | 1.82 | 0.00 | 0.89 |
| 10 | 2.13 | 0.24 | 1.41 |
| 11 | 2.44 | 1.07 | 2.69 |
| 12 | 2.60 | 1.55 | 4.55 |

As shown in Table 7, by using a common set point for cells having different C/I CDFs, the effective throughput in each cell in the cluster is different because the effective link margins are different. For example, prior to imposing the power back-off, users in cell 3 were more disadvantaged than users in the other cells since their collective C/I's are lowest. Conversely, users in cell 2 had the largest collective C/I's prior to imposing the back-off structure. However, once the back-off factors are applied, the situation is reversed and the users in cell 3 have the highest effective link margins while the users in cell 2 have the lowest effective link margins. This is because the back-off factors in cell 3 are greater (i.e., less power reduction) than that used in cells 1 and 2, thereby increasing the effective margin in the channels in cell 3 relative to the other cells.

The imbalance in the effective link margins among the cells in the cluster can be corrected by employing a different set point in each cell in the cluster. For example, by using a set point of 18 dB in cell 2 and a set point of 12 dB in cell 3 the back-off factors in each of the cells can be made identical in this specific example (i.e., since their C/I CDFs are shifted by ±3 dB). This concept can also be extended to the individual channels in the cells.

The imbalance in effective link margins shown in Table 7 can also be reduced by iteratively computing the back-off factors. For example, another set of back-off factors can be computed for the effective link margins listed in Table 7. This second set of back-off factors can be combined (i.e., multiplied) with the first set of back-off factors shown in Table 6 to provide an "effective" set of back-off factors to be applied. The cells and channels having higher effective link margins will have their transmit powers reduced accordingly. The iterative process can continue until the effective link margins for the cells no longer change appreciably from iteration to iteration or until some defined conditions are satisfied.

The characterization of the cells and the normalization of performance in cells is typically more complicated than that described above (i.e., the C/I CDFs are not likely to be shifted versions of one another as assumed in the above example). Furthermore, users in each cell typically see different levels of interference from other cells. Thus, more computations may be required to normalize the effective margins to within a particular threshold level across the cells of the system. Different set points for the cells and/or channels can be used to achieve a level of normalized performance, if so desired. The set points can also be altered to achieve non-uniform system performance.

Adjustment to the Default Back-Off Factors

In embodiments that employ power back-off, the back-off factors are computed and provided to the cells in the system. Thereafter, each cell applies the back-off factors to the channels used for transmission.

In accordance with an aspect of the invention, the initial assigned (i.e., default) back-off factors can be adjusted (i.e., modified) dynamically and/or adaptively based on, for example, changes in system loading, user characteristics, user demands, performance requirements, and so on. The back-off factors may be adjusted using numerous schemes, some of which are described below.

In an embodiment of a back-off adjustment scheme, the back-off factor(s) of the offending cell(s) are reduced during the period of time a disadvantaged user is actively communicating. As noted above, the disadvantaged user in many instances is not able to achieve the desired set point because of excessive interference from a limited number of cells.

If the disadvantaged user is unable to achieve the desired set point even when assigned to the best available channel, a condition referred to as "soft-blocking", other cells in the reuse pattern that cause the interference can have their transmit power temporarily reduced such that the disadvantaged user will be able to attain the desired set point. As an example, if the primary interference source for the disadvantaged user in cell 1 is cell 2, the transmit power of cell 2 can be backed-off by an amount (e.g., an additional 3 dB, from $\beta(n)=x$ down to $\beta(n)=0.5x$) necessary to allow the disadvantaged user to operate at the desired set point.

In the above example, if the back-off factor is applied to cell 2, then the user in cell 2 may no longer be able to meet the set point either, potentially causing further reductions in the back-off factors of other cells. Therefore, adjustments can be made to the set points employed in the specified channels of the offending cells in addition to the back-off factors. In addition, these adjustments can be made locally as well so that the set points of both cell 1 and cell 2 are reduced to values which effectively maximize their collective throughput while still meeting the outage criteria of the users in both cells.

In another embodiment of a back-off adjustment scheme, the offending cell(s) may be temporarily prevented from using a particular channel so that the disadvantaged user may be served. The back-off factor(s) $\beta(n)$ for the offending cell(s) are set to 0.0 for the effected channel(s).

In a particular communications system, the primary interference for a particular user may be co-channel interference from a cell in another reuse cluster. For example, referring to FIG. 8, the primary source of interference for a user in cell 0 in one 3-cell cluster may be cell 3 in another 3-cell cluster, which may have been assigned with the same set of back-off factors as cell 0. To reduce co-channel interference, the back-off factors for cell 3 may be modified from those of cell 0. For example, the back-off factors for cell 3 can be shifted by one or more channels, or one or more back-off factors for cell 3 may be made different than those for cell 0, or some other modifications can be made.

In a variation of a back-off adjustment scheme, one or more channels can be reserved for exclusive use by each cell in the reuse pattern. Other cells in the reuse pattern are then prevented (i.e., blocked) from transmitting on these channels. The number of reserved channels can be based on the load or system requirements, and may be adjusted dynamically and/or adaptively as the operating condition changes. Also, the cells may be allocated different number of reserved channels, again depending on the system design and conditions.

The amount of power back-off to request can be obtained in various manners. In some implementations, each cell knows the back-off factors necessary to allow disadvantaged users to operate at the desired set point. The back-off factors may be pre-computed and saved or may be determined from prior transmissions. When a disadvantaged user becomes active, the cell knows the back-off factor(s) needed for the user and communicate this to the offending cell(s).

For the embodiments in which it is desired to adjust (e.g., reduce or block) the transmit power of the offending cells, the cell requesting the back-off adjustment can convey to the offending cells the desired adjustment to the back-off factors to satisfy the requirements of the disadvantaged users. The adjustments may also be sent to other cells in the system, which may then use the information to improve the performance of these cells. The offending cells would then apply the requested back-off factors, based on a defined back-off adjustment scheme. Such adjustment scheme may define, for example, the time and duration for which to apply the adjustment. If an offending cell receives back-off requests from a number of other cells, the offending cell typically applies the maximum of the back-off factors that it receives from the requesting cells.

The request (or directive) to temporarily reduce or block the transmit power of other cells can be communicated to the offending cells such that the transmissions to the disadvantage users can be achieved. The request can be communicated dynamically to the offending cells as needed, or in an orderly manner (e.g., every few frames), or by some other methods. For example, each cell may send its neighbor cells a list of such requests at the start of each transmission frame with the expectation that the requests would be applied at the next transmission frame. Other methods for communicating requests to other cells can be contemplated and are within the scope of the present invention.

The back-off adjustment can be achieved using numerous methods. In one method, the back-off factors are sent to the neighbor cells on a dynamic basis and are applied shortly thereafter (e.g., the next frame). In another method, the back-off factors are applied at predetermined time, which is known by the affected cells.

Restoration of a back-off factor to its assigned (i.e., default) value can also be achieved using numerous methods. In one method, the original back-off factor can be restored by issuing a "restore" command to the offending cell(s). In another method, the back-off factor is gradually restores to its original value by increasing it incrementally.

In yet another method for back-off adjustment, each cell maintains a known step size for adjusting the back-off factor in each channel. Each cell maintains the current value of the back-off factor employed for each channel and a step size for increasing and decreasing the back-off factor. Thereafter, the cell adjusts the back-off factor in accordance with the associated step size each time it receives a request to reduce transmit power.

In an embodiment, each channel of a particular cell may be associated with maximum and minimum limits on the back-off factor. As an example, assume that a scheduler operating in each cell schedules on common frame boundaries, i=1, 2, 3 . . . . Further, let $\beta_m^{max}(n)$ and $\beta_m^{max}(n)$ be the maximum and minimum values for $\beta$ in channel n in cell m, and let $\delta^{up}(n)$ and $\delta^{down}(n)$ represent the step sizes for increasing and decreasing the power for channel n. The back-off adjustment at frame i in cell m for channel n can then be expressed as:

(a) If any neighbor cells send decrease power commands at frame i:

$$\beta_m(n,i) = \max[\beta_m^{max}(n), \beta_m(n,i-1) \cdot \delta^{down}(n)]$$

(b) Otherwise:

$$\beta_m(n,i) = \min[\beta_m^{max}(n), \beta_m(n,i-1) \cdot \delta^{up}(n)]$$

The maximum and minimum back-off limits can also be adjusted as desired or necessary. For example, the maximum and minimum limits can be adjusted based on system loading or requirements.

Dynamic adjustment of the back-off factors can be equated to dynamic adjustment of the system set point or the maximum permitted data rate for the channel(s), based on loading, performance, or some other measures. As the system loading increases, the set point can be adjusted (i.e., decreased) to a level that permits reliable operation in the channels. Generally, the set point for each channel can also be made adaptive. This allows the data rates associated with the channels to be set differently as desired or necessary. Adaptation of the set point in each channel can be performed locally by each cell.

Dynamic adjustment of the back-off factors can be extended such that the back-off factors for all channels in every cell can be dynamically adjusted. This feature allows the system to essentially adjust the power level in each of the channels so that the active users in the specified channels are able to meet the desired set point. The powers in the channels of adjacent cells can thus become a function, for example, of the group of active users in the local cell, their requirements, and so on. If the mix of users in a cell is such that all can achieve their set points in their assigned channels, then the default back-off factors are employed. Otherwise, additional reductions in the back-off factors (i.e., reduced transmit power) are applied temporarily in the offending neighbor cells in the specified channels and for the specified duration.

When the back-off factors are allowed to be changed dynamically, a scheduler in a particular cell may not be certain of the power being transmitted by the neighbor cells. This can result in an ambiguity in the actual operating points (i.e., the C/I) for the users in the local cell. Nevertheless, adjustments to the back-off factors can still be performed dynamically, for example, by basing the adjustments on the observed performance of the affected channel.

For example, in one implementation, the cell monitors the average frame-erasure-rate (FER) associated with a user in a specific channel. If the actual C/I is lower than the set point, there is a higher probability that a frame erasure will occur, thereby resulting in a retransmission of the error frame. The cell can then (1) reduce the data rate for the user, (2) request the offending cell(s) to reduce their transmit power on the specific channel, or do both (1) and (2).

Parameters Used for Channel Assignment

The adaptive reuse schemes of the invention provide a structure for allocating resources to users requesting data transmissions. During normal system operation, requests for data transmissions are received from various users throughout the system. The cells are then tasked to schedule the data transmissions and to assign channels to the users such that high efficiency and performance are achieved.

The scheduling of the data transmissions and the assignment of the resources to the users can be achieved based on a number of factors. Such factor may includes, for example: (1) the priority assigned to active users, (2) criteria related to fairness, and (3) one or more channel metrics. Other factors may also be taken into account, some of which are described below, and are within the scope of the present invention.

In an embodiment, data transmissions and channel assignments are performed such that higher priority users are generally served before lower priority users. Prioritization typically results in a simpler scheduling and channel assignment process and can also be used to ensure fairness among users, as described below. The users in each cell can be prioritized based on a number of criteria such as, for example, the average throughput, the delays experienced by the users, and so on. Some of these criteria are discussed below.

The priority of the user can be made a function of the amount of delay already experienced by the user. If resource allocation is achieved based on priority, a low priority user is more likely to experience longer delays. To ensure a minimum level of service, the priority of the user can be upgraded as the amount of delay experienced by the user increases. The upgrade prevents the data transmission to the low priority user to be delayed for an intolerable amount of time or possibly indefinitely.

The user's achieved C/I can also be used to determine priority. A user having a lower achieved C/I can only support a lower data rate. If the available resources are used for transmission to a user having a higher achieved C/I, the average system throughput would likely increase, thereby improving the efficiency of the system. Generally, it is more preferable to transmit to users having higher achieved C/I.

The user's payload can also be used to determine priority. A large payload typically requires a high data rate that can be supported by a smaller number of the available channels. In contrast, a small payload can typically be supported by more of the available channels. For example, the small payload may be assigned to a channel having a large back-off factor that may not be able to support a high data rate needed for a large payload. Since it is more difficult to schedule data transmission for a large payload, the user with the large payload can be assigned to a higher priority. In this way, the user with the large payload may be able to enjoy comparable level of performance as a user with a small payload.

The type of data to be transmitted may be considered in assigning priority among users. Some data types are time sensitive and require quick attention. Other data types can tolerate longer delay in transmission. Higher priority can be assigned to data that is time critical. As an example, data being retransmitted can be given higher priority than data transmitted for the first time. The retransmitted data typically corresponds to data previously transmitted and received in error. Since the signal processing at the receiver may be dependent on the data received in error, the retransmitted data can be given higher priority.

The type of data services being provided may be considered in assigning user priority. Higher priority can be assign to premium services (e.g., those charged higher prices). A pricing structure can be established for different data transmission services. Through the pricing structure, the user can determine, individually, the priority and the type of service the user can expect to enjoy.

The factors described above and other factors may be weighted and combined to derive the priorities of the users. Different weighting schemes can be used depending on the set of system goals being optimized. As an example, to optimize the average throughput of the cell, greater weight can be given to the users' achievable C/I. Other weighting schemes can also be used and are within the scope of the present invention.

In an embodiment of a user prioritization scheme, users are prioritized based on their average throughput. In this embodiment, a "score" is maintained for each active user to be scheduled for data transmission. A cell can maintain the scores for the active users it services (i.e., for a distributed control scheme) or a central controller can maintain the scores for all active users (i.e., in a centralized control scheme). The active status of a user can be established at higher layers of the communications system.

In the embodiment, the score $\phi_k(i)$ is computed for user k at scheduling interval i (e.g., frame i). The data rate $r_k(i)$ for user k at frame i has a unit of bits/frame and is bounded by a maximum data rate, $r_{max}$, and 0. The data rate $r_k(i)$ can be a "realizable" (i.e., a "potential") data rate for user k based on the achieved (i.e., measured) or achievable (i.e., estimated) C/I. The data rate $r_k(i)$ can also be the actual data rate to be assigned in the current scheduling period, or some other quantifiable data rates. The use of the realizable data rate introduces a shuffling effect during the channel assignment process, which can improve the performance of some disadvantaged users, as described below.

In a specific implementation, the scores $\phi_k(i)$ for the active users can be expressed as:

$$\phi_k(i) = \alpha_1 \cdot \phi_k(i-1) + \alpha_0 \cdot r_k(i)/r_{max}, \quad \text{Eq (3)}$$

where $\phi_k(i)=0$, for $i<0$, and $\alpha_0$ and $\alpha_1$ are weighting factors. For example, if $\alpha_0$ and $\alpha_1=0.5$, the current data rate $r_k(i)$ is given equal weight as the score $\phi_k(i-1)$ from the prior scheduling interval. The scores $\phi_k(i)$ are approximately proportional to the normalized average throughput of the users.

In another specific implementation, the score $\phi_k(i)$ for each active user can be computed as a moving average throughput over a sliding time window. For example, the average (realizable or actual) throughput of the user can be computed over a particular number of scheduling intervals (e.g., over the latest 10 frames) and used as the score. Other implementations to compute the scores $\phi_k(i)$ for the active users can be contemplated and are within the scope of the present invention.

In an embodiment, when a user becomes active, the score is initialized to the normalized data rate that the user can achieve based on the current C/I. The score for each active user can be updated at each scheduling interval (e.g., each frame), and is typically performed if there is data transmission for the user in the current scheduling interval. The score is maintained (at the same value) if there is no data transmission to the user, and is reset to zero if the user is no longer active. If an active user is not scheduled for transmission, $r_k(i)=0$. Whenever a frame error is made, the effective rate is also 0. The frame error may not be known immediately due to the round trip delay of the frame error signaling (e.g., the delay for the Ack/Nak), but the score can be adjusted accordingly once the frame error is known.

A scheduling processor then uses the scores to prioritize users for the channel assignments. In a specific embodiment, the set of active users is prioritized such that the user with the lowest score is assigned the highest priority, and the user with the highest score is assigned the lowest priority. The scheduling processor may also assign non-uniform weighting factors to the user scores in performing the prioritization. Such non-uniform weighting factors can take into account others factors (such as those described above) to be considered in determining user priorities.

In certain embodiments (e.g., if the realizable data rate is used), the score $\phi_k(i)$ for a particular user is not necessarily indicative of what is supportable by the user (i.e., may not reflect the user's potential data rate). For example, two users may be assigned the same data rate, even though one user may be capable of supporting a higher data rate than the other. In this case, the user with the higher potential data rate can be given a higher score and thus will have a lower priority.

A fairness criterion may be imposed in the scheduling of data transmission and assignment of channels to ensure (or maybe even guarantee) a minimum grade of service (GOS). The fairness criterion is typically applied to all users in the system, although a particular subset of the users (e.g., premium users) may also be selected for application of the fairness criterion. Fairness may be achieved with the use of priority. For example, a user may be moved up in priority each time its data transmission is omitted from a scheduling and/or with each unsuccessful transmission.

For the user prioritization scheme described above, the allocation of resources can be made on the basis of the ratio of scores. In this case, the scores of all active users can be referenced to the maximum of the user scores to form a modified score $\hat{\phi}_n(k)$, which can be expressed as:

$$\hat{\phi}_k(i) = \phi_k(i) \Big/ \max_k \{\phi_k(i)\}. \quad \text{Eq (4)}$$

The resources allocated to a particular user can then be based on their modified score. For example, if user 1 has a score that is twice that of user 2, then the scheduling processor can allocate a channel (or a number of channels) having the capacity necessary to equalize the data rates of these two users (provided that such channel or channels are available). As a fairness consideration, the scheduling processor can attempt to normalize data rates at each scheduling interval. Other fairness criteria may also be imposed and are within the scope of the present invention. The assignment of resources (i.e., channels) to the users can thus be based on a number of parameters. Some of these parameters can be combined into channel metrics. During each scheduling and channel assignment interval, the channel metrics can be computed for each active user and for each available channel. These computed channel metrics are then used to assign channels such that the resources are more optimally used. A number of different channel metrics can be employed, based on the system requirements. Additional constraints (e.g., maximum power, minimum C/I, and so on) can also be used in making the channel assignment, as described below.

Channel Metrics

One or more channel metrics can be used in performing the channel assignment such that more efficient use of the resources and improved performance can be achieved. Such channel metrics may include, for example, metrics based on interference, outage probability, maximum throughput, or some other measures. Some examples of channel metrics indicative of "goodness" are described below. However, it will be recognized that other channel metrics can also be formulated and used and are within the scope of the present invention.

In an embodiment, a channel metric based on outage probability for active users can be devised and applied. Channels are then assigned such that the outage probability is minimized for as many users as possible. The outage probability, $d_m(n,k)$, is a function of the conditional C/I of the user and represents an expected value of the outage probability for a given user in a given channel. For a 3-cell system, the channel metric $d_m(n,k)$ for a given user in cell 1 can be expressed as:

$$d_m(n, k) = \begin{bmatrix} P_2(n) \cdot (1 - P_3(n)) \cdot f\{[I_1(1,k) \cdot \beta_1(n)]/[I_1(2,k) \cdot \beta_2(n)]\} + \\ P_3(n) \cdot (1 - P_2(n)) \cdot f\{[I_1(1,k) \cdot \beta_1(n)]/[I_1(3,k) \cdot \beta_3(n)]\} + \\ P_2(n) \cdot P_3(n) \cdot f\{[I_1(1,k) \cdot \beta_1(n)]/[I_1(2,k) \cdot \beta_2(n) + I_1(3,k) \cdot \beta_3(n)]\} \end{bmatrix} \quad \text{Eq (5)}$$

where:
- $\beta_m(n)$ is the back-off factor associated with channel n of cell m with $0 \leq \beta > 1$. When $\beta_m(n)=0$, this is equivalent to preventing cell m from using channel n;
- $\beta_m(n)$ is the probability that cell m is using channel n (i.e., probability of occupancy);
- $I_m(l,k)$ is the received power observed by user k in cell m from cell l with cell l transmitting at full power; and
- $f(x)$ is a function that describes the outage probability for a given data rate as a function of x.

The channel metrics $d_m(n, k)$ represent the outage probability for user k in cell m in channel n. In embodiments that use the channel metrics $d_m(n,k)$, the channel having the lowest outage probability is the best channel to assign to the user.

The function $f(x)$ can be computed to a degree of confidence based on estimates of the transmit power from the primary cell and the interfering cells $I_m(l,k)$. The value of $f(x)$ can be averaged over a time period to improve accuracy. Fluctuations in the value of $f(x)$ are likely to occur due to small signal fading and perhaps occasional shadow (e.g., a truck blocking the main signal path). To account for the fluctuations, the back-off factors can be selected to provide some margins and the data rates can be adapted based on changes in the operating conditions.

The probability $P_m(n)$ can be estimated using various estimation techniques. For example, if a cell is not using a channel, it can measure the interference level and maintain a count of how frequently it exceeds a particular threshold. And if the cell is using the channel, it can maintain another count that measures how frequently a frame erasure occurs. Both of these measures can be used to derive an estimate of $P_m(n)$. A value of 1.0 can also be assumed for $P_m(n)$.

The improvement in the outage probability provided by a power back-off structure may be summarized as follows. If equation (5) is evaluated with $P_m(n)=1.0$ for all m and n, the results are equivalent to examining the channel allocation scheme where all cells are at full load. When no back-off is used (i.e., when $\beta_m(n)=1.0$, for all n and m) the channel metrics $d_m(n,k)$ are equivalent for a given user k for all channels n=1, 2, . . . , $N_c$. Thus, there is no preference in the channel assignment without power back-off. This lack of preference results in inefficient use of the available resources since the users in the cells are unlikely to experience similar operating conditions and some users are more immune to other-cell interference than other users. By imposing a back-off structure that takes advantage of the composition of users, improvement in system throughput can be realized, as described below.

Once the outage probabilities are computed for the active users, channel assignments can be achieved based on user priority as described below. The best channel to assign to the user under consideration is the one with the lowest expected outage probability.

The expression given in equation (5) is for a 3-cell system. A general expression for the channel metrics $d_m(n,k)$ is as follows:

$$d_m(n, k) = \sum_{j=0}^{2^{N_r}} a_j(n) \cdot \hat{f}_j(m, n, k), \quad \text{Eq (6)}$$

where $$a_j(n) = \prod_{i=0}^{N_r-1} b_{i,j}(n), \quad \text{Eq (7)}$$

$$b_{i,j}(n) = \begin{cases} P_i(n); & c_{i,j} = 1 \\ 1 - P_i(n); & c_{i,j} = 0, \end{cases} \quad \text{Eq (8)}$$

$$c_{i,j} = j \cdot 2^i, \quad \text{Eq (9)}$$

$$\hat{f}_j(m, n, k) = f_j\left(\frac{I_m(l, k) \cdot \beta_m(n, k)}{\sum_{\substack{l=0 \\ l \neq m}}^{N_r-1} c_{l,j} \cdot \beta_l(n, k) \cdot I_m(l, k)}\right), \text{ and} \quad \text{Eq (10)}$$

the symbol "·" for $c_{i,j}$ implies the logical "AND" operation (i.e., $c_{i,j}$ is either 0 or 1).

The function $f(x)$ given in equation (10) represents the outage probability evaluated at a C/I=x. A further generalization of equation (10) includes the evaluation of several functions $f^R(x)$, where the superscript R indicates the function describing an outage probability for a particular data rate R.

Equation (6) can be used for any number of cells in the reuse cluster $N_r$ and includes terms relating to interference received from cells having the same index modulo-$N_r$. Depending upon the propagation properties and $N_r$, these "co-channel" terms may not be insignificant for a subset of users in the cell.

Equations (6) through (10) can be further generalized to account for interference from cells outside the local reuse cluster. In this case, $N_r$ is replaced by $N_c$, where $N_c$ is the set of all cells in the system. In typically implementations, $N_c$ does not have to include all cells in the system, but should include those cells that present interference levels above a particular threshold level.

In another embodiment, channel metrics based on the expected C/I for active users can be used for channel assignments. The metrics can be generated based on channel occupancy probabilities and interference constraints. Using the 3-cell system example, the metrics for user 1 in cell 1 can be expressed as:

$$h_1(n, k) = I_1(1, k) \cdot \begin{bmatrix} P_2(n) \cdot (1 - P_3(n)) \cdot I_1(2, k) + \\ P_3(n) \cdot (1 - P_2(n)) \cdot I_1(3, k) + \\ P_2(n) \cdot P_3(n) \cdot (I_1(2, k) + I_1(3, k)) \end{bmatrix}^{-1} \quad \text{Eq (11)}$$

for n=1, 2, . . . , $N_c$ and k=1, 2, . . . $N_c$;
where
$P_m(n)$ is the probability that channel n is occupied by a user in cell m, and
$I_m(l,k)$ is the received power observed by user k in cell m from cell 1.

The quantity in the bracket of equation (11) is a sum of the weighted interference. The first term in the sum denotes the probability that cell 2 is transmitting and cell 3 is not transmitting multiplied by the interference from cell 2. The second term in the sum denotes the probability that cell 3 is transmitting and cell 2 is not transmitting multiplied by the interference from cell 3. And the third term in the sum denotes the probability that both cells 2 and 3 are transmitting multiplied by the interference from cells 2 and 3. "Goodness" is inversely related to the ratio of desired signal power to interference power.

Equation (11) is shown for a 3-cell system and can be extended to accommodate any number of cells, users, and channels, similar to that achieved for equation (6). Generally, the number of terms in the sum increases greatly as the number of cells increases. However, the effects from some distance cells may be neglected to simplify the calculations.

As described above, the transmit power for some or all channels of a particular cell can be constrained (i.e., backed-off) to improve performance and satisfy system requirements. Equation (11) can then be modified to take into account the power back-off, and can be expressed as:

$$h_m(n, k) = I_1(1, k) \cdot \beta_1(n) \cdot \quad \text{Eq (12)}$$
$$\begin{bmatrix} P_2(n) \cdot (1 - P_3(n)) \cdot I_1(2, k) \cdot \beta_2(n) + \\ P_3(n) \cdot (1 - P_2(n)) \cdot I_1(3, k) \cdot \beta_3(n) + \\ P_2(n) \cdot P_3(n) \cdot (I_1(2, k) \cdot \beta_2(n) + I_1(3, k) \cdot \beta_3(n)) \end{bmatrix}^{-1}$$

where $\beta_m(n)$ is the power back-off factor associated with channel n of cell m, with $0 \leq \beta \leq 1$. Thus, each interference term in equation (12) is scaled by the back-off factors $\beta_m(n)$. When $\beta=0$, this is equivalent to blocking the cell from transmitting in the specified channel. The determination of $\beta_m(n)$ may be done in a static or dynamic manner as described above.

Other Constraints and Considerations

A number of constraints and considerations may also be used in addition to the channel metrics in the scheduling of data transmissions and the assignment of channels to active users. These constraints and considerations may include, for example, excessive outage probability, payload requirements, user data rates, interference to adjacent cells, interference from other cells, the maximum transmit powers, the achievable C/I and the required set point, the delays experienced by the users, the type and amount of data to transmit, the type of data services being offered, and so on. The above is not an exhaustive list. Other constraints and considerations may also be contemplated and are within the scope of the present invention.

Scheduling of Data Transmissions

The cells in the system operate using the adaptive reuse plan formulated in the manner described above and in accordance with the prescribed rules and conditions. During normal operation, each cell receives requests for data transmissions from a number of users in the cell. The cells then schedule the data transmissions to meet the system goals. The scheduling can be performed at each cell (i.e., for a distributed scheduling scheme), by a central controller (i.e., for a centralized scheduling scheme), or by a hybrid scheme in which some of the cells schedule their own transmissions and a central controller schedules transmissions for a set of cells.

Distributed, centralized, and hybrid scheduling schemes are described in further detail in U.S. Pat. No. 5,923,650, entitled "METHOD AND APPARATUS FOR REVERSE LINK RATE SCHEDULING," issued Jul. 13, 1999, U.S. Pat. No. 5,914,950, also entitled "METHOD AND APPARATUS FOR REVERSE LINK RATE SCHEDULING," issued Jun. 22, 1999, and U.S. patent application Ser. No. 08/798,951, entitled "METHOD AND APPARATUS FOR FORWARD LINK RATE SCHEDULING," filed Feb. 11, 1997, all assigned to the assignee of the present invention and incorporated herein by reference.

Figure 9:
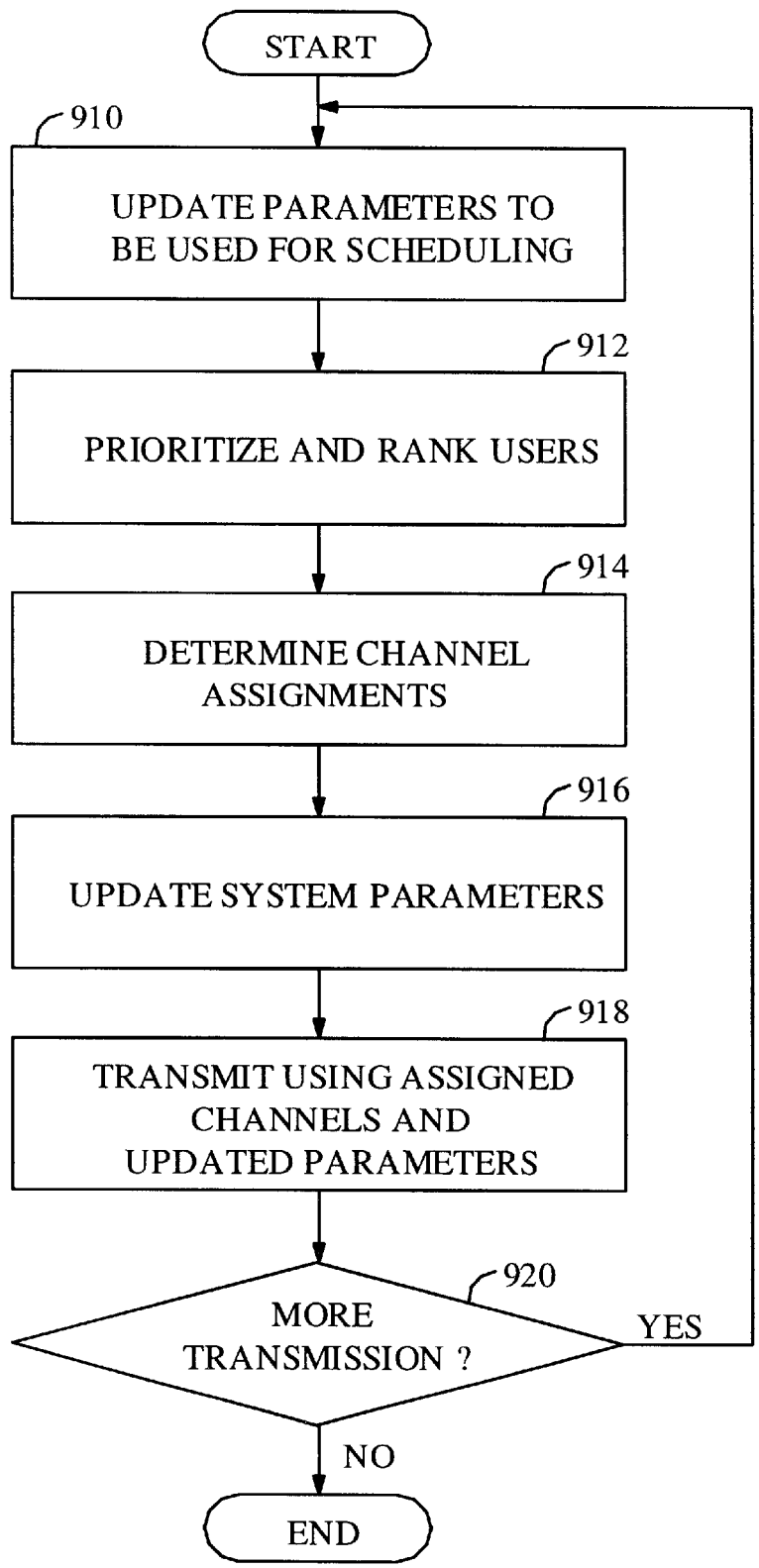
FIG. 9 is a flow diagram of an embodiment of a scheme to schedule data transmissions.

FIG. 9 is a flow diagram of an embodiment of a scheme for scheduling data transmissions. Initially, the parameters to be used for scheduling are updated, at step 910. These parameters may include those to be used in the computation of the channel metrics described above, which may include, for example, the loading probabilities, the channel occupancy probabilities, the C/I CDFs, the interference constraint matrices for each user in each cell to be scheduled, the back-off factors, and others.

The users are then prioritized and ranked, at step 912. Generally, only active users having data to transmit are prioritized and ranked. Prioritization of users can be performed using any one of a number of user-rating schemes and can be based on one or more criteria listed above such as, for example, the payload. The active users are then ranked accordingly based on their assigned priorities.

Channels are then assigned to the active users, at step 914. The channel assignment typically involves a number of steps. First, the channel metrics are computed for the available channels using the updated parameters. Any one of the channel metrics described above can be used, or other channel metrics can also be used. The users are then assigned channels based on their priorities and demand requirements and the computed channel metrics. Up to $N_c$ users per cell are scheduled for transmission on the $N_c$ available channels. Channel assignment is described in further detail below.

The system parameters are then updated to reflect the channel assignment, at step 916. The parameters to be updated may include, for example, adjustment to the back-off factors for the channels in the cell based on requests from other cells. The cell may also request adjustments of the neighbor cells and perform adjustments requested by neighbor cells.

The cell then transmits data using the assigned channels and the updated parameters, at step 918. Generally, steps 910 through 918 are performed during normal operation of the cell. At step 920, a determination is made whether there are any transmissions to be scheduled. If there are additional transmissions, the process returns to step 910 and the next set of transmissions is scheduled. Otherwise, the process terminates.

Channel Assignments

Channels can be assigned using numerous schemes and taking into account numerous factors. In an embodiment, all active users in the cell are prioritized so that the assignment of channels can be made from highest priority user to lowest priority user. The prioritization of users can be based on a number of factors such as those described above.

An aspect of the invention provides a demand-based channel assignment scheme. In this scheme, the demand or payload requirements of the users are considered when making channel assignments such that the available resources are better utilized. For a particular set of available channels, a user having lower payload requirements (e.g., a lower data rate) may be serviced by a number of available channels whereas a user having higher payload requirements (e.g., a higher data rate) may be serviced by a reduced number of available channels. If the user with the lower payload requirements has higher priority and is assigned the best available channel (among many channels that also fulfill the user's requirements), and if that channel is the only one that can fulfill the requirements of the user with the higher payload, then only one user can be served and the resources are not effectively used.

As an example, consider a situation where three channels are available for assignment to two users and that user 1 has a payload requirement of 1 Kbyte and user 2 has a payload requirement of 10 Kbytes. Further, assume that only one of the three channels will satisfy the requirement of user 2 whereas all three channels will satisfy the requirement of user 1. The channels may be assigned as follows:

(a) If user 2 has higher priority than user 1, user 2 is assigned the channel that maximizes its throughput. User 1 is then assigned the next best channel by default. Both users are served by the channel assignment.

(b) If user 1 has higher priority than user 2, and if the payload requirements of the users are not considered in making the channel assignment, user 1 may be assigned the channel that has the largest effective margin even though any one of the available channels would have satisfied user 1's requirement. User 2 would be assigned the next best channel by default, which may not satisfy its requirement. User 2 would then be served at a lower data rate or remains in the queue until the next scheduling period.

Several assignment options are available for case (b). If the channel assignment is performed as described above, the power used in the channel assigned to user 1 can be reduced to the level required for reliable communications at the desired data rate. Another assignment option in case (b) is to assign user 1 the channel having the lowest margin that satisfies the requirements of user 1. With this channel assignment, other better channels are made available for other users that may need them (e.g., because of higher payload requirements or lower achieved C/I). Using this demand or payload-based channel assignment, channels with larger margins are available for assignment to subsequent users that may require the additional margins. Payload-based channel assignment thus maximizes the effective throughput in this scheduling interval.

If the number of users is less than the number of available channels, as in the above example, it is possible to upgrade the users. Thus, user 1 may be upgraded to another unassigned channel that has a higher margin than the assigned channel. The reason for upgrading user 1 is to lower the effective transmit power required to support the transmission. That is, since either remaining channel satisfies user 1's demand, reassigning user 1 to the channel with the higher margin allows for reduction in the transmit power by the amount of margin.

Other factors besides user payloads can be considered in making the channel assignment. For example, the probabilities $P_m(n)$ of other cells transmitting on a particular channel n can be taken into account. If a number of channels have nearly equal channel metrics without taking into account $P_m(n)$, then the better channel to assign is the one that has a lowest probability of being used. Thus, the probability of channel occupancy $P_m(n)$ can be used to determine the best channel assignment.

Excessive outage probability may be considered in making the channel assignments. In some instances, it is possible that assignment of a channel to a particular user is unwarranted or unwise. For example, if the user's expected outage probability for a particular channel is excessive, there could be a reasonable likelihood that the entire transmission on that channel will be corrupted and needs to be re-transmitted. Furthermore, assignment of the channel may increase the likelihood that the adjacent cell transmissions are also corrupted by the added interference. In such instances, assignment of the channel to the user may be unwise, and it may be better to not assign the channel at all or to assign the channel to another user who may make better use of it.

Figure 10:
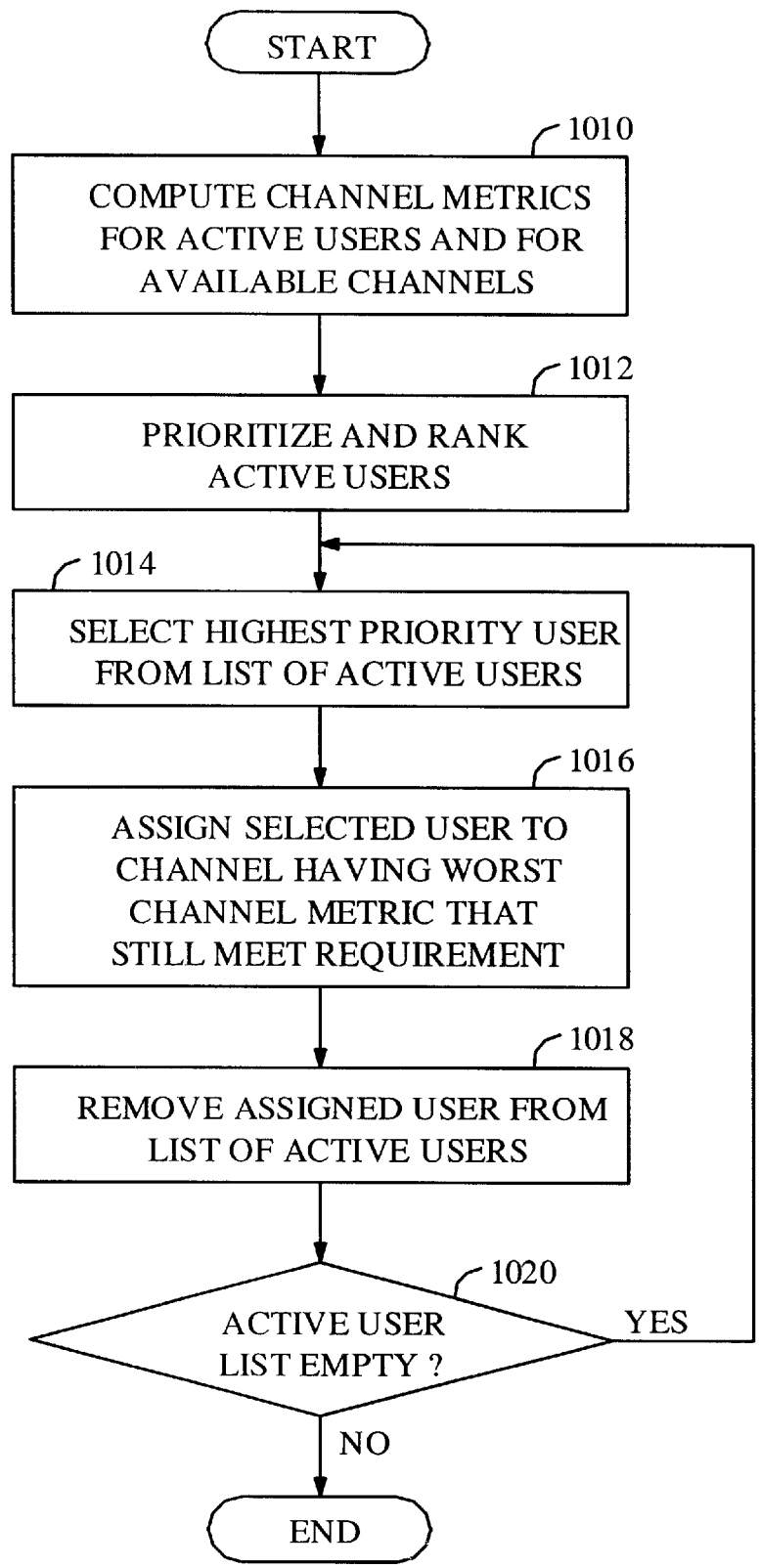
FIG. 10 is a flow diagram of an embodiment of a demand-based channel assignment scheme.

FIG. 10 is a flow diagram of an embodiment of a demand-based channel assignment scheme of the invention. Initially, channel metrics are computed for the active users and for the available channels, at step 1010. Various channel metrics can be used, such at those described above. These channel metrics take into account information specific to the users when the information is available. For example, the channel metrics can use information from the interference constraint matrix that describes the interference power levels observed by the user from neighbor cells. The active users are then prioritized and ranked based on the factors described above, at step 1012. The prioritization can also be based on the computed metrics computed in step 1010. The users priority and channel metrics are used to perform channel assignment.

At step 1014, the highest priority user is selected from the list of active users. The selected user is then assigned to a channel with the worst metric that meets the user's requirements, at step 1016. For example, if channel metrics based on outage probability are employed, the selected user is assigned the channel with the highest outage probability that still satisfies the user's outage requirement. The assigned user is then removed from the list of active users, at step 1018. A determination is then made whether the active user list is empty, indicating that all active users have been assigned channels, at step 1020. If the list is not empty, the process returns to step 1014 and the highest priority, unassigned user in the list is selected for channel assignment. Otherwise, if all users have been assigned channels, the process terminates.

The scheme in FIG. 10 generally assigns successively lower priority users to channels having successively larger back-off factors. If a user cannot be assigned to a channel capable of achieving the required C/I, that user may be scheduled for transmission at a reduced data rate (a condition referred to herein as "dimming") or may be schedules for transmission at another time (a condition referred to herein as "blanking"). The priority of a user who is dimmed or blanked can be increased, causing it to be considered earlier in the next scheduling and channel assignment interval. Once the users are assigned to their initial channels, users can be upgraded to better channels if any are available.

In one channel upgrade scheme, users are successively reassigned to better available channels (starting from the highest priority user), if these channels meet the requirements of the users and can provide larger link margins. Successively lower priority users (i.e., from highest to lowest) can then be assigned to any remaining channels. This upgrade scheme allows some or all of the active users to enjoy better channels having higher link margins.

In another channel upgrade scheme, the assigned users are upgraded by the number of available channels. For example, if three channels are available, each assigned users moves up by three slots. This upgrade scheme allows most (if not all) users to enjoy better channels. For example, if channels 1 through 12 having progressively worse performance are available for assignments and nine users are initially assigned to channels 4 through 12, then each user can be upgraded by three channels. The nine users then occupy channels 1 through 9 and channels 10 through 12 can be disabled.

Other upgrade schemes can be designed and are within the scope of the present invention.

Figure 11:
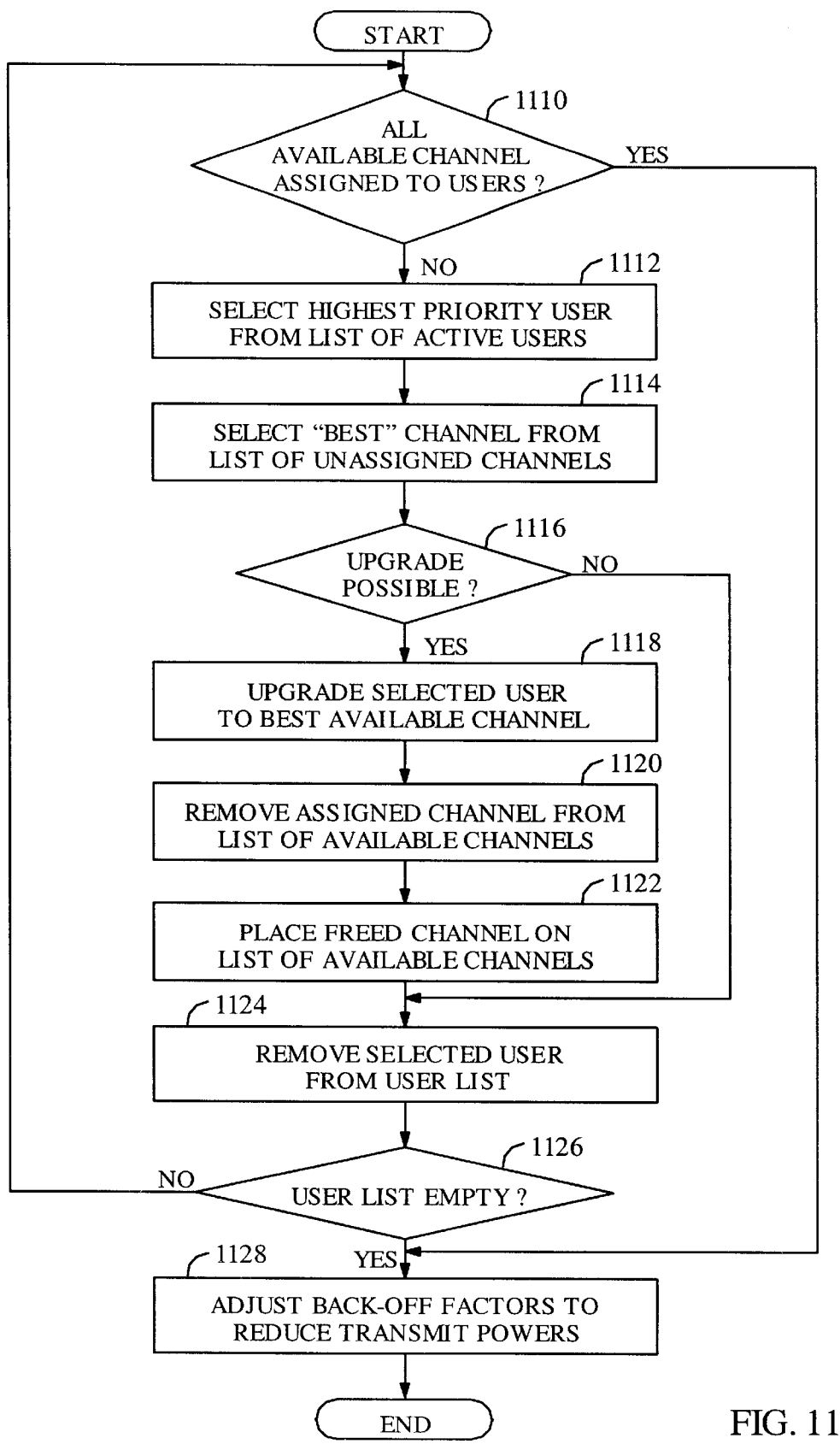
FIG. 11 is a flow diagram of an embodiment of a channel upgrade scheme.

FIG. 11 is a flow diagram of an embodiment of a channel upgrade scheme of the invention. Prior to commencing the upgrade process shown in FIG. 11, the active users are assigned to their initial channel assignments, which can be achieved using the channel assignment scheme described above in FIG. 10. At step 1110, a determination is made whether all available channels have been assigned to users. If all channels have been assigned, no channels are available for upgrade and the process proceeds to step 1128. Otherwise, the users are upgraded to the available channels, if these channels are better (i.e., have better channel metrics) than the original assigned channels.

At step 1112, the highest priority user from the list of active users is selected for possible channel upgrade. For the selected user, the "best" channel from the list of unassigned channels is selected. The best channel corresponds to the channel having the "best" channel metrics for the selected user (e.g., the lowest outage probability).

A determination is then made whether an upgrade is possible for the selected user, at step 1116. If the channel metrics of the best available channels is worse than that of the channel originally assigned to the selected user, then no upgrade is performed and the process proceeds to step 1124. Otherwise, the selected user is upgraded to the best available channel, at step 1118, which is then removed from the list of available channels, at step 1120. The channel initially assigned to the selected user may be placed back on the list of available channels for possible assignment to some other lower priority user, at step 1122. The selected user is then removed from the list of active users, at step 1124, regardless of whether a channel upgrade was performed or not.

At step 1126, a determination is made whether the list of active users is empty. If the user list is not empty, the process returns to step 1110 and the highest priority in the list is selected for possible channel upgrade. Otherwise, if there are no more available channels for upgrade or if all active users have been considered, the process proceeds to step 1128 and the back-off factors for all channels are adjusted to reduce the transmit powers. The process then terminates.

The upgrade process in FIG. 11 effectively upgrades active users to the available channels that are more likely to provide improved performance. The channel upgrade scheme shown in FIG. 11 can be modified to provide improved channel upgrades. For example, for a particular user, it may be possible that a channel freed up by a lower priority user is better for this user. However, the user is not assigned to this channel because it has already been removed from the user list by the time the lower priority user is considered. The process in FIG. 11 can thus be iterated multiple times, or other tests can be included to account for this situation. Other upgrade schemes can also be employed and are within the scope of the present invention.

The channel assignment scheme shown in FIG. 10 assigns active users to available channels based on their priorities. The users can be assigned priorities based on "scores" such as the ones computed above using equation (3). As part of a fairness consideration, a particular user may be assigned to a number of channels if such channels are available and if one channel is not capable of meeting the user requirements. For example, a user may be assigned a first channel capable of supporting 50% of the user's requirements, a second channel capable of supporting 35% of the user's requirements, and a third channel capable of supporting the remaining 15% of the user's requirements. If this particular allocation of resources prevents other users from achieving their requirements, then the priorities of the underserved users may improve such that they will be considered earlier for the allocation of resources in subsequent scheduling intervals.

In accordance with certain aspects of the invention, the assignment of channels (i.e., the allocation of resources) to users are based in part on their priorities, and dynamic adjustment of the user priorities are employed to provide a "shuffling" effect on the data transmissions. The data transmission for a particular user may be assigned to different channels for different scheduling intervals. This shuffling of data transmission in some cases provides interference averaging, which can further improve the performance of disadvantaged users in the communications system, as described below.

In accordance with certain embodiments of the invention, during any part of the channel assignment process (e.g., the initial channel assignment or the channel upgrade), the data rates of the users may be scaled to match the effective link margins of the assigned channels or the back-off factors may be increased to reduce the transmit powers for the channels, or both. The data rates of the users may be adjusted based on the effective link margins to allow the system to increase throughput. If the achieved C/I is lower than the set point (i.e., the effective link margin is negative) the data rate of the user can be lowered to that supported by the channel.

The transmit powers of all channels can also be reduced to the minimum level needed to support the transmissions at the desired data rates. Reduction in the transmit powers can be achieved by adjusting the back-off factors associated with the assigned channels. The back-off factors for the unassigned channels can be reduced to zero (i.e., blocked) to reduce interference to other cells.

Channels may be assigned to users with zero or more conditions or constraints on usage. Such conditions may include, for example: (1) limitation on the data rate, (2) a maximum transmit power, (3) restriction on the set point, and so on.

A maximum data rate may be imposed on a channel assigned to an active user. For example, if the expected C/I is not able to support the required outage probability, the data rate may be reduced to achieve the requirement.

Maximum transmit power constraints may be placed on certain assigned channels. If the cells in the system have knowledge of the other cells' power constraints, the interference levels can be computed locally with higher degree of certainty and better planning and scheduling may be possible.

A particular set point (i.e., target C/I) may be imposed on an assigned channel, for example, in heavily loaded situations. A (e.g., low priority) user may be assigned a channel that does not meet the required minimum outage probability (i.e., the assigned channel has an expected C/I that is lower than that required for a particular outage probability). In this case, the user may be required to operate using the assigned channel at a lower set point that satisfies the required outage probability. The set point employed can be static or vary with system loading. Also, the set point may be imposed on a per channel basis.

Control Schemes

The adaptive reuse scheme, the scheduling of data transmissions, and the assignment of channels can be implemented in various manners and using numerous control schemes such as centralized, distributed, and hybrid control schemes. Some of these control schemes are described in further detail below.

In a centralized control scheme, information from the active users in all cells to be commonly controlled is provided to a central processor that processes the information, schedules data transmissions, and assigns channels based on the received information and a set of system goals. In a distributed control scheme, information from the active users in each cell is provided to a cell processor that processes the information, schedules data transmissions, and assigns channel for that cell based on the information received from the users in that cell and other information received from other cells.

A distributed control scheme performs scheduling of data transmission and channel assignment at the local level. The distributed control scheme can be implemented at each cell, and involved coordination between cells is not required.

In the distributed control scheme, local information can be shared dynamically with other cells in the system even though the scheduling and channel assignment may be performed locally at each cell. The shared information may include, for example, the loading at a particular cell, a list of active users at the cell, channel availability information, the assigned back-off factors, and so on. In the distributed control scheme, this information need not be shared in a dynamic manner and may be "static" information available to the cells in the system. The shared information can be used by the cells to help decide how to best allocate resources locally.

The distributed control scheme can be advantageously used under both low and high load conditions, and is simpler to implement than the centralized control scheme. At low load, the cells are more likely to be able to transmit using "orthogonal" channels, which results in minimal interference from other cells. As the load increases, the interference levels in the system will generally increase and there is a higher likelihood that the cells will transmit using non-orthogonal channels. However, as the load increases, the set of users the cell can select from also increases. Some of these users may be more tolerant of other-cell interference than others. A distributed control scheme exploits this fact in assigning channels and scheduling transmissions for the set of active users. The channels are assigned in such a way as to maximize the system throughput given constraints such as, for example, the minimum instantaneous and average data rates for each user.

Power Control

Power control can be exercised by the cells for the assigned channels. If a user is assigned a channel and has positive link margin (i.e., the difference between the expected C/I and the set point is positive), the transmit power can be reduced based on the determined link margin. Even if other cells in the system are not aware of the back-off for a particular transmission, the overall effect is to reduce interference levels and improve the probability of successful transmission. Power control can be performed dynamically, possibly in similar manner as that performed for CDMA systems.

Sectors

Various aspects and embodiments of the invention are described in the context of "cell". As used herein, a cell also refers to a "sector" in a sectorized cell. For example, a 3-sector cell may be designed and operated to provide three sets of data transmissions to users in three different (albeit typically overlapping) geographic areas. A cell as used herein thus generically refers to any directed transmission to a particular area, and is typically defined by a particular beam pattern from a transmitting source. A directed transmission results in less interference, and thus improved performance and capacity, over an omni-directional transmission. If a particular cell is operated to support multiple sectors, coordination between sectors of the same cell can be achieved for the allocation of resources, the scheduling of data transmissions, and the assignment of channels.

Various aspects and embodiments of the invention can thus be implemented within a structure composed of a number of sectorized and/or non-sectorized cells to provide improved efficiency and performance. For example, a set of back-off factors can be associated with each sector of a cell, with the back-off factors selected to minimize the amount of interference to neighboring and nearby sectors. Also, the transmission for each sector can be enabled at designated time intervals to further reduce interference. For example, adjacent or nearby sectors may be designated to transmit at different times to reduce the amount of co-channel interference.

Communication with Multiple Cells

The communications system is designed to support as many simultaneous users as possible for a given operating environment. In some implementations, each user can communicate with one or more cells for data transmissions. For example, data transmissions from multiple cells can be used to increase the effective throughput for the user. The data transmissions can be achieved concurrently, if resources are available, or sequentially, or a combination of both. For example, a user may request transmission from a particular cell (e.g., among several cells) having better achieved C/I. In a dynamic environment, the better achieved C/I can be associated with different cells over time as a result of, for example, movement by the user, transmission and interference from neighbor cells, and so on. The data transmissions from multiple cells may be synchronized or may be unsynchronized depending on the particular implementation. The user receiving the data transmissions would be provided with the information needed to properly assemble the received data.

For a packet data communications system, the cells can schedule transmission of packets independently without requiring coordination between cells on parameters such as, for example, the particular transmission time and/or particular channel.

Soft handoff can be used to improve performance (i.e., reliability) or to enhance capacity (for some operating conditions). When the set point is negative or slightly positive for a particular user, soft handoff can be used improve the reliability of the data transmission for that user (which can improve the system performance since a retransmission can be avoided). When a large fraction of the users in a cell have low C/I, soft handoff can be used to improve the capacity of the system (e.g., for terminals with omni directional antennas). When a small fraction of the users have low C/I and additional capacity is available, soft handoff can be used to improve the reliability of the data transmissions.

With soft handoff, the data transmissions from multiple cells to a particular user are typically synchronized such that the received data can be coherently combined. The data transmissions can be scheduled by the involved cells to provide the required synchronization.

Uplink Scheduling

The aspects, embodiments, and implementations of the invention described above can be applied for downlink transmissions from the cells to the users. Many of these aspects, embodiments, and implementations can be adopted for use for uplink transmissions from the users to the cells. On the uplink, a portion of the available resources can be reserved for transmissions of user requests and other signaling.

In an embodiment, a request for an uplink data transmission can be sent by the user on a random access channel. The request may include such information as the payload (i.e., the amount of data to be transmitted), the achieved C/I, and so on. The cell receives the user request, schedules the uplink transmission, and sends the scheduling information to the user. Such scheduling information may include, for example, the time interval in which the data transmission can occur, the data rate (e.g., modulation and coding scheme) to employ and the assigned channel(s). The scheduling of the uplink transmissions and the assignment of the channel can be performed in similar manner described above for the downlink transmissions.

Combination with Other Reuse Structures

The invention can also be implemented within or in combination with other reuse structures. One such structure is disclosed by T. K. Fong et al. in a paper entitled "Radio Resource Allocation in Fixed Broadband Wireless Networks," IEEE Transactions on Communications, Vol. 46, No. 6, June 1998, which is incorporated herein by reference. This reference describes partitioning each cell into a number of sectors and transmitting to each sector at designated (and possibly non-designated) and staggered time slots selected to reduce the amount of interference.

Another reuse structure is disclosed by K. K. Leung et al. in a paper entitled "Dynamic Allocation of Downlink and Uplink Resource for Broadband Services in Fixed Wireless Networks," IEEE Journal on Selected Areas in Communications, Vol. 17, No. 5, May 1999, which is incorporated herein by reference. This reference describes partitioning each cell into a number of sectors and transmitting to each sector at designated (and possibly non-designated) and staggered time slots and sub-time slots selected to reduce the amount of interference. The C/I of the users are determined, and users are classified into groups based on their tolerance for up to q concurrent transmissions. The transmission pattern is then selected and data transmissions are scheduled to ensure conformance with the requirements of the users.

Yet another reuse structure is disclosed by K. C. Chawla et al. in a paper entitled "Quasi-Static Resource Allocation with Interference Avoidance for Fixed Wireless Systems," IEEE Journal on Selected Areas in Communications, Vol. 17, No. 3, March 1999, which is incorporated herein by reference. This reference describes assigning each cell with a "beam-off" sequence and allowing the users to inform the cell the best time slots for its data transmissions.

Applications

The invention can be advantageously employed in numerous applications. For example, the invention can be used in a communications system that provides broadband packet data services, which can be used to support the Internet, E-commerce, distribution of content, broadcast of media, and many other applications. The invention can be used to provide voice, video, data, text, and so on, over a wireless communications system to users in home, work, and mobile environments. The invention can be used for the distribution of content (e.g., from a distribution source such as a retail store, a media source, and so on) to users. The contents can be anything that can be digitally represented such as, for example, movies, images, news articles, books, audio, and so on.

The invention is especially suited for transmissions of data available on the World Wide Web, and can be used to provide high speed Internet access for users. The invention may be used in a communications system designed to serve as a "wireless cable" system capable of providing programming contents (e.g., including movies on demand) to users.

The invention supports such application by providing techniques that allow the communications system to achieve high performance and efficiency. The invention supports efficient allocation and use of the available system resources by aggressively reusing the available resources. The reuse is close to unity in some implementations of the invention.

First Design Example

For a better understanding of some of the aspects of the invention, an example design employing a staggered channel reuse scheme with power back-off is described below. In this example design, a 3-cell reuse plan is employed and $N_c=12$ channels are available for transmission. The users in the cell have the C/I CDF shown in FIG. 7.

To determine the initial back-off factors in this design, the C/I CDF in FIG. 7 is partitioned into 12 equal-size sets. Each user set has the minimum link margin s(n) shown in Table 3 based on a set point $\gamma$ of 15 dB. The minimum link margin s(n) is then used to determine the back-off factors for the 12 available channels. The transmission characteristics of the cells are thus designed to approximately match the C/I characterization of the users in the cells.

Table 4 lists the back-off factors for cells 1 through 3. Cell 1 is allocated channels 1 through 4 for transmission at full power and may transmit on channels 5 though 12 at reduced power corresponding to the back-off factors associated with these channels. In this example, channel 5 is initially designed to operate with a back-off factor of 0.6310, channel 6 is designed to operate with a back-off factor of 0.4446, and so on, and channel 12 is designed to operate with a back-off factor of 0.0112.

Cells 2 and 3 are assigned the same back-off factors but shifted by 4 channels and 8 channels modulo-12, respectively. Thus, cell 2 is allocated channels 5 through 8 for transmission at full power and transmits on the other channels at reduced power, and cell 3 is allocated channels 9 through 12 for transmission at full power and transmits on the other channels at reduced power. The back-off factors for cells 1 through 3 are shown in Table 4.

The back-off factors shown in Table 4 are derived based on the assumption that all cells transmit at full power. However, when the back-off factors are applied along with the staggered 4-channel offset, the actual C/I values observed by the users in the cell may be greater than the minimum C/I values provided in column 2 of Table 3 since the interference from other cells is reduced by the back-off factors.

In an embodiment, the scheduling of data transmissions and the assignment of channels are performed based, in part, on the priority of the users. Thus, prior to the scheduling and channel assignment, the active users are prioritized and ranked accordingly using any of the factors described above.

In this design, the channels in each cell are operated based on the set of defined back-off factors. The following factors and assumptions are used in this simple example. First, there are 12 active users per cell and only the users in cell 1 are considered in the example. The received power levels for the users in cell 1 are assumed to be identical and equal to one. The received power levels from cells 2 and 3 are assumed to be equal (i.e., $I_2=I_3$) and the interference observed by users 1 through 12 are given in column 2 of Table 9. The interference for users 1 through 12 may correspond to, for example, the interference observed by users in set 1 through 12, respectively, described above for FIG. 7. Thermal noise is assumed to be negligible.

In this design, the channel assignment is performed using channel metrics based on expected C/I of the users. Thus, prior to the scheduling and channel assignment, the channel metrics for active users are computed using equation (12). The columns in Table 8 represent the channel metrics computed for the active users with the back-off factors given in Table 4 applied to the cells and the received power levels $I_2$ and $I_3$ given in column 2 of Table 9. For the computations, both $P_2$ and $P_3$ are assumed to be unity.

In this example, the active users are prioritized based on their maximum achievable channel metrics with the known back-off factors applied. The maximum achievable channel metrics for all 12 users are determined and listed in the second to last row of Table 8. In this example, the user having the lowest maximum achievable channel metrics (i.e., user 1) is assigned the highest priority of 12, the user having the next lowest maximum achievable channel metrics (i.e., user 2) is assigned the next highest priority of 11, and so on, and the user having the highest maximum achievable channel metrics (i.e., user 12) is assigned the lowest priority of 1. The priorities of the users are shown in the last row of Table 8 and also in column 3 of Table 9.

TABLE 8

| | Users Channel Metrics | | | | | | | | | | | |
|---|---|---|---|---|---|---|---|---|---|---|---|---|
| Channel | d(1) | d(2) | d(3) | d(4) | d(5) | d(6) | d(7) | d(8) | d(9) | d(10) | d(11) | d(12) |
| 1 | 8.4 | 26.4 | 66.4 | 83.6 | 132.4 | 209.9 | 332.7 | 527.3 | 663.8 | 1052.0 | 2642.5 | 10520.1 |
| 2 | 12.0 | 38.0 | 95.5 | 120.2 | 190.5 | 302.0 | 478.6 | 758.5 | 954.9 | 1513.4 | 3801.4 | 15133.8 |
| 3 | 19.9 | 63.0 | 158.3 | 199.3 | 315.9 | 500.6 | 793.5 | 1257.6 | 1583.2 | 2509.2 | 6302.8 | 25091.9 |
| 4 | 30.0 | 94.9 | 238.4 | 300.1 | 475.6 | 753.8 | 1194.7 | 1893.5 | 2383.8 | 3778.1 | 9490.1 | 37780.7 |
| 5 | 3.5 | 11.2 | 28.2 | 35.4 | 56.2 | 89.0 | 141.1 | 223.6 | 281.5 | 446.2 | 1120.8 | 4462.0 |
| 6 | 2.6 | 8.3 | 20.8 | 26.2 | 41.5 | 65.7 | 104.2 | 165.1 | 207.9 | 329.5 | 827.6 | 3294.8 |
| 7 | 1.7 | 5.4 | 13.7 | 17.2 | 27.3 | 43.2 | 68.5 | 108.6 | 136.7 | 216.7 | 544.4 | 2167.1 |
| 8 | 1.2 | 3.9 | 9.9 | 12.5 | 19.8 | 31.3 | 49.7 | 78.7 | 99.1 | 157.1 | 394.6 | 1571.0 |
| 9 | 0.5 | 1.5 | 3.9 | 4.9 | 7.7 | 12.3 | 19.4 | 30.8 | 38.8 | 61.5 | 154.4 | 614.6 |
| 10 | 0.3 | 1.1 | 2.8 | 3.5 | 5.5 | 8.7 | 13.8 | 21.9 | 27.6 | 43.7 | 109.8 | 437.2 |
| 11 | 0.2 | 0.6 | 1.4 | 1.8 | 2.8 | 4.4 | 7.0 | 11.0 | 13.9 | 22.0 | 55.4 | 220.4 |
| 12 | 0.1 | 0.2 | 0.5 | 0.6 | 0.9 | 1.5 | 2.4 | 3.7 | 4.7 | 7.4 | 18.7 | 74.5 |
| $d_{max}(k)$ | 30.0 | 94.9 | 238.4 | 300.1 | 475.6 | 753.8 | 1194.7 | 1893.5 | 2383.8 | 3778.1 | 9490.1 | 37780.7 |
| Priority | 12 | 11 | 10 | 9 | 8 | 7 | 6 | 5 | 4 | 3 | 2 | 1 |

The users are then assigned channels based on their priorities and the computed channel metrics. Initially, the highest priority user (i.e., user 1) is selected and assigned the channel corresponding to its maximum achievable channel metrics (i.e., channel 4, channel metric=30.0). The next highest priority user (i.e., user 2) is then selected and assigned the channel corresponding to its second highest maximum achievable channel metrics (i.e., channel 3, channel metric=63.0) since this is the best channel among the available channels (i.e., channel 4 has already been assigned to user 1). The channel assignment process continues, with user 3 being assigned to channel 2, user 4 being assigned to channel 1, and so on, and user 12 being assigned to channel 12. Column 4 in Table 9 shows the channels assigned to the 12 users.

The C/I of the users can then be computed based on their assigned channels and taking into account the back-off factors applied to cells 2 and 3 and shown in Table 4. The C/I (in dB) achieved by the users are given in column 5 of Table 9. For a set point γ of 15 dB, the link margins for the users can be computed based on the C/I given in column 5. Column 6 gives the link margin (in dB), relative to the 15 dB set point, afforded for each user in the assigned channel when the back-off factors are applied. In this example, users 2 through 12 enjoy positive margins and user 1 is almost able to achieve its set point.

The back-off factors for the users can then be reduced by the amounts of the positive link margins, if any. The adjustment to the back-off factors can be performed systematically as part of the channel assignment process or dynamically as part of a power control scheme. The last column in Table 9 gives the back-off factors required to achieve C/I approximately equal to the set point (i.e., approximately zero link margin). The reduction in the back-off factors for the required set point and the original back-off factors can be observed by comparing the last two columns in Table 9.

TABLE 9

| User | $I_2, I_3$ | User priority | Assigned channel | C/I with back-off (dB) | Margin with initial back-off (dB) | Original back-off | Actual back-off required for C/I = 15 dB |
|---|---|---|---|---|---|---|---|
| 1 | 0.15811 | 12 | 4 | 14.773 | −0.227 | 1.0000 | 1.000 |
| 2 | 0.05000 | 11 | 3 | 17.995 | 2.995 | 1.0000 | 0.502 |
| 3 | 0.01991 | 10 | 2 | 19.799 | 4.799 | 1.0000 | 0.331 |
| 4 | 0.01581 | 9 | 1 | 19.220 | 4.220 | 1.0000 | 0.378 |
| 5 | 0.00998 | 8 | 5 | 17.495 | 2.495 | 0.6310 | 0.355 |
| 6 | 0.00629 | 7 | 6 | 17.678 | 2.678 | 0.4467 | 0.241 |
| 7 | 0.00397 | 6 | 7 | 17.859 | 2.859 | 0.2818 | 0.146 |
| 8 | 0.00251 | 5 | 8 | 17.962 | 2.962 | 0.1995 | 0.101 |
| 9 | 0.00199 | 4 | 9 | 15.886 | 0.886 | 0.1259 | 0.103 |
| 10 | 0.00126 | 3 | 10 | 16.407 | 1.407 | 0.0794 | 0.057 |
| 11 | 0.00050 | 2 | 11 | 16.932 | 1.932 | 0.0355 | 0.023 |
| 12 | 0.00013 | 1 | 12 | 17.220 | 2.220 | 0.0112 | 0.007 |

If the C/I of the assigned channel is greater than the set point, there is additional link margin. In this case, the data rate of the user may be increased to a level that satisfies the outage criterion, or the transmitted power can be reduced by up to the amount of the link margin. These adjustments can be made for each of the active users.

If the C/I associated with use of the available channels is worse than that required by the user, the desired performance may not be achieved. When this occurs, several options are available. In one option, the data transmission to the user can be at a lower data rate such that the outage criterion is satisfied. In another option, the user is not scheduled for transmission during the current transmission interval, and the channel is made available to some other user. If this occurs, the priority of the user who is not scheduled may be increased, thereby causing it to be considered earlier in the next scheduling and assignment interval.

Even with the power back-off, some of the users in set 1 are not able to operate at the set point γ of 15 dB. When the effective C/I are below the set point, the data rates associated with these users may be reduced to a level that yields acceptable performance (e.g., a particular BER, FER, or outage probability). Nevertheless, in some instances, it may be necessary to eliminate the major sources of interference that prevent these users from operating at the set point. To achieve this, the system can be designed to accommodate adaptation of the back-off factors and/or set points in the channels based on the specific needs of users.

As described above, the back-off factors are dependent on the set point γ required to operate at a particular data rate with a particular level of performance. In practice, the set point γ is a function of the data rate selected by the user. If the data rates of the users are variable, the conditional outage probability given by equation (6) is a function of the selected data rate.

If the user priorities are updated according to their average throughput, the channel assignment can be made to consider the user's data rate assignment as well. Thus, the channel assigned to a particular user is the one that maximizes the user's throughput at a particular outage probability level. For example, the channel assignment process first evaluates the best channel for the user given the list of available channels. The maximum data rate that satisfies the desired outage probability criteria is then assigned to the user for that channel.

The maximum and minimum back-off factors can also be adjusted, if desired. For example, these maximum and minimum limits can be adjusted based on system loading.

For the above example, when the system load is no greater than 4 users per cell, cell 1 assigns users to channels 1 through 4, cell 2 assigns users to channels 5 through 8, and cell 3 assigns users to channels 9 through 12. In this example, all of these channels are operated at full power so the data rates of the users can be adjusted to the values that maximize the throughput for the specific user in the assigned channel. However, if the system set point was lowered, then some of these channels might have back-off factors that prevented the channels from being operating at full power, even though there would be no adjacent cell interference at the load being considered. It may thus be desirable to set the back-off factor to unity for channels 1 through 4 so that full power could be exercised (e.g., to provide additional link margin) when the load in the cell is four users or less.

Second Design Example

In a second design example, the cells are each allocated a fraction of the available resources and thereafter transmits at full power on the allocated resources. Each cell can also transmit on the non-allocated channels as loading increases.

In this second design, users having higher tolerance for interference are assigned channels with higher probability of having large interference levels. It is recognized that the users in any particular cell generally do not have the same tolerance to interference, and this property can be exploited by each cell in assigning the channels. As the load in each cell increases, the impact on throughput for the users that are most likely to interfere with one another is minimized since these users have higher tolerance for interference.

In an embodiment, a cell is provided with information descriptive of the interference experienced by each active user in the cell due to transmissions from other cells. When the number of active users exceeds the number of allocated channels, the cell can then select the user with the higher tolerance to interference and place that user in an overlapping (non-orthogonal) channel that provides the best overall C/I for that user.

For a better understanding of the invention, a specific example is now described in which a 3-cell reuse scheme is employed and cell 1 includes five active users.

Table 10 gives an example of the interference constraints for each of the 5 active users in cell 1. To simplify the example, the following assumptions are made: (1) thermal noise is negligible, (2) all users in cell 1 have identical path loss to cell 1, and (3) all cells transmit at the same fixed power level when they are active (i.e., no power back-off and no power control). This implies that the received signal power is the same for all users (i.e., $C=I_1(1,k)=1$).

Based on the assumptions noted above, column 2 in Table 10 gives the interference levels $I_1(2,k)$ from adjacent cell 2 for each user in cell 1 and column 3 gives the interference levels $I_1(3,k)$ from adjacent cell 3,. The nomenclature $I_m(1,k)$ denotes the interference to user k in cell m from a transmission in cell l for a particular channel. Column 4 gives the C/I for the users in cell 1 given cell 3 is not transmitting (again assuming that C=1). Similarly, column 5 gives the C/I for the users in cell 1 given cell 2 is off. Column 6 gives the effective C/I for the user given that both cells 2 and 3 interfere with the user. The interference and C/I can be determined, for example, based on the pilots transmitted by the cells. These quantities can also be determined at the time of installation (e.g., for fixed terminals) or dynamically by the users and provided to the cells.

The last column is the rank associated with each user in cell 1, where a rank of 1 typically indicates the highest priority. The ranking can be based on a number of ranking schemes, some of which are described below, depending on the overall objectives of the system. As an example of a simple ranking scheme, users are given a ranking based on their overall average throughput. In this example, the ranking assigned to the users are inversely proportional to the C/I of the users (i.e., lowest C/I=highest priority).

TABLE 10

| User, k | Cell 2 Interference $I_1(2,k)$ | Cell 3 Interference $I_1(3,k)$ | $C/I_1(2,k)$ | $C/I_1(3,k)$ | C/I(k) | User Rank |
|---|---|---|---|---|---|---|
| 1 | 0.5 | 0.3 | 2 | 3.33 | 1.25 | 1 |
| 2 | 0.3 | 0.4 | 3.33 | 2.5 | 1.43 | 2 |
| 3 | 0.2 | 0.1 | 5 | 10 | 3.33 | 3 |
| 4 | 0.1 | 0.05 | 10 | 20 | 6.67 | 4 |
| 5 | 0.01 | 0.05 | 100 | 20 | 16.67 | 5 |

The channel assignment can take into account the loading in the adjacent cells so that the channels less likely to be used by the adjacent cells are assigned first. The loading information can be provided by the adjacent cells or estimated by the local cell. The loading information can then be used to compute the probability that the adjacent cell is using a particular channel in the transmission period of interest. Since the cells operate based on similar channel assignment rules, the probability a given channel is occupied by an adjacent cell can be computed or estimated locally.

Table 11 tabulates a specific example of the channel occupancy probability $P_m(n)$ for the 3-cell system, where $P_m(n)$ denotes the probability that channel n of cell m is occupied. Column 2 of Table 11 gives the probability that cell 1 will assign an active user in the cell to a particular channel number (i.e., n=1, 2, . . . 12). Similarly, columns 3 and 4 give the probability that cells 2 and 3, respectively, will assign an active user to a particular channel number. In this example, the channels allocated to the three cells are offset by 4 channels, and this is reflected in the channel occupancy probabilities $P_m(n)$ for the three cells.

In this simple example, each cell concurrently services approximately four users on the average. Two of the users in each cell are assigned to the middle allocated channels, to minimize interference from other cells. For example, two users are typically assigned to channels 2 and 3 in cell 1, two users are typically assigned to channels 6 and 7 in cell 2, and two users are typically assigned to channels 10 and 11 in cell 3. In this example, users are progressively less likely to be assigned to channels further from the middle. Thus, for cell 1, a user is assigned to channel 4 half as often as assigned to channel 3, and to channel 5 one-quarter as often as channel 3, and so on.

In this simple example, the load is identical for all three cells and the channel occupancy probabilities for each cell is simply a shifted version of those for the adjacent cells. It can be noted that any of the cells can derive this table locally by estimating the load in the adjacent cells.

TABLE 11

| Channel, n | $P_1(n)$ | $P_2(n)$ | $P_3(n)$ |
|---|---|---|---|
| 1 | 0.5 | 0.03125 | 0.25 |
| 2 | 1 | 0.0625 | 0.125 |
| 3 | 1 | 0.125 | 0.0625 |
| 4 | 0.5 | 0.25 | 0.03125 |
| 5 | 0.25 | 0.5 | 0.03125 |
| 6 | 0.125 | 1 | 0.0625 |
| 7 | 0.0625 | 1 | 0.125 |
| 8 | 0.03125 | 0.5 | 0.25 |
| 9 | 0.03125 | 0.25 | 0.5 |
| 10 | 0.0625 | 0.125 | 1 |
| 11 | 0.125 | 0.0625 | 1 |
| 12 | 0.25 | 0.03125 | 0.5 |

Table 12 tabulates the channel metrics $h_m(n,k)$ computed using equation (11) for all 5 active users for cell 1 for all 12 available channels. Column 1 lists the 12 channels 1 through 12. Each of columns 2 through 6 lists the channel metrics $h_m(n,k)$ computed for a particular user k. The channel metrics in Table 12 are computed using the channel occupancy probabilities $P_m(n)$ provided in Table 11 and the cell interferences $I_m(l,k)$ provided in Table 10.

For example, the channel metric $h_m(n,k)$ for user 1 for channel 1 can be computed as:

$$h_1(n, 1) = I_1(1, 1) \cdot \begin{bmatrix} P_2(1) \cdot (1 - P_3(1)) \cdot I_1(2, 1) + \\ P_3(1) \cdot (1 - P_2(1)) \cdot I_1(3, 1) + \\ P_2(1) \cdot P_3(1) \cdot (I_1(2, 1) + I_1(3, 1)) \end{bmatrix}^{-1}$$

TABLE 12

| Channel | User | | | | |
| n | k = 1 | k = 2 | k = 3 | k = 4 | k = 5 |
|---|---|---|---|---|---|
| 1 | 11.03 | 9.14 | 32.00 | 64.00 | 73.99 |
| 2 | 14.55 | 14.55 | 40.00 | 80.00 | 131.96 |
| 3 | 12.31 | 16.00 | 32.00 | 64.00 | 196.92 |
| 4 | 7.44 | 11.43 | 18.82 | 37.65 | 209.84 |
| 5 | 3.86 | 6.15 | 9.70 | 19.39 | 125.49 |
| 6 | 1.93 | 3.08 | 4.35 | 9.70 | 53.33 |
| 7 | 1.86 | 2.86 | 4.71 | 9.41 | 36.36 |
| 8 | 3.08 | 4.00 | 8.00 | 16.00 | 34.78 |
| 9 | 3.64 | 3.64 | 10.00 | 20.00 | 25.81 |
| 10 | 2.76 | 2.29 | 8.00 | 16.00 | 16.00 |
| 11 | 3.02 | 2.39 | 8.89 | 17.78 | 17.78 |
| 12 | 6.04 | 4.78 | 17.78 | 35.56 | 37.43 |
| User Rank → | 1 | 2 | 3 | 4 | 5 |
| Assigned Channel → | 2 | 3 | 1 | 4 | 5 |

As noted from Table 12, the channel metrics for all users in cell 1 are generally higher around channels 2 and 3 (the middle of the channels allocated to cell 1), and tend to taper off away from the middle. Also, for this example, user 1 has the lowest set of metrics and user 5 has the highest set of metrics, with the metrics progressively increasing from left to right.

In an embodiment of a channel assignment scheme, channels are assigned based on the ranks of the users and a set of channel metrics such as those provided in Table 12.

Various channel assignment schemes can be used to assign the channels to the user. These schemes can range in complexity and in the optimality (i.e., quality) of the assignment results. A few of the schemes are described below for illustration of the invention. However, other schemes can also be applied and are within the scope of the present invention.

In a specific channel assignment scheme that is simple to implement, the best possible channel is assigned to successively lower priority users, starting with the highest priority user. The higher priority users are less tolerant to interference and are assigned better channels. Thus, user 1 (the highest priority user) is assigned channel 2 corresponding to its highest metric of 14.55. Channel 2 is then removed from the list of available channels in the cell. User 2 (the second highest priority user) is next assigned channel 3 corresponding to its highest metric of 16.00, and channel 3 is then removed from the list. User 3 (the third highest priority user) has the highest metric for channel 2, but is assigned channel 1 since both channels 2 and 3 have already been assigned and are not available. Similarly, user 4 is assigned channel 4, corresponding its fourth highest metric, since channels 1 through 3 have already been assigned. Finally, user 5 is assigned channel 5, the channel with the highest metric among the available channels. The channel assigned to each user is listed in the last row of Table 12.

In an embodiment, if there is a tie during the channel assignment (i.e., if more than one channels are associated with the same or similar channel metrics), the channels are not assigned immediately. Instead, those channels that resulted in the tie are tagged and evaluation of other lower priority users continues. If the next user has its largest metric associated with any one of the tagged channels, then that channel may be assigned to that user and removed from the list of available channels. When the list of tagged channels for a specific user is reduced to one, the remaining channel is assigned to the highest priority user that tagged that channel.

In another channel assignment scheme that is a variation of the one described above, the differences between the channel metrics associated with the channels can be taken into account in the channel assignment. In some instances, it may be better to not assign the highest priority user the channel with the highest metric. For example, if a particular user has a number of channels with approximately similar metrics, or if a number of channels can provide the required C/I, the user may be assigned one of several channels and still be properly served. If a lower priority user has its best channel the same as the higher priority user, and if there were a large disparity between the second highest priority user's best and second best channels, then it may be more optimal to assign the higher priority user its second best channel and assign the lower priority user its best channel. For example, if user 1 has similar channel metrics for channels 2 and 3 and the next lower priority user 2 has a much larger channel metric for channel 3, then user 1 can be assigned channel 2 and user 2 can be assigned channel 3.

In yet another channel assignment scheme, the highest priority user tags the available channels that provide the required performance (similar to the tagging of tied channels described above). The next lower priority user then tags its acceptable channels. The channel assignment is then performed such that lower priority users are assigned channels first but channels needed by higher priority users are reserved.

In yet another channel assignment scheme, the channels are more optimally assigned to active users in the cell by considering a large number of permutations of channel assignments over the group of active users in the cell. In this case, the channel decision for a particular user is not made on the basis of the user's metrics and priority alone. In an implementation, the user's priority can be converted into a weight that is used to scale the metrics in the computation of the channel assignments in the cell.

For this and other embodiments of the invention, the transmitters in the affected cells that prevent the disadvantaged users from achieving their set point are adaptively reduced (also referred to herein as "cell dimming") or disabled (also referred to herein as "cell blanking") to reduce the interference to the disadvantaged users. The cell dimming or blanking can be achieved in a number of different ways. In an embodiment, information is collected from the users in the system and a minimum number of cells are dimmed or blanked in order to meet the minimum requirements for all users in the coverage area. The control of the cells can be achieved using a centralized control or a distributed control.

In an embodiment, the cell dimming or blanking is achieved by collecting information relating to the interference environment (e.g., the propagation loss environment) for each user. For example, each user can measure the received signal level from each cell that exceeds a particular threshold. A similar measurement can be performed by the cell for signals received from the transmitting users. The collected information can be used to estimate the C/I is for a particular user when only a subset of the cells is enabled. This information is then used to select a subset of users to transmit to in a given time interval so that the system throughput is maximized for a given set of constraints.

The above design examples illustrate specific implementations of combinations of some of the aspects of the invention. The various aspects and embodiments of the invention can be combined in numerous ways to implement many different communications systems.

Improvements with Adaptive Reuse

In accordance with some aspects of the invention, the available system resources are adaptively allocated to achieve greater efficiency and to meet the system requirements. To achieve high spectral efficiency, it is desirable to use a reuse factor that is as close to unity as possible while still satisfying the performance criterion set forth. For a conventional fixed reuse pattern, the reuse factor is typically set such that the minimum data rate requirements are met for some specified percentage of the coverage area. When designed to meet the worst-case requirements (e.g., 1% outage probability), the conventional fixed reuse pattern is highly inefficient since it does not support flexible adaptation of the available resources to changing system conditions to achieve high spectral efficiency.

The improvement in average performance provided by the adaptive reuse of the invention can be estimated by a Monte-Carlo system simulation that evaluates the average reuse as a function of the C/I required to meet a particular minimum data rate requirement (i.e., a particular set point). For this simulation, reuse utilization is defined as the ratio of the number of active cells to total number of cells. In the system simulation, a large number of traffic distribution realizations (or simply, realizations) are evaluated.

For idealized cellular system with hexagonal cell layouts and utilizing a common frequency in every cell, the distribution of C/I achieved within the idealized cells can be calculated. The C/I achieved by any given user is a function of the path loss, which for terrestrial cellular systems typically increases as $d^3$ to $d^4$, where d is the distance from the user to the radiating source. In the simulation, each realization places users uniformly within each cell. The users have an effective receive antenna beamwidth of 30-degrees. Omni-directional antennas are used at the cells. The path loss, L, in dB follows a 35 dB/decade loss slope based on the distance, d, of the user to the cell. The path loss, $L_m(k)$, for user k to cell m can be expressed as:

$$L_m(k) = 35 \cdot \log_{10}(d_m(k)).$$

The path loss is subject to random variations due to man-made or natural obstructions within the propagation path(s) of the radio wave(s). These random variations are typically modeled as a log-normal shadowing random process with a standard deviation of 8 dB. The actual path loss, $\hat{L}_m(k)$, is given by the sum of $L_m(k)$ in dB plus a normally distributed random variable, x, having zero mean and a standard deviation of 8 dB, and can be expressed as:

$$\hat{L}_m(k) = L_m(k) + x_m(k).$$

The resulting C/I distribution achieved for an ideal hexagonal cellular layout with omni-directional base station antennas and shadowing process with 8 dB standard deviation is shown in FIG. 7.

The maximum cell transmit power is normalized to unity, and the received power, $I_m(k)$, from cell m for user k is given by:

$$I_m(k) = 10^{-\hat{L}_m(k)}$$

A primary cell of a user is the cell associated with the largest received signal level, which can be expressed as:

$$C_m(k) = \max_{n \in N_{cells}} \{I_n(k)\}.$$

The neighbor cells represent interference terms, and their maximum interference power can be expressed as:

$$\hat{I}_m(k) = \sum_{\substack{n=1 \\ n \neq m}}^{N_{cells}} I_n(k).$$

For each realization in the simulation, users are placed randomly (e.g., uniformly distributed) in each cell of the system. The median path losses are then evaluated from each cell to each user.

The power to be transmitted to each user can be estimated by a number of methods. In the simulation, transmit power estimates are based on a full power assumption, i.e., the user estimates the signal levels from each cell based on a full transmit power assumption. Given this, certain advantaged users will observe C/I levels that are in excess of the set point. In these instances, the cell can reduce the transmitted power by an amount related to the observed margin for that user (i.e., reduced by the difference between the observed C/I and the set point). The actual C/I of the users in the system will be greater than that computed in the simulation since not all cells will be operating at full transmit power. It is also possible to more accurately determine the power level required by each user, which can result in better spectral efficiency.

For each realization, the transmit power of the interfering cells are ranked for each user. The adaptive reuse scheme employed in the simulation then randomly selects one user to start with. The minimum number of cells that need to be disabled (i.e., transmitter disabled) in order to meet the set point is determined for this user. This can be achieved by iteratively evaluating the C/I for this user by incrementing the interference power based on a ranked list of interfering cell powers (e.g., ranked from lowest to highest transmit power). For each cell being evaluated, if the measured C/I falls below the set point as a result of enabling the cell, the current and remaining interfering cells on the ranked list for this user are disabled. The simulation then randomly selects another cell from the remaining list of active cells and continues until there are no more active cells to evaluate. The reuse coefficient, defined as the ratio of number of cells enabled to total number of cells, is recorded for each realization.

Figure 12:
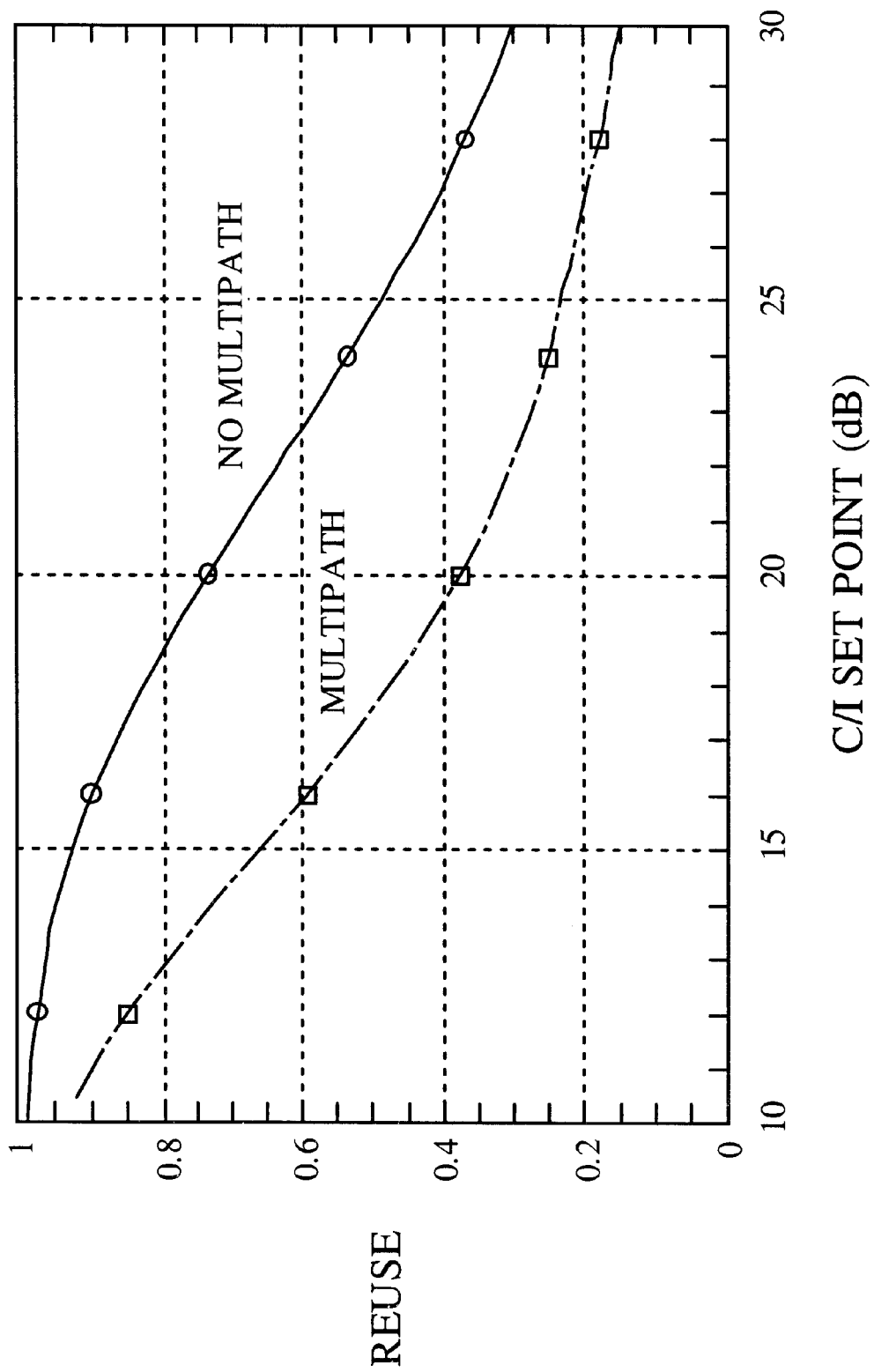
FIG. 12 are plots of the average reuse coefficient as a function of set point for two different scattering environments.

FIG. 12 shows plots of the average reuse coefficient as a function of the set point for two different scattering environments. For the plot labeled "no multipath", the reuse coefficient is shown to be very close to 1.0 for set points less than 12 dB. As the set point is increased, more cells must be disabled to achieve the set point and the reuse coefficient drops. This adaptive reuse scheme achieves much greater spectral efficiency than that of a fixed reuse scheme. The average reuse is also observed to be lower when multipath scattering is prevalent. This is because the isolation provided against the interfering cells when using directional antennas is less effective due to random scattering of energy. When scattering is present, a larger number of cells must be disabled on average in order to meet the set point.

Table 13 shows the spectral efficiency attainable with the simulated adaptive reuse scheme. In the Table 13, the spectral efficiency is computed for various set points ranging from 10 to 26 dB, in 2 dB increments. Table 13 is computed for the no-multipath condition and assumes that system operates each link at the specified set point.

For each set point, the average reuse corresponding to the set point is determined from FIG. 12 and provided in column 2. The modulation efficiency for the set point is determined from Table 1 and provided in column 3. The spectral efficiency is computed by multiplying the average reuse by the modulation efficiency. For example, for a set point of 14 dB, the average reuse determined from FIG. 12 is approximately 0.95. From Table 1, a C/I of at least 12.6 dB is required to achieved 1% BER using 8-PSK, which correspond to a modulation efficiency of 3 bits/Hz (at least 14.3 dB would be required for 16-QAM). The spectral efficiency can thus be calculated as 2.85 (i.e., 0.95·3).

TABLE 13

| Set Point (dB) | Average Reuse | Modulation Efficiency (bps/Hz) | Spectral Efficiency (bps/Hz/cell) |
| --- | --- | --- | --- |
| 10 | 0.99 | 2 | 1.98 |
| 12 | 0.98 | 2 | 1.96 |
| 14 | 0.95 | 3 | 2.85 |
| 16 | 0.90 | 4 | 3.61 |
| 18 | 0.83 | 5 | 4.16 |
| 20 | 0.74 | 5 | 3.69 |
| 22 | 0.64 | 6 | 3.83 |
| 24 | 0.54 | 6 | 3.24 |
| 26 | 0.45 | 6 | 2.68 |

In comparing the spectral efficiency associated with the adaptive reuse scheme simulated here to that of the conventional fixed reuse scheme, the improvement in spectral efficiency can be readily observed. The set point in the adaptive reuse scheme approximately guarantees (i.e., the outage probability≈0.0) that the worst-case user can achieve the minimum performance requirement, which can be defined as a particular minimum data rate for a particular percentage of the time.

In Table 13, it can be noted that the maximum spectral efficiency is achieved at a set point of 18 dB. At this set point, each link operates with a modulation efficiency of 5 bps/Hz. The average reuse coefficient at this operating set point is approximately 0.83, which gives an overall spectral efficiency of 4.16 bps/Hz/cell. A fixed reuse scheme has significantly lower spectral efficiency than this. For example, using a 7-cell reuse pattern, a spectral efficiency of 0.82 bps/Hz/cell can be achieved at similar outage probability of 1%. Thus, this adaptive reuse scheme achieves nearly 5 times the spectral efficiency of the fixed reuse scheme with lower outage probability.

In the simulation, no optimization was performed. The users to be processed are randomly selected and no search of the "best" combination of cells to disable was conducted. With a more intelligent control scheme, it is possible to search for a better solution than the random solution used in the simulation.

Sub-optimal control schemes can be employed that achieve performance close to that provided by the optimal solution. Moreover, it is preferable to minimize complexity of the control scheme and to reduce the dependency on real-time coordination between cells. Decentralized resource allocation, scheduling, and channel assignment can be devised that attempts to achieve this.

Another set of simulations was performed for five different reuse schemes for a multiple-input multiple-output (MIMO) communications system, such as the one described in the aforementioned U.S. patent application Ser. No. 09/532,492.

Figure 13A:
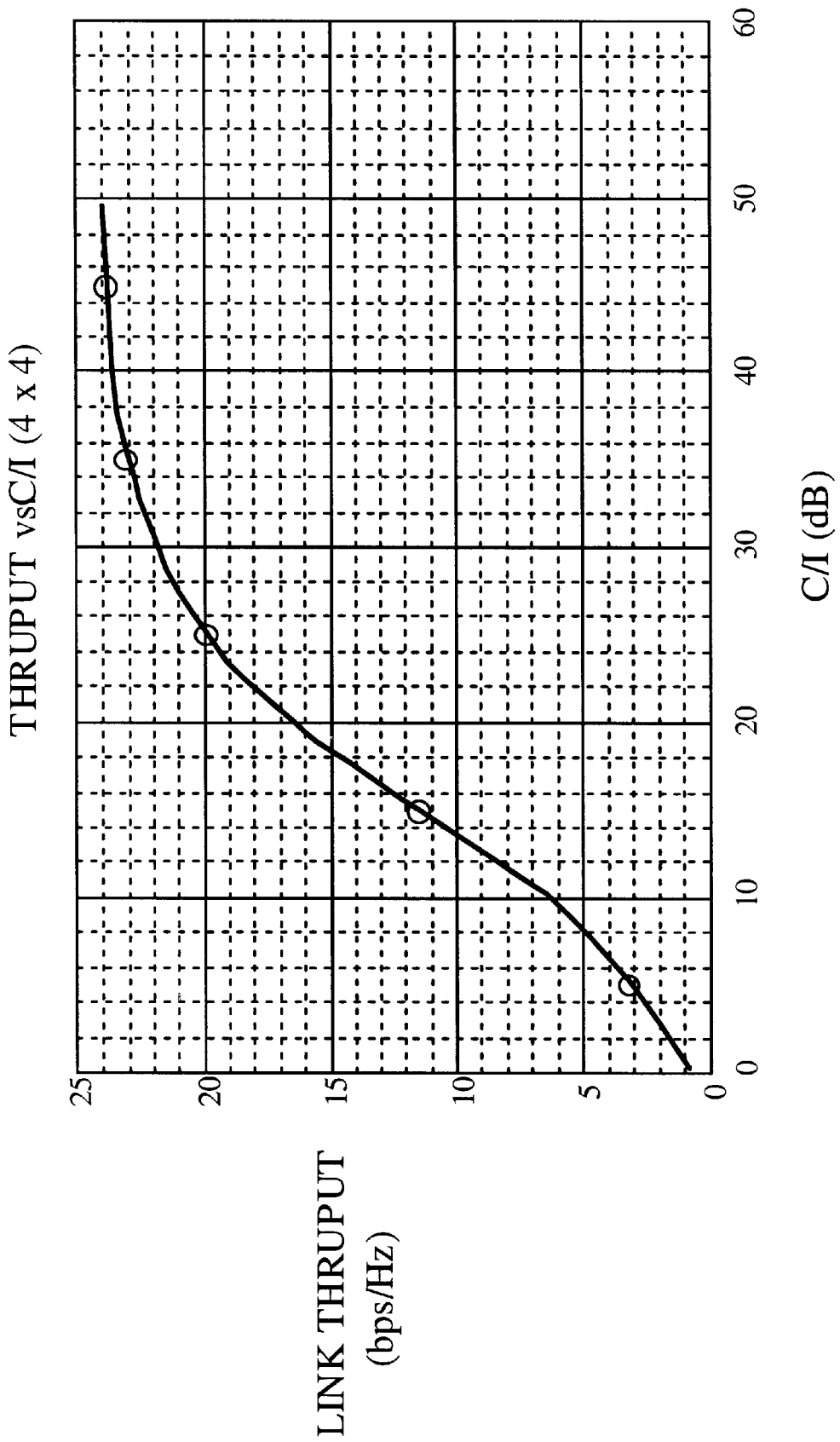
FIG. 13A is a plot of the throughput of a user given as a function of C/I for a 4×4 multiple-input multiple-output (MIMO) mode with four transmit antennas and four receive antennas.

FIG. 13A is a plot of the throughput of a user given as a function of C/I for a 4×4 MIMO communications system with four transmit antennas and four receive antennas.

Figure 13B:
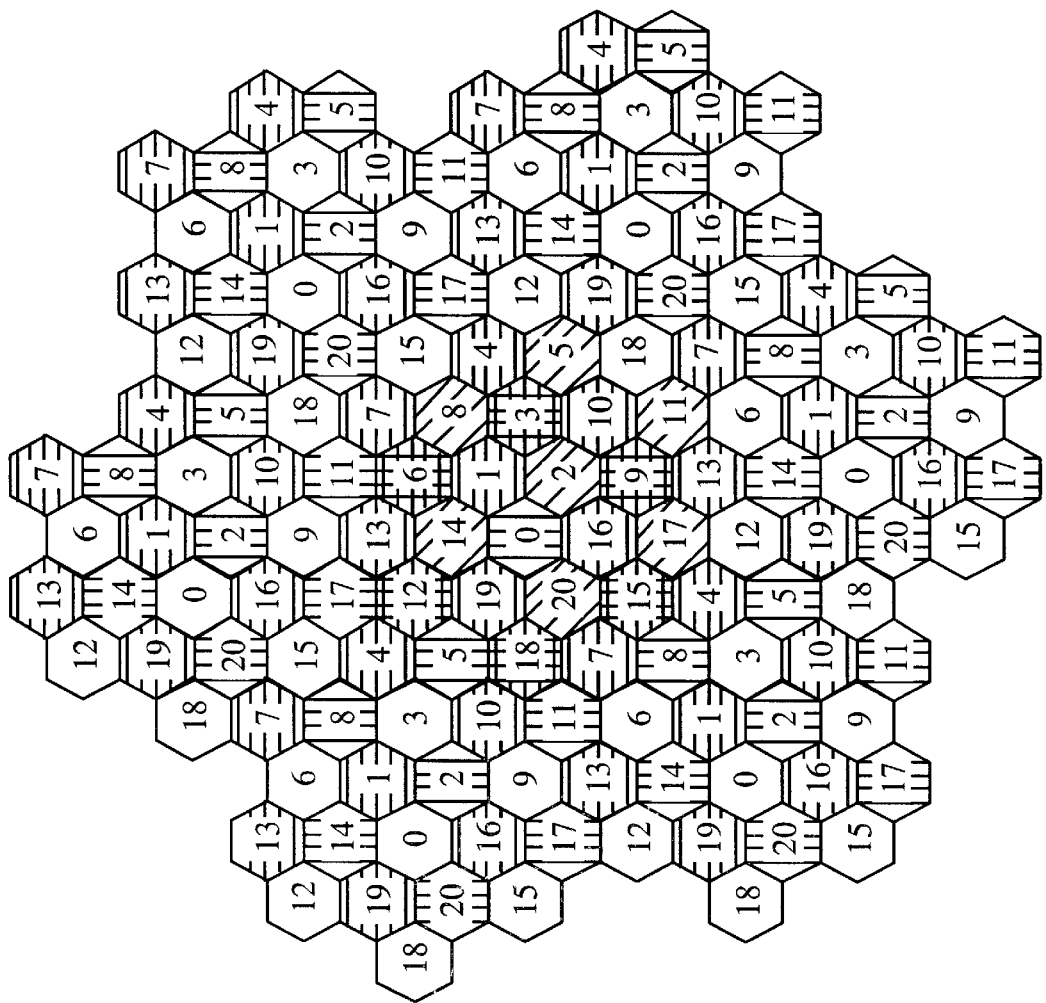
FIG. 13B is a graph that depicts the cell layout used for a simulation of five different reuse schemes.

FIG. 13B is a graph that depicts the cell layout used for the simulation. In the simulation, the center 21-cells (i.e., the shaded cluster in FIG. 13B) are embedded in an infinite plane of cells (i.e., an idealized hexagonal cell layout). Performance is measured for the users in the center cluster of 21 cells. The received power from the primary cell and the received interference terms from neighbor cells can be computed as described above.

The channel metrics for a particular cell can be evaluated for the users in the cell using the defined back-off factors and reuse scheme. The users are assigned priorities based on the computed channel metrics and other factors, as described above. Channels are assigned to the users based on the priorities of the active users in the cell, from highest to lowest priority user. A particular user k assigned to channel n in cell m has an observed C/I given by:

$$C/I = \frac{\beta_m(n) \cdot C_m(k)}{\sum_{\substack{i=1 \\ i \neq m}}^{N_{cells}} \beta_i(n) \cdot I_i(m,k)},$$

where $\beta_l(n)$ is the back-off factor used in channel n of cell l.

A variety of performance measures (e.g., average throughput per cell, user C/I distributions, user data rate distributions, and so on) are recorded for each of the users in each of the 21 cells for each realization. A large number of realizations are simulated to provide adequate confidence in the performance measures.

Several reuse schemes are evaluated in the simulation. These reuse schemes are described as follows:

Reuse Scheme A: Unity reuse, Random channel assignments, and No power control.
  Users are assigned channels on a randomized basis. Unity reuse is employed so that cells may assign users to any of the available channels. No power control is employed and all channels are operated at full power. Users are allowed to operate at the maximum data rate (as depicted in FIG. 13A) permitted by their achieved C/I.

Reuse Scheme B: Unity reuse, Random channel assignments, and Power control.
  Similar to Reuse Scheme A, except that power control is employed for users with positive margin (the margin is measured assuming all cells operate at full power). The transmitted power allocated to users is reduced to that required to meet a set point of 15 dB.

Reuse Scheme C: 3-cell Reuse, Power back-off imposed, Metric-based channel assignments, User priorities based on C/I, and No power control.
  A reuse plan of $N_r=3$ is employed giving 7 sub-clusters of 3 cells each in the 21-cell cluster as depicted in FIG. 13B. Each of the cells in a sub-cluster is assigned $N_s=4$ channels, yielding a total $N_c=12$ channels per cell that are available for assignment. The back-off structure given in Table 4 is imposed, which is designed to achieve a 15 dB set point in 11 of the 12 channels. The channel assignments are made on the basis of the expected C/I channel metrics given by equation (12). The user priorities are based the channel metrics averaged over the 12 channels. Power control is not exercised, and the back-off factors employed for each channel remain fixed at the levels indicated in Table 4.

Reuse Scheme D: 3-cell Reuse, Power back-off imposed, Metric-based channel assignments, User priorities based on C/I, and Power control.
  Similar to Reuse Scheme C, except that power control is exercised for users having positive margin. The back-off factors employed for each channel are reduced (i.e., transmit power is reduced) to the level required to meet a 15 dB set point.

Reuse Scheme E: 3-cell Reuse, Power back-off imposed, Metric-based channel assignments, User priorities based on average potential throughput, and Power control.
  Similar to Reuse Scheme D, except that the channel assignments are made using user priorities that represent the cumulative "potential" throughput of each user over 10 assignment intervals (e.g., 10 frames). The potential throughput is based on "realizable" data rates, which are described above. For each user realization, 10 channel assignments are performed in a sequential manner. For the first frame, the user priorities are based on the average of the channel metrics computed using equation (12). The user priorities in subsequent frames are given by the sum of the potential throughput achieved for the user in all previous frames within the 10-frame averaging interval. For example, the priority for a user in frame 5 is the sum of the potential throughput achieved by the user in frames 1, 2, 3 and 4.

Table 14 gives the probability that the C/I is less than the set point of 15 dB for different cell loads and for each of the five reuse schemes described above. For a particular load, reuse scheme A has the greatest percentage of users with C/I below the set point. Reuse scheme B demonstrates that with power control, the percentage of users having a C/I below the set point is decreased significantly. Reuse scheme C shows that by using fixed back-off factors without power control, a reduction in the number of users with C/I below the set point is achieved relative to the results for reuse scheme A. Reuse scheme D illustrates that when power control is employed in conjunction with the back-off factors, the performance is improved over reuse scheme B in which only power control is used. Finally, reuse scheme E shows a slight degradation relative to reuse scheme D, which is caused by the shuffling of users over the channels due to re-prioritization occurring during the 10-frame averaging interval. However, the shuffling improves the average performance of some of the disadvantage users, which reduces their outage probability, as described below.

TABLE 14

| Cell Load (number of users) | Reuse Scheme A | Reuse Scheme B | Reuse Scheme C | Reuse Scheme D | Reuse Scheme E |
|---|---|---|---|---|---|
| 1 | 0.012810 | 0.005619 | 0.033810 | 0.005524 | 0.004286 |
| 2 | 0.031143 | 0.012214 | 0.036905 | 0.008667 | 0.007714 |
| 3 | 0.044159 | 0.018079 | 0.035079 | 0.013095 | 0.008619 |
| 4 | 0.060774 | 0.024476 | 0.045833 | 0.015869 | 0.017655 |
| 5 | 0.077419 | 0.029724 | 0.042286 | 0.017105 | 0.015229 |
| 6 | 0.094413 | 0.036516 | 0.046984 | 0.019595 | 0.020825 |
| 7 | 0.107231 | 0.044585 | 0.051769 | 0.019952 | 0.023014 |
| 8 | 0.128702 | 0.052351 | 0.062262 | 0.023393 | 0.026226 |
| 9 | 0.150847 | 0.059386 | 0.070212 | 0.026074 | 0.035439 |
| 10 | 0.168419 | 0.065781 | 0.080714 | 0.031314 | 0.042857 |
| 11 | 0.191372 | 0.074481 | 0.100043 | 0.036874 | 0.053866 |
| 12 | 0.209246 | 0.081190 | 0.144643 | 0.055512 | 0.082306 |

The throughput for each of the five schemes typically conforms to a particular distribution having a particular median (or average) value, a particular standard deviation, and tails at one or both ends of the distribution. The shape of the distribution is dependent on the particular reuse scheme employed. For reuse scheme A in which no power control or power back-off is employed and users are allowed to transmit at the maximum achievable data rate dictated by their C/I, the distribution has a higher mean and higher standard deviation. As more control (e.g., power back-off and power control) is applied, the mean of the distribution generally decreases (as the result of limiting the transmit power to advantaged users and thus their data rates) but the standard deviation of the distribution also decreases (since the performance of disadvantaged users is improved due to the applied control). The applied control affects the shape of the distribution and thus the performance of the system.

Table 15 gives the average throughput per channel as a function of load for each of the five reuse schemes. The average throughput per channel for ruse scheme A varies from 1.66 bps/Hz at low loads to 1.33 bps/Hz at full load. In the simulation for reuse scheme A, the data rate of a user is allowed to vary with the achieved C/I (based on FIG. 13A). Reuse scheme A has the highest average throughput of the five reuse schemes, but the range of user data rates observed per channel is large. This implies that different users will experience different levels of service, depending on the C/I achieved in the assigned channel.

Reuse scheme B through E limit the transmit power in an attempt to achieve a set point of 15 dB, which corresponds to a peak throughput of 0.96 bps/Hz/channel. By limiting the transmit power, the interference levels are reduced and the percentage of users with poor C/I decreases, as is indicated in Table 14. The cost of limiting transmit power is decreased average throughput per channel relative to that of reuse scheme A. The performance data given in Table 5 shows that the average throughput per channel is reasonably close to 0.96 bps/Hz/channel, even at full load.

TABLE 15

| Cell Load (number of users) | Reuse Scheme A | Reuse Scheme B | Reuse Scheme C | Reuse Scheme D | Reuse Scheme E |
|---|---|---|---|---|---|
| 1 | 1.664 | 0.957 | 0.949 | 0.957 | 0.957 |
| 2 | 1.648 | 0.955 | 0.951 | 0.956 | 0.957 |
| 3 | 1.635 | 0.953 | 0.949 | 0.955 | 0.956 |
| 4 | 1.601 | 0.951 | 0.946 | 0.955 | 0.954 |
| 5 | 1.563 | 0.950 | 0.948 | 0.954 | 0.954 |
| 6 | 1.528 | 0.948 | 0.947 | 0.953 | 0.953 |
| 7 | 1.498 | 0.946 | 0.946 | 0.953 | 0.953 |
| 8 | 1.461 | 0.944 | 0.945 | 0.952 | 0.952 |
| 9 | 1.422 | 0.942 | 0.943 | 0.952 | 0.950 |
| 10 | 1.395 | 0.940 | 0.940 | 0.951 | 0.947 |
| 11 | 1.362 | 0.938 | 0.937 | 0.950 | 0.945 |
| 12 | 1.335 | 0.936 | 0.927 | 0.946 | 0.937 |

In many communications system, a minimum average throughput requirement is imposed on all users in the coverage area. Therefore, in addition to examining the average throughput per channel, the percentage of users having an average throughput exceeding some minimum requirement is typically important.

Figure 13C:
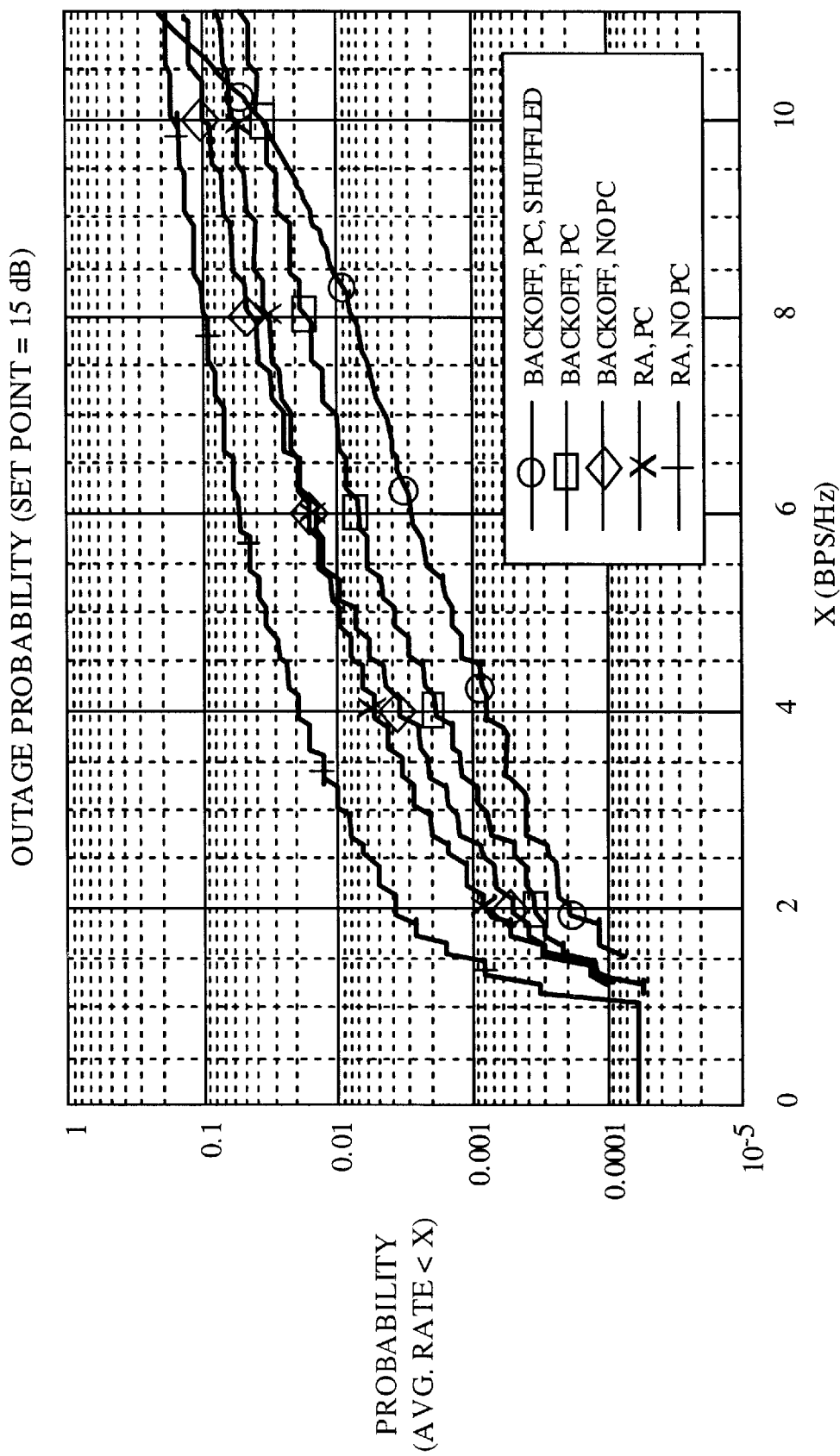
FIG. 13C are plots of the probability that the average user throughput falls below the value given on the x-axis for each of the five reuse schemes.

FIG. 13C are plots of the probability that the average user throughput falls below the value given on the x-axis for each of the five reuse schemes. The results shown in FIG. 13C are for fully loaded cells (i.e., all 12 channels occupied in every cell), and illustrate the effectiveness of each reuse scheme at satisfying a minimum average throughput requirement. For example, reuse scheme A achieves a minimum average throughput of 0.7 bps/Hz/channel for 90% of the users, whereas reuse scheme E achieves this throughput for 99% of the users. Another way to view the results is to examine the minimum average throughput that is achieved for a particular percentage of the users (e.g., for 99% of the users, or a coverage requirement or 99%). For the 99% coverage requirement, reuse scheme A achieves a minimum average throughput of 0.25 bps/Hz/channel whereas reuse scheme E achieves 3 times this value, or 0.75 bps/Hz/channel.

System Design

The invention as described above can be implemented in numerous communications systems such as the ones described in the aforementioned U.S. patent application Ser. Nos. 09/532,492 and 08/963,386, and in U.S. Pat. No. 5,103,459, all assigned to the assignee of the present invention and incorporated herein by reference.

Figure 14:
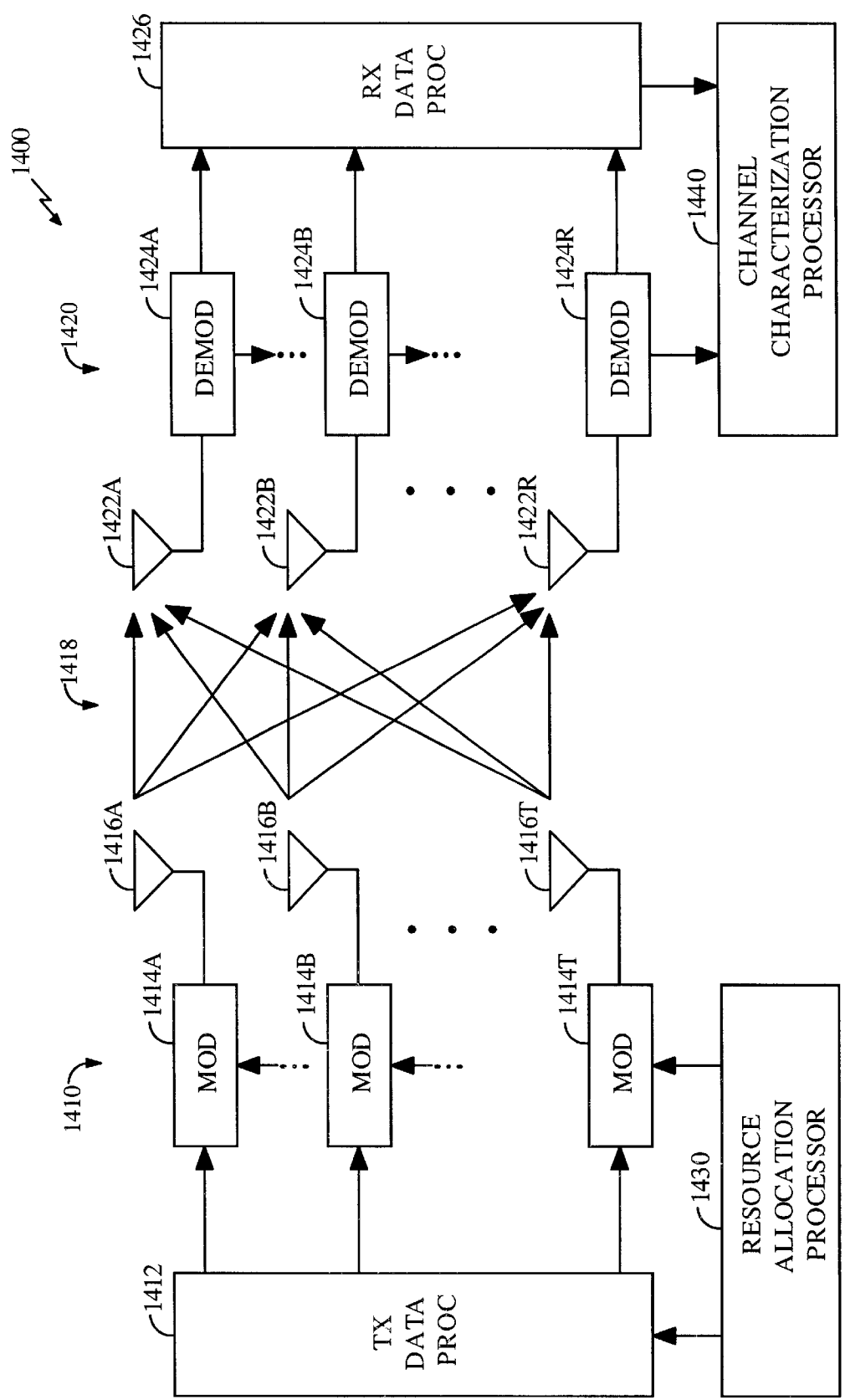
FIG. 14 is a diagram of a MIMO communications system capable of implementing some aspects and embodiments of the invention.

FIG. 14 is a diagram of a multiple-input multiple-output (MIMO) communications system 1400 capable of implementing some aspects and embodiments of the invention. Communications system 1400 can be operative to provide a combination of antenna, frequency, and temporal diversity to increase spectral efficiency, improve performance, and enhance flexibility, as described in the aforementioned U.S. patent application Ser. No. 09/532,492.

As shown in FIG. 14, communications system 1400 includes a first system 1410 in communication with a second system 1420. System 1410 includes a (transmit) data processor 1412 that (1) receives or generates data, (2) processes the data to provide antenna, frequency, or temporal diversity, or a combination thereof, and (3) provides processed modulation symbols to a number of modulators (MOD) 1414a through 1414t. Each modulator 1414 further processes the modulation symbols and generates an RF modulated signal suitable for transmission. The RF modulated signals from modulators 1414a through 1414t are then transmitted from respective antennas 1416a through 1416t over communications links 1418 to system 1420.

In the embodiment shown in FIG. 14, system 1420 includes a number of receive antennas 1422a through 1422r that receive the transmitted signals and provide the received signals to respective demodulators (DEMOD) 1424a through 1424r. As shown in FIG. 14, each receive antenna 1422 may receive signals from one or more transmit antennas 1416 depending on a number of factors such as, for example, the operating mode used at system 1410, the directivity of the transmit and receive antennas, the characteristics of the communications links, and others. Each demodulator 1424 demodulates the respective received signal using a demodulation scheme that is complementary to the modulation scheme used at the transmitter. The demodulated symbols from demodulators 1424a through 1424r are then provided to a (receive) data processor 1426 that further processes the symbols to provide the output data. The data processing at the transmitter and receiver units is described in further detail in the aforementioned U.S. patent application Ser. No. 09/532,492.

In system 1410, a resource allocation processor 1430 couples to data processor 1412 and to modulators 1414a through 1414t. Resource allocation processor 1430 collects data indicative of the operating condition of the system, defines the reuse plan, receives user requests for data transmissions, performs scheduling of requested transmissions, assigns channels to active users, and coordinates the data transmissions. Resource allocation processor 1430 can be designed to implement various aspects and embodiments of the invention described above.

In system 1420, a channel characterization processor 1440 couples to data processor 1426 and (possibly) to demodulators 1424a through 1424r. Channel characterization processor 1440 processes the received samples to determine various characteristics of the received signal and/or communications link (e.g., the C/I, FER, and so on). For example, channel characterization processor 1440 may be designed and operated to determine the C/I for the signals from various cells to which system 1420 can communicate, which can be used to select the primary cell. Channel characterization processor 1440 can also determine the interference from neighbor cells so that the cell(s) causing excessive interference may be requested to reduce or disable their transmit power to allow system 1420 to achieve its set point. The characterized parameters are sent by system 1420 to the interested cell(s).

FIG. 14 shows only the downlink transmission from system 1410 to system 1420. This configuration may be used for data broadcast and other one-way data transmission applications. In a bidirectional communications system, a uplink from system 1420 to system 1410 is also provided, although not shown in FIG. 14 for simplicity. For the bidirectional communications system, each of systems 1410 and 1420 may operate as a transmitter unit or a receiver unit, or both concurrently, depending on whether data is being transmitted from, or received at, the unit.

For simplicity, communications system 1400 is shown to include one transmitter unit (i.e., system 1410) and one receiver unit (i.e., system 1420). However, other variations and configurations of the communications system are possible. For example, in a multi-user, multiple access communications system, a single transmitter unit may be used to concurrently transmit data to a number of receiver units. Also, in a manner similar to soft-handoff in an IS-95 CDMA system, a receiver unit may concurrently receive transmissions from a number of transmitter units. The communications system may include any number of transmitter and receiver units.

Each transmitter unit may include a single transmit antenna or a number of transmit antennas, such as that shown in FIG. 14. Similarly, each receiver unit may include a single receive antenna or a number of receive antennas, again such as that shown in FIG. 14. For example, the communications system may include a central system (i.e., similar to a base station in the IS-95 CDMA system) having a number of antennas that transmit data to, and receive data from, a number of remote systems (i.e., subscriber units, similar to remote stations in the CDMA system), some of which may include one antenna and others of which may include multiple antennas. Generally, as the number of transmit and receive antennas increases, antenna diversity increases and performance improves, as described in detail in the aforementioned U.S. patent application Ser. No. 90/532,492.

Figure 15:
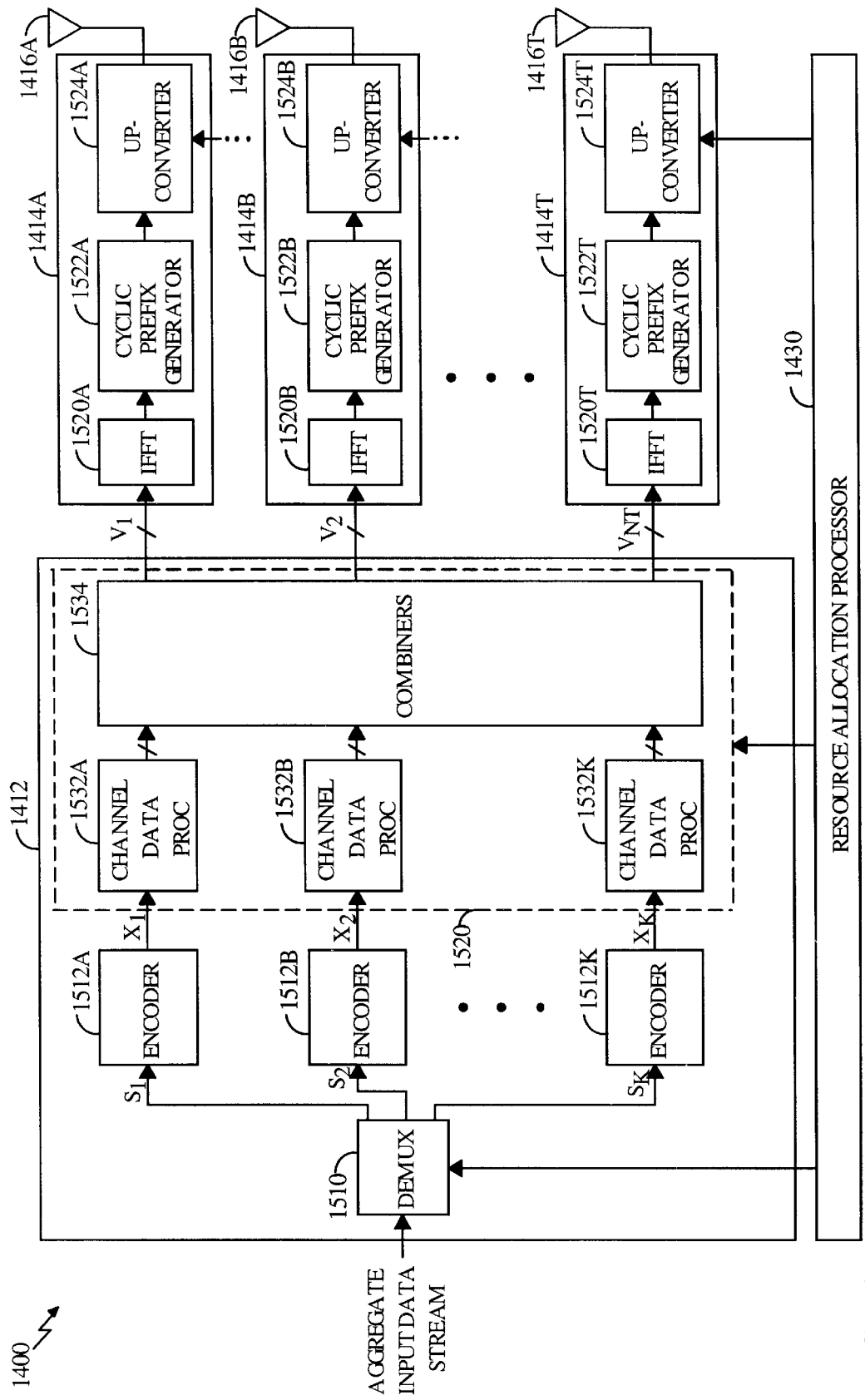
FIG. 15 is a block diagram of an embodiment of a data processor and a modulator of the transmission system shown in FIG. 14.

FIG. 15 is a block diagram of an embodiment of data processor 1412 and modulator 1414 of system 1410 in FIG. 14. The aggregate input data stream that includes all data to be transmitted by system 1410 is provided to a demultiplexer (DEMUX) 1510 within data processor 1412. Demultiplexer 1510 demultiplexes the input data stream into a number of (K) channel data stream, $S_1$ through $S_k$. Each channel data stream may correspond to, for example, a signaling channel, a broadcast channel, a voice call, or a traffic data transmission. Each channel data stream is provided to a respective encoder 1512 that encodes the data using a particular encoding scheme.

The encoding may include error correction coding or error detection coding, or both, used to increase the reliability of the link. More specifically, such encoding may include, for example, interleaving, convolutional coding, Turbo coding, Trellis coding, block coding (e.g., Reed-Solomon coding), cyclic redundancy check (CRC) coding, and others. Turbo encoding is described in further detail in U.S. patent application Ser. No. 09/205,511, entitled "TURBO CODE INTERLEAVER USING LINEAR CONGRUENTIAL SEQUENCES," filed Dec. 4, 1998, and in a document entitled "The cdma2000 ITU-R RTT Candidate Submission," hereinafter referred to as the IS-2000 standard.

The encoding can be performed on a per channel basis, i.e., on each channel data stream, as shown in FIG. 15. However, the encoding may also be performed on the aggregate input data stream, on a number of channel data streams, on a portion of a channel data stream, across a set of antennas, across a set of sub-channels, across a set of sub-channels and antennas, across each sub-channel, on each modulation symbol, or on some other unit of time, space, and frequency. The encoded data from encoders 1512a through 1512k is then provided to a data processor 1520 that processes the data to generate modulation symbols.

In one implementation, data processor 1520 assigns each channel data stream to one or more sub-channels, at one or more time slots, and on one or more antennas. For example, for a channel data stream corresponding to a voice call, data processor 1520 may assign one sub-channel on one antenna (if transmit diversity is not used) or multiple antennas (if transmit diversity is used) for as many time slots as needed for that call. For a channel data stream corresponding to a signaling or broadcast channel, data processor 1520 may assign the designated sub-channel(s) on one or more antennas, again depending on whether transmit diversity is used. Data processor 1520 then assigns the remaining available resources for channel data streams corresponding to data transmissions. Because of the burstiness nature of data transmissions and the greater tolerance to delays, data processor 1520 can assign the available resources such that the system goals of high performance and high efficiency are achieved. The data transmissions are thus "scheduled" to achieve the system goals.

After assigning each channel data stream to its respective time slot(s), sub-channel(s), and antenna(s), the data in the channel data stream is modulated using multi-carrier modulation. In an embodiment, orthogonal frequency division multiplexing (OFDM) modulation is used to provide numerous advantages. In one implementation of OFDM modulation, the data in each channel data stream is grouped to blocks, with each block having a particular number of data bits. The data bits in each block are then assigned to one or more sub-channels associated with that channel data stream.

The bits in each block are then demultiplexed into separate sub-channels, with each of the sub-channels conveying a potentially different number of bits (i.e., based on C/I of the sub-channel and whether MIMO processing is employed). For each of these sub-channels, the bits are grouped into modulation symbols using a particular modulation scheme (e.g., M-PSK or M-QAM) associated with that sub-channel. For example, with 16-QAM, the signal constellation is composed of 16 points in a complex plane (i.e., a+j*b), with each point in the complex plane conveying 4 bits of information. In the MIMO processing mode, each modulation symbol in the sub-channel represents a linear combination of modulation symbols, each of which may be selected from a different constellation.

The collection of L modulation symbols form a modulation symbol vector V of dimensionality L. Each element of the modulation symbol vector V is associated with a specific sub-channel having a unique frequency or tone on which the modulation symbols is conveyed. The collection of these L modulated symbols are all orthogonal to one another. At each time slot and for each antenna, the L modulation symbols corresponding to the L sub-channels are combined into an OFDM symbol using an inverse fast Fourier transform (IFFT). Each OFDM symbol includes data from the channel data streams assigned to the L sub-channels.

OFDM modulation is described in further detail in a paper entitled "Multicarrier Modulation for Data Transmission: An Idea Whose Time Has Come," by John A. C. Bingham, IEEE Communications Magazine, May 1990, which is incorporated herein by reference.

Data processor 1520 thus receives and processes the encoded data corresponding to K channel data streams to provide $N_T$ modulation symbol vectors, $V_1$ through $V_{NT}$, one modulation symbol vector for each transmit antenna. In some implementations, some of the modulation symbol vectors may have duplicate information on specific sub-channels intended for different transmit antennas. The modulation symbol vectors $V_1$ through $V_{NT}$ are provided to modulators 1414a through 1414t, respectively.

In the embodiment shown in FIG. 15, each modulator 1414 includes an IFFT 1520, cycle prefix generator 1522, and an upconverter 1524. IFFT 1530 converts the received modulation symbol vectors into their time-domain representations called OFDM symbols. IFFT 1530 can be designed to perform the IFFT on any number of sub-channels (e.g., 8, 16, 32, and so on). In an embodiment, for each modulation symbol vector converted to an OFDM symbol, cycle prefix generator 1532 repeats a portion of the time-domain representation of the OFDM symbol to form the transmission symbol for the specific antenna. The cyclic prefix insures that the transmission symbol retains its orthogonal properties in the presence of multipath delay spread, thereby improving performance against deleterious path effects, as described below. The implementation of IFFT 1530 and cycle prefix generator 1532 is known in the art and not described in detail herein.

The time-domain representations from each cycle prefix generator 1532 (i.e., the transmission symbols for each antenna) are then processed by upconverter 1532, converted into an analog signal, modulated to a RF frequency, and conditioned (e.g., amplified and filtered) to generate an RF modulated signal that is then transmitted from the respective antenna 1416.

FIG. 15 also shows a block diagram of an embodiment of data processor 1520. The encoded data for each channel data stream (i.e., the encoded data stream, $\chi$) is provided to a respective channel data processor 1532. If the channel data stream is to be transmitted over multiple sub-channels and/or multiple antennas (without duplication on at least some of the transmissions), channel data processor 1532 demultiplexes the channel data stream into a number of (up to $L \cdot N_T$) data sub-streams. Each data sub-stream corresponds to a transmission on a particular sub-channel at a particular antenna. In typical implementations, the number of data sub-streams is less than $L \cdot N_T$ since some of the sub-channels are used for signaling, voice, and other types of data. The data sub-streams are then processed to generate corresponding sub-streams for each of the assigned sub-channels that are then provided to combiners 1534. Combiners 1534 combine the modulation symbols designated for each antenna into modulation symbol vectors that are then provided as a modulation symbol vector stream. The $N_T$ modulation symbol vector streams for the $N_T$ antennas are then provided to the subsequent processing blocks (i.e., modulators 1414).

In a design that provides the most flexibility, best performance, and highest efficiency, the modulation symbol to be transmitted at each time slot, on each sub-channel, can be individually and independently selected. This feature allows for the best use of the available resource over all three dimensions—time, frequency, and space. The number of data bits transmitted by each modulation symbol may thus differ.

In the embodiment shown in FIG. 15, resource allocation processor 1430 couples to demultiplexer 1510, data processor 1520, and upconverters 1524. After the data transmissions are scheduled, resource allocation processor 1430 directs data for the scheduled transmission to be demultiplexed by demultiplexer 1510 into their respective assigned channels. Resource allocation processor 1430 further directs the processing of these transmissions based on the determined link quality. For example, resource allocation processor 1430 may determine the modulation scheme (e.g., M-PSK, M-QAM) to be used and the data rates for these transmissions. Resource allocation processor 1430 may also provide directive to upconverters 1524 to reduce or disable the transmit power of some or all of the available channels to achieve the desired system goals.

As shown above, the transmitter unit and receiver unit are each implemented with various processing units that include various types of data processor, encoders, IFFTs, FFTs, demultiplexers, combiners, resource allocation processor, channel characterization processor, and so on. These processing units can be implemented in various manners such as an application specific integrated circuit (ASIC), a digital signal processor, a microcontroller, a microprocessor, or other electronic circuits designed to perform the functions described herein. Also, the processing units can be implemented with a general-purpose processor or a specially designed processor operated to execute instruction codes that achieve the functions described herein. Thus, the processing units described herein can be implemented using hardware, software, or a combination thereof.

The foregoing description of the preferred embodiments is provided to enable any person skilled in the art to make or use the present invention. Various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

What is claimed is:

1. A method for controlling transmissions in a communications system, the method comprising:
    determining one or more characteristics of the communications system, including loading probabilities for the communications system;
    partitioning available system resources into a plurality of channels;
    defining a plurality of back-off factors for the plurality of channels based at least in part on the determined one or more characteristics of the communications system, wherein each channel is associated with a respective back-off factor that identifies a reduction from peak transmit power level, and wherein each back-off factor ranges from zero to one; and
    transmitting on the plurality of channels at power levels determined based at least in part on the plurality of back-off factors.

2. A method for controlling transmissions in a communications system, the method comprising:
    determining one or more characteristics of the communications system;
    partitioning available system resources into a plurality of channels;
    defining a plurality of back-off factors for the plurality of channels based at least in part on the determined one or more characteristics of the communications system, wherein each channel is associated with a respective back-off factor that identifies a reduction from peak transmit power level, and wherein each back-off factor ranges from zero to one, wherein the plurality of back-off factors are defined based in part on required outage probabilities; and
    transmitting on the plurality of channels at power levels determined based at least in part on the plurality of back-off factors.

3. A method for controlling transmissions in a communications system, the method comprising:
    determining one or more characteristics of the communications system;
    partitioning available system resources into a plurality of channels;
    defining a plurality of back-off factors for the plurality of channels based at least in part on the determined one or more characteristics of the communications system, wherein each channel is associated with a respective back-off factor that identifies a reduction from peak transmit power level, and wherein each back-off factor ranges from zero to one, wherein the plurality of back-off factors are defined based in part on one or more set points selected for the plurality of channels, wherein each set point corresponds to a required C/I for a data transmission, wherein the one or more set points are determined based in part on required outage probabilities; and
    transmitting on the plurality of channels at power levels determined based at least in part on the plurality of back-off factors.

4. A method for controlling transmissions in a communications system, the method comprising;
    determining one or more characteristics of the communications system;
    partitioning available system resources into a plurality of channels;
    defining a plurality of back-off factors for the plurality of channels based at least in part on the determined one or more characteristics of the communications system, wherein each channel is associated with a respective back-off factor that identifies a reduction from peak transmit power level, and wherein each back-off factor ranges from zero to one;
    transmitting on the plurality of channels at power levels determined based at least in part on the plurality of back-off factors;
    estimating a required transmit power level for each of the plurality of channels, wherein the required transmit power level for a particular channel is estimated based on a C/I estimate of a data transmission on the particular channel; and
    adjusting the plurality of back-off factors based on the estimated required transmit power levels for the plurality of channels.

5. The method of claim 4, wherein the required transmit power level for the particular channel is further estimated based on a data rate for the data transmission on the particular channel.

6. A method for controlling transmissions in a communications system, the method comprising:
    determining one or more characteristics of the communications system;
    partitioning available system resources into a plurality of channels;
    defining a plurality of back-off factors for the plurality of channels based at least in part on the determined one or more characteristics of the communications system, wherein each channel is associated with a respective back-off factor that identifies a reduction from peak transmit power level, and wherein each back-off factor ranges from zero to one, wherein at least one channel is associated with a back-off factor of one, representative of full transmit power, and remaining channels are associated with back-off factors of less than one; and
    transmitting on the plurality of channels at power levels determined based at least in part on the plurality of back-off factors.

7. A method for controlling transmissions in a communications system, the method comprising:
    determining one or more characteristics of the communications system;
    partitioning available system resources into a plurality of channels;

defining a plurality of back-off factors for the plurality of channels based at least in part on the determined one or more characteristics of the communications system, wherein each channel is associated with a respective back-off factor that identifies a reduction from peak transmit power level, and wherein each back-off factor ranges from zero to one, wherein the plurality of back-off factors are dynamically defined to reflect changes in the communications system; and transmitting on the plurality of channels at power levels determined based at least in part on the plurality of back-off factors.

8. The method of claim 7, wherein the plurality of back-off factors are dynamically defined to reflect changes in performance requirements in the communications system.

9. A method for controlling transmissions in a communications system, the method comprising:

determining one or more characteristics of the communications system;

partitioning available system resources into a plurality of channels;

defining a plurality of back-off factors for the plurality of channels based at least in part on the determined one or more characteristics of the communications system, wherein each channel is associated with a respective back-off factor that identifies a reduction from peak transmit power level, and wherein each back-off factor ranges from zero to one, wherein the plurality of back-off factors are adaptively defined to approximately match changes in the communications system; and transmitting on the plurality of channels at power levels determined based at least in part on the plurality of back-off factors.

10. The method of claim 9, wherein the plurality of back-off factors are adaptively defined to approximately match changes in characterization of receiver units in the communications system.

11. The method of claim 9, wherein the plurality of back-off factors are adaptively defined to approximately match changes in loading conditions in the communications system.

12. A method for controlling transmissions in a communications system, the method comprising:

determining one or more characteristics of the communications system;

partitioning available system resources into a plurality of channels;

defining a plurality of back-off factors for the plurality of channels based at least in part on the determined one or more characteristics of the communications system, wherein each channel is associated with a respective back-off factor that identifies a reduction from peak transmit power level, and wherein each back-off factor ranges from zero to one, wherein one or more back-off factors are adjusted based on measured performance, wherein the one or more back-off factors are adjusted based on estimated or measured C/I; and transmitting on the plurality of channels at power levels determined based at least in part on the plurality of back-off factors.

13. A method for controlling transmissions in a communications system, the method comprising;

determining one or more characteristics of the communications system;

partitioning available system resources into a plurality of channels;

defining a plurality of back-off factors for the plurality of channels based at least in part on the determined one or more characteristics of the communications system, wherein each channel is associated with a respective back-off factor that identifies a reduction from peak transmit power level, and wherein each back-off factor ranges from zero to one, wherein one or more back-off factors are adjusted based on measured performance, wherein the one or more back-off factors are adjusted based on measured frame erasure rates (FERs); and transmitting on the plurality of channels at power levels determined based at least in part on the plurality of back-off factors.

14. A method for controlling transmissions in a communications system, the method comprising:

determining one or more characteristics of the communications system;

partitioning available system resources into a plurality of channels;

defining a plurality of back-off factors for the plurality of channels based at least in part on the determined one or more characteristics of the communications system, wherein each channel is associated with a respective back-off factor that identifies a reduction from peak transmit power level, and wherein each back-ff factor ranges from zero to one, wherein one or more back-off factors are adjusted based on measured performance, wherein the one or more back-off factors are adjusted based on estimated outage probabilities; and transmitting on the plurality of channels at power levels determined based at least in part on the plurality of back-off factors.

15. A method for controlling transmissions in a communications system, the method comprising:

determining one or more characteristics of the communications system;

partitioning available system resources into a plurality of channels;

defining a plurality of back-off factors for the plurality of channels based at least in part on the determined one or more characteristics of the communications system, wherein each channel is associated with a respective back-of factor that identifies a reduction from peak transmit power level, and wherein each back-off factor ranges from zero to one, wherein one or more back-off factors are set to zero for selected time durations to eliminate interference on one or more associated channels; and transmitting on the plurality of channels at power levels determined based at least in part on the plurality of back-off factors.

16. A method for controlling transmissions in a communications system, the method comprising:

determining one or more characteristics of the communications system;

partitioning available system resources into a plurality of channels;

defining a plurality of back-off factors for the plurality of channels based at least in part on the determined one or more characteristics of the communications system, wherein each channel is associated with a respective back-off factor that identifies a reduction from peak transmit power level, and wherein each back-off factor ranges from zero to one, wherein the back-off factor of a particular channel is set to zero if performance of the particular channel is degraded below a particular threshold; and transmitting on the plurality of channels at power levels determined based at least in part on the plurality of back-off factors.

17. The method of claim 16, wherein the back-off factor of the particular channel is set to zero if a frame erasure rate (FER) exceeds a particular FER threshold.

18. The method of claim 16, wherein the back-off factor of the particular channel is set to zero if an outage probability for the particular channel exceeds a particular value.

19. A method for controlling transmissions in a communications system, the method comprising:

defining a reuse pattern for the communications system, wherein the reuse pattern includes a plurality of cells;

determining one or more characteristics for each cell in the reuse pattern;

partitioning available system resources into a plurality of channels;

defining a plurality of back-off factors for the plurality of channels for each cell in the reuse pattern based at least in part on the determined one or more characteristics, wherein each channel of each cell is associated with a respective back-off factor that identifies a reduction from peak transmit power level, and wherein each back-off factor ranges from zero to one;

transmitting on the plurality of channels from the plurality of cells at power levels determined based at least in part on the associated back-off factors;

estimating effective link margins for the plurality of channels for each cell in the reuse pattern; and redefining the back-off factors for each cell in the reuse pattern based on the estimated effective link margins.

20. The method of claim 19, wherein the estimating and redefining are performed iteratively until a set of conditions is satisfied.

21. The method of claim 19, wherein the estimating and redefining are performed iteratively until the effective link margins are within a particular threshold value.

22. A method for controlling transmissions in a communications system, the method comprising:

defining a reuse pattern for the communications system, wherein the reuse pattern includes a plurality of cells;

determining one or more characteristics for each cell in the reuse pattern, including carrier-to-noise-plus-interference (C/I) characterization of receiver units in the communications system or loading probabilities for the communications system, or both;

partitioning available system resources into a plurality of channels;

defining a plurality of back-off factors for the plurality of channels for each cell in the reuse pattern based at least in part on the determined one or more characteristics, wherein each channel of each cell is associated with a respective back-off factor that identifies a reduction from peak transmit power level, and wherein each back-off factor ranges from zero to one; and transmitting on the plurality of channels from the plurality of cells at power levels determined based at least in part on the associated back-off factors.

23. A method for controlling transmissions in a communications system, the method comprising:

defining a reuse pattern for the communications system, wherein the reuse pattern includes a plurality of cells;

determining one or more characteristics for each cell in the reuse pattern;

partitioning available system resources into a plurality of channels;

defining a plurality of back-off factors for the plurality of channels for each cell in the reuse pattern based at least in part on the determined one or more characteristics, wherein each channel of each cell is associated with a respective back-off factor that identifies a reduction from peak transmit power level, and wherein each back-off factor ranges from zero to one, wherein the plurality of back-off factors for each cell are defined based in part on C/I characterization for receiver units in the cell, one or more set points selected for the plurality of channels, required outage probabilities, or a combination thereof; and transmitting on the plurality of channels from the plurality of cells at power levels determined based at least in part on the associated back-off factors.

24. A method for controlling transmissions in a communications system, the method comprising:

defining a reuse pattern for the communications system, wherein the reuse pattern includes a plurality of cells;

determining one or more characteristics for each cell in the reuse pattern;

partitioning available system resources into a plurality of channels;

defining a plurality of back-off factors for the plurality of channels for each cell in the reuse pattern based at least in part on the determined one or more characteristics, wherein each channel of each cell is associated with a respective back-off factor that identifies a reduction from peak transmit power level, and wherein each back-off factor ranges from zero to one, wherein one or more back-off factors for a particular cell are adjusted based on measured or estimated performance corresponding to measured frame erasure rates (FERs), outage probabilities, or C/Is, or a combination thereof; and transmitting on the plurality of channels from the plurality of cells at power levels determined based at least in part on the associated back-off factors.

25. A method for operating a plurality of transmitter units in a wireless communications system, the method comprising;

partitioning available system resources into a plurality of channels;

defining a reuse pattern for the communications system, wherein the reuse pattern includes a plurality of cells;

determining one or more characteristics for each cell in the reuse pattern;

allocating a set of channels to each cell in the reuse pattern based at least in part on the determined one or more characteristics for the cell, wherein each cell in the reuse pattern is allocated a respective set of channels that includes one or more channels available for transmission at full power level and one or more channels available for transmission at reduced power levels; and repeating the determining and allocating to reflect changes in the communications system.

26. A method for operating a plurality of transmitter unit in a wireless communications system, the method comprising:

partitioning available system resources into a plurality of channels;

defining a reuse pattern for the communications system, wherein the reuse pattern includes a plurality of cells;

determining one or more characteristics for each cell in the reuse pattern;

allocating a set of channels to each cell in the reuse pattern based at least in part on the determined one or more characteristics for the cell, wherein one or more channels allocated to a particular cell are temporarily prohibited from transmitting to reduce interference; and repeating the determining and allocating to reflect changes in the communications system.

27. A method for operating a plurality of transmitter units in a wireless communications system, the method comprising:

partitioning available system resources into a plurality of channels;

defining a reuse pattern for the communications system, wherein the reuse pattern includes a plurality of cells;

determining one or more characteristics for each cell in the reuse pattern;

allocating a set of channels to each cell in the reuse pattern based at least in part on the determined one or more characteristics for the cell, wherein a particular cell transmits on a non-allocated channel for a transmission demand not supportable by the capacity of the allocated set of channels; and repeating the determining and allocating to reflect changes in the communications system.

28. The method of claim 27, wherein the non-allocated channel is selected based on an estimated performance of the selected channel.

29. The method of claim 28, wherein the non-allocated channel is selected based on an estimated probability of occupancy of the selected channel by neighbor cells.

30. The method of claim 28, wherein the non-allocated channel is selected based on an estimated carrier-to-interference-plus-noise (C/I) achievable on the selected channel.

31. The method of claim 28, wherein the non-allocated channel is selected based on an estimated outage probability for the selected channel.

32. The method of claim 27, wherein one or more channels are reserved for transmissions by a particular cell for a particular time duration.

33. The method of claim 32, wherein neighbor cells are prohibited from transmission on the one or more reserved channels for the particular time duration.

34. A method for providing data transmissions to a plurality of receiver units in a communications system, the method comprising:

defining a reuse scheme to be used for the data transmissions to the plurality of receiver units, wherein the defined reuse scheme identifies a particular reuse pattern, an initial allocation of available system resources, and a set of operating parameters, including:
characterizing one or more parameters of the communications system, and
defining a reuse plan based at least in part on the one or more characterized parameters, wherein the reuse plan identifies the particular reuse pattern and an initial cell reuse layout based on the particular reuse pattern;

transmitting to the plurality of receiver units in accordance with the defined reuse scheme;

evaluating performance of the communications system;

determining whether the evaluated system performance is within particular thresholds; and if the evaluated system performance is not within the particular thresholds, redefining the reuse scheme.

35. The method of claim 34, wherein characterizing includes determining an interference characterization for the plurality of receiver units in the communications system.

36. The method of claim 34, wherein the one or more parameters are updated periodically to reflect changes in the communications system.

37. The method of claim 34, wherein the defining the reuse scheme further includes partitioning the available system resources into a plurality of channels, and allocating a set of channels to each cell in the cell reuse layout based at least in part on the one or more characterized parameters.

38. The method of claim 37, wherein the characterizing includes determining expected probabilities of occupancy for the set of channels allocated to each cell.

39. The method of claim 38, wherein the expected probabilities of occupancy are set to one for uncharacterized channels.

40. The method of claim 37, wherein the defining the reuse scheme further includes defining a set of back-off factors to be associated with each allocated set of channels.

41. The method of claim 37, wherein the set of operating parameters includes a set of back-off factors for each allocated set of channels.

42. A method for providing data transmissions to a plurality of receiver units in a communications system, the method comprising:

defining a reuse scheme to be used for the data transmissions to the plurality of receiver units, wherein the defined reuse scheme identifies a particular reuse pattern, an initial allocation of available system resources, and a set of operating parameters;

transmitting to the plurality of receiver units in accordance with the defined reuse scheme;

evaluating performance of the communications system, including determining effective link margins, frame erasure rates (FERs), outage probabilities, or average throughputs, or a combination thereof, for a particular cell;

determining whether the evaluated system performance is within particular thresholds; and if the evaluated system performance is not within the particular thresholds, redefining the reuse scheme.

43. A method for providing data transmissions to a plurality of receiver units in a communications system, the method comprising:

updating a first set of parameters to be used for scheduling the data transmissions;

prioritizing the data transmissions;

assigning the data transmissions to respective available channels based at least in part on priorities of the data transmissions;

updating a second set of parameters to be used for transmitting the data transmissions; and transmitting on the assigned channels to the plurality of receiver units using the updated second set of parameters.

44. The method of claim 43, wherein the first set of parameters channel occupancy probabilities, loading probabilities, characterization of carrier-to-interference-plus-noise (C/I) of the receiver units, or back-off factors, or a combination thereof.

45. The method of claim 43, wherein the prioritizing includes computing channel metrics for the available channels for each receiver unit using the updated first set of parameters.

46. The method of claim 45, wherein the channel metrics relate to cumulative throughput.

47. The method of claim 46, wherein the cumulative throughput is determined based on realizable or actual data rates.

48. The method of claim 46, wherein the cumulative throughput is determined as a sliding average of realizable or actual data rates over a particular time interval.

49. The method of claim 45, wherein the channel metrics relate to outage probabilities.

50. The method of claim 45, wherein the channel metrics relate to expected achievable carrier-to-interference-plus-noise (C/I).

51. The method of claim 45, wherein the channel metrics is reflective of interference constraint matrices indicative of interference expected from interfering sources.

52. The method of claim 45, wherein the prioritizing further includes
assigning priorities to the data transmissions based in part on the computed channel metrics.

53. The method of claim 52, wherein the prioritizing further includes
upgrading priority of a particular data transmission based at least in part on delays experienced by the data transmission.

54. The method of claim 52, wherein the assigning the data transmissions to respective available channels is achieved base in part on the assigned priorities of the data transmissions and the computed channel metrics.

55. The method of claim 54, wherein successively lower priority data transmissions are assigned to the available channels, starting with the highest priority data transmission.

56. The method of claim 54, wherein successively smaller load data transmissions are assigned to the available channels, starting with the highest load data transmission.

57. The method of claim 43, further comprising:
measuring performance of one or more data transmissions; and
adjusting transmit power levels for the one or more data transmissions based on the measured performance.

58. The method of claim 54, wherein the transmit power levels for the one or more data transmissions are adjusted based on measure frame erasure rate (FER) of the one or more data transmissions.

59. The method of claim 43, further comprising:
estimating required transmit power for a particular data transmission; and
adjusting a data rate of the particular data transmission based at least in part on the estimated required transmit power.

60. The method of claim 43, wherein the assigning is achieved to approximately equalize data rates for the data transmissions.

61. The method of claim 60, wherein the equalized data rates are achieved by assigning two or more channels to data transmissions transmitted at lower data rates.

62. A method for providing data transmissions on a plurality of channels to a plurality of receiver units in a communications system, the method comprising:
computing channel metrics for the plurality of channels for each receiver unit;
prioritizing the data transmissions;
assigning data transmissions to the plurality of channels based on priorities of the data transmissions and the computed channel metrics, wherein the assigning includes:
selecting a data transmission having a highest priority, assigning the selected data transmission to a channel having a least favorable channel metrics but meeting requirements, and
successively assigning remaining data transmissions, in order of decreasing priorities, to available channels;
transmitting on the assigned channels to the plurality of receiver units; and
upgrading one or more data transmissions to available channels having more favorable channel metrics, including:
selecting a data transmission having a highest priority;
selecting a channel, from a list of available channels, having a most favorable channel metrics; and
reassigning the selected data transmission to the selected channel if the channel metrics associated with the selected channel is more favorable than the channel metrics associated with the original assigned channel.

63. A method for providing data transmissions on a plurality of channels to a plurality of receiver units in a communications system, the method comprising:
defining a plurality of back-off factors for the plurality of channels, wherein the back-off factors identify reduction from peak transmit power level for the respective channels;
assigning the data transmissions to the plurality of channels;
determining required transmit power levels for the data transmissions;
adjusting the plurality of back-off factors in accordance with the determined required transmit power levels;
transmitting the data transmissions on the plurality of channels in accordance with the plurality of adjusted back-off factors; and
computing channel metrics for the data transmissions based at least in part on the plurality of back-off factors, and
wherein the assigning the data transmissions to the plurality of channels is performed based in part on the computed channel metrics.

* * * * *